US011036374B2

(12) United States Patent
Sica et al.

(10) Patent No.: US 11,036,374 B2
(45) Date of Patent: Jun. 15, 2021

(54) AGGREGATED ADAPTIVE PURCHASE PROCESS AND INTERFACE

(71) Applicant: Hollywood.com LLC, Boca Raton, FL (US)

(72) Inventors: Greg Sica, Boca Raton, FL (US); Mitchell Rubenstein, Boca Raton, FL (US); Jerome Powell, Boca Raton, FL (US); Scott McDonald, Wellington, FL (US)

(73) Assignee: HOLLYWOOD.COM LLC, Boca Raton, FL (US)

( * ) Notice: Subject to any disclaimer, the term of this patent is extended or adjusted under 35 U.S.C. 154(b) by 0 days.

(21) Appl. No.: 16/877,070

(22) Filed: May 18, 2020

(65) Prior Publication Data

US 2020/0363933 A1 Nov. 19, 2020

Related U.S. Application Data

(60) Provisional application No. 62/940,126, filed on Nov. 25, 2019, provisional application No. 62/849,707, filed on May 17, 2019.

(51) Int. Cl.
*G06Q 10/02* (2012.01)
*G06F 3/0484* (2013.01)
(Continued)

(52) U.S. Cl.
CPC ...... *G06F 3/04842* (2013.01); *G06F 3/04817* (2013.01); *G06F 3/04886* (2013.01); *G06Q 10/02* (2013.01)

(58) Field of Classification Search
CPC combination set(s) only.
See application file for complete search history.

(56) References Cited

U.S. PATENT DOCUMENTS

2009/0063206 A1* 3/2009 Payne ............... G06Q 30/0601
 705/5
2009/0319306 A1* 12/2009 Chanick ............... G07B 15/00
 705/5

(Continued)

FOREIGN PATENT DOCUMENTS

WO 2001/003040 1/2001
WO 2017/016275 2/2017

OTHER PUBLICATIONS

International Search Report and Written Opinion, dated Jul. 24, 2020, received in International Patent Application No. PCT/US20/33340.

*Primary Examiner* — Hien L Duong
(74) *Attorney, Agent, or Firm* — Davis Wright Tremaine LLP; Heather M. Colburn

(57) ABSTRACT

A computer-implemented method that includes displaying a graphical user interface ("GUI") and receiving personalized information from at least one server computing device. The GUI includes a page. The personalized information identifies a theatre location, movies playing at the theatre location, dates, and showtimes associated with the movies and dates. The method includes displaying on the page, the movies, dates on which a particular movie is showing, and a particular showtime on a particular date. A selection is entered by the user into a user input displayed on the page. The selection changes the theatre location, the particular movie, the particular date, and/or the particular showtime without the user exiting the page. The page updates automatically to display the user selection. An indication is received that the user has selected a purchase input display on the page, and a purchase of at least one movie ticket is completed.

20 Claims, 30 Drawing Sheets

(51) Int. Cl.
    *G06F 3/0488*     (2013.01)
    *G06F 3/0481*     (2013.01)

(56) References Cited

U.S. PATENT DOCUMENTS

| | | | |
|---|---|---|---|
| 2010/0138874 A1* | 6/2010 | Deutschman | G06Q 10/02 725/60 |
| 2012/0079429 A1* | 3/2012 | Stathacopoulos | G06F 16/90335 715/830 |
| 2014/0032250 A1* | 1/2014 | Oxenham | G01C 21/206 705/5 |
| 2016/0148126 A1 | 5/2016 | Ameesh et al. | |
| 2017/0287059 A1* | 10/2017 | Shelksohn | G06F 3/04817 |
| 2018/0197119 A1* | 7/2018 | Sunshine | G06Q 30/0269 |
| 2020/0111112 A1* | 4/2020 | Warner | G06Q 30/0206 |

* cited by examiner

AGGREGATED ADAPTIVE PURCHASE PROCESS AND INTERFACE

CROSS REFERENCE TO RELATED APPLICATIONS

This application claims the benefit of U.S. Provisional Application No. 62/849,707, filed on May 17, 2019, and U.S. Provisional Application No. 62/940,126, filed on Nov. 25, 2019, both of which are incorporated herein by reference in their entireties.

BACKGROUND OF THE INVENTION

Field of the Invention

The present invention is directed generally to systems used to purchase tickets.

Description of the Related Art

Many users like to purchase event tickets (e.g., movie tickets) online. Unfortunately, doing so can be frustrating and/or time consuming. For example, a user must typically perform at least the following actions when purchasing a movie ticket online:
1. The user must launch the application;
2. The user must select a movie, which causes the application to display a showtime selection screen that shows showtimes for multiple theatre locations;
3. The user must select a particular theatre (e.g., Hollywood Theatre);
4. The user must select a particular showtime (e.g., 3:15 pm) at the particular theatre location, which causes the application to display a ticket selection screen;
5. The user must select a ticket type (e.g., an adult ticket type), which causes the application to display a screen with available ticket quantities;
6. The user must select a quantity (e.g., two tickets), which causes the application to display a new seat selection screen; and
7. The user must select a "choose seats" option, which causes the application to display a seating chart.

At this point, the user must view the seating chart and search for desired seats. If the user's desired seats are available, the user may use the seating chart to select seats and complete the purchase. On the other hand, if the user's desired seats are not available, the user may decide to select a different showtime and/or theatre location. For example, when a movie is popular, only seats at the very front of the theatre may be available. If the user does not wish to sit so close to the movie screen, the user may decide to select a different showtime and/or theatre location. Unfortunately, this requires the user to select (e.g., click on) a back button, which returns the user to the seat selection screen. Again, the user must select (e.g., click on) the back button, which returns the user to the showtime selection screen. Then, the user must repeat steps 3-6. Unfortunately, locating the user's desired seats may require the user to repeat this process several times, each time selecting a particular showtime at a particular theatre location and repeatedly entering ticket type and quantity. This wastes the user's time and causes additional processing by the ticket seller's computing system as well as additional network traffic. This is particularly problematic for newly released heavily anticipated movies.

BRIEF DESCRIPTION OF THE SEVERAL VIEWS OF THE DRAWINGS

Various embodiments in accordance with the present disclosure will be described with reference to the following drawings.

Like reference numerals have been used in the figures to identify like components.

DETAILED DESCRIPTION OF THE INVENTION

Figure 1:
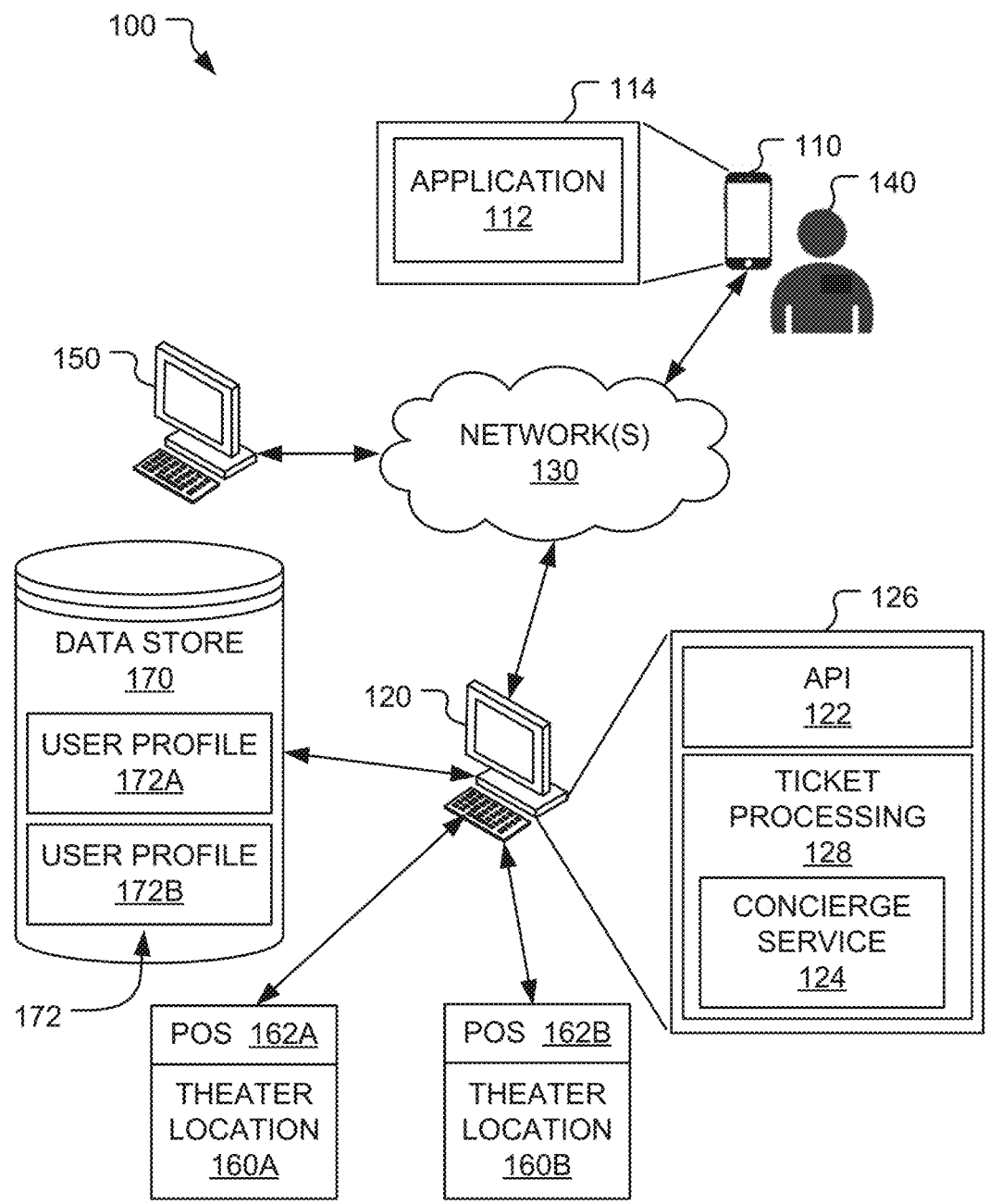
FIG. 1 is a block diagram of an example system for purchasing movie tickets that includes a plurality of client computing devices and at least one server computing device.

FIG. 1 is a diagram of a system 100 for purchasing movie tickets. The system 100 includes a plurality of client computing devices (e.g., a client computing device 110) connected to at least one server computing device (e.g., a server computing device 120) by one or more networks 130. In FIG. 1, for simplicity, the plurality of client computing devices have been illustrated and will be described as including only the client computing device 110. However, the plurality of client computing devices may include any number of client computing devices each like the client computing device 110. By way of a non-limiting example, the client computing device 110 may be implemented as a mobile communication device 500 (see FIG. 5) or a computing device 12 (see FIG. 6). Also, in FIG. 1, for simplicity, the server computing device(s) has/have been illustrated and will be described as including only the server computing device 120. However, the server computing device(s) may include any number of server computing devices each like the server computing device 120. The server computing device 120 may be implemented as one or more computing devices (e.g., each like the computing device 12 illustrated in FIG. 6). Referring to FIG. 1, the server computing device 120 may implement and/or be connected to a data store 170 (e.g., a database). The data store 170 may be implemented by one or more computing devices (e.g., each like the computing device 12 illustrated in FIG. 6).

The system 100 may include or be connected to a payment processor service 150. The payment processor service 150 may be implemented by one or more computing devices (e.g., each like the computing device 12 illustrated in FIG. 6). The server computing device 120 is configured to communicate with the payment processor service 150 (e.g., via the network(s) 130). The payment processor service 150 is configured to communicate (1) funds or some other financial arrangement (e.g., made in advance), or (2) a refusal of funds to the server computing device 120.

The server computing device 120 may be in communication with any number of movie theatre locations (e.g., movie theatre locations 160A and 160B). Alternatively, personnel at an entity (not shown) operating the server computing device 120 may be in communication with the movie theatre locations 160A and 160B. The theatre locations 160A and 160B may include or be associated with point-of-sale ("POS") systems 162A and 162B, respectively. Each of the POS systems 162A and 162B is configured to receive and complete a movie ticket order. By way of a non-limiting example, the server computing device 120 may communicate with the POS systems 162A and 162B via the network(s) 130.

The client computing device 110 is configured to be operated by a user 140. The client computing device 110 implements an application 112 that may be stored in memory 114 of the client computing device 110 (e.g., implemented as memory 520 illustrated in FIG. 5 or system memory 22 illustrated in FIG. 6). By way of a non-limiting example, the application 112 may be downloaded from the server computing device 120 or an application store (not shown) and installed on the client computing device 110.

Figure 6:
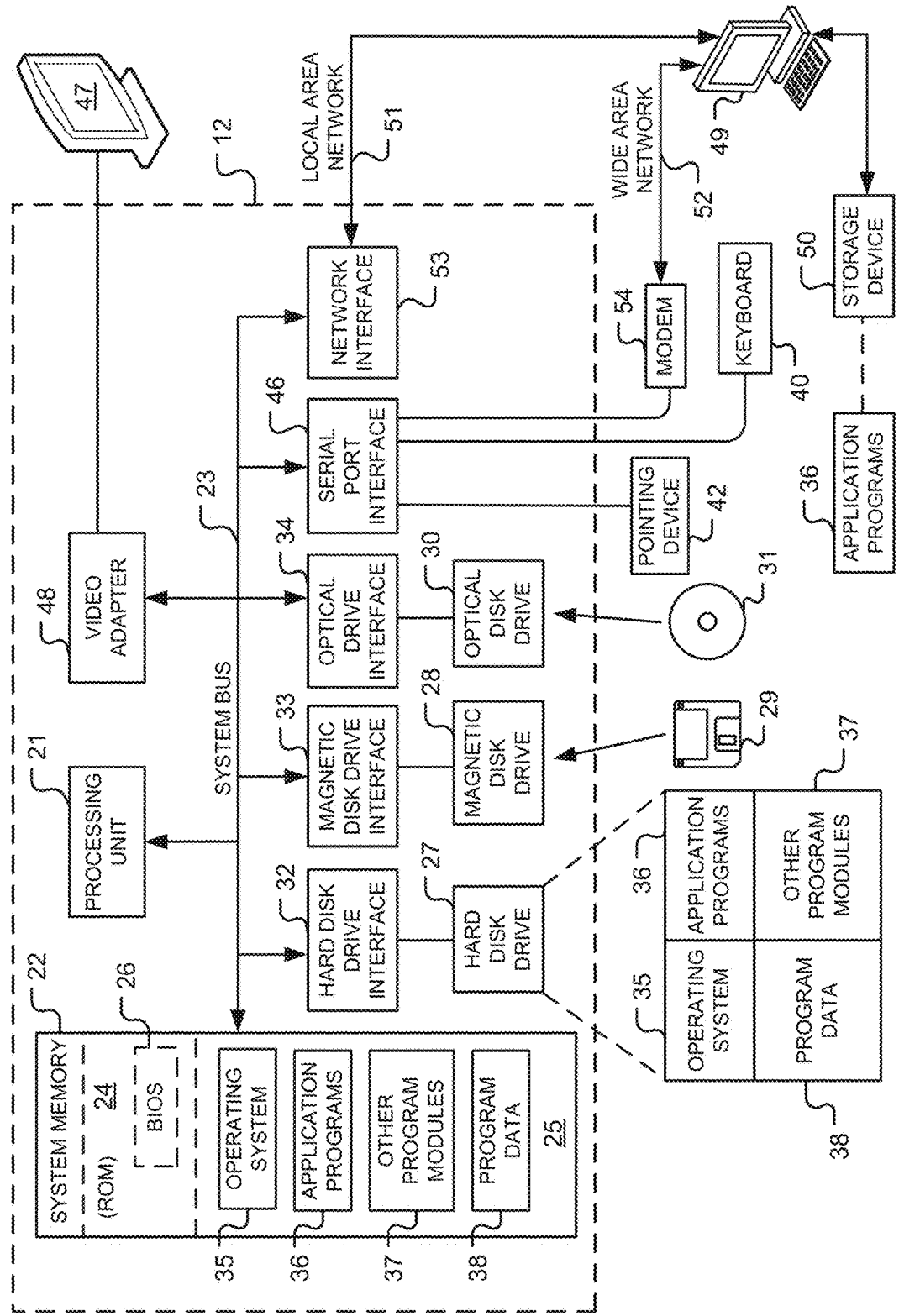
FIG. 6 is a diagram of hardware and an operating environment in conjunction with which implementations of the one or more computing devices of the system of FIG. 1 may be practiced.

The server computing device 120 implements an application programming interface ("API") 122 that may be stored in memory 126 of the server computing device 120 (e.g., implemented as the system memory 22 illustrated in FIG. 6). The API 122 allows the application 112 to access functionality provided by a ticket processing application 128 that may be implemented by the server computing device 120 and/or one or more other computing devices like the server computing device 120. Functionality attributed to the API 122 below may be performed at least in part by the ticket processing application 128.

Figure 2A:
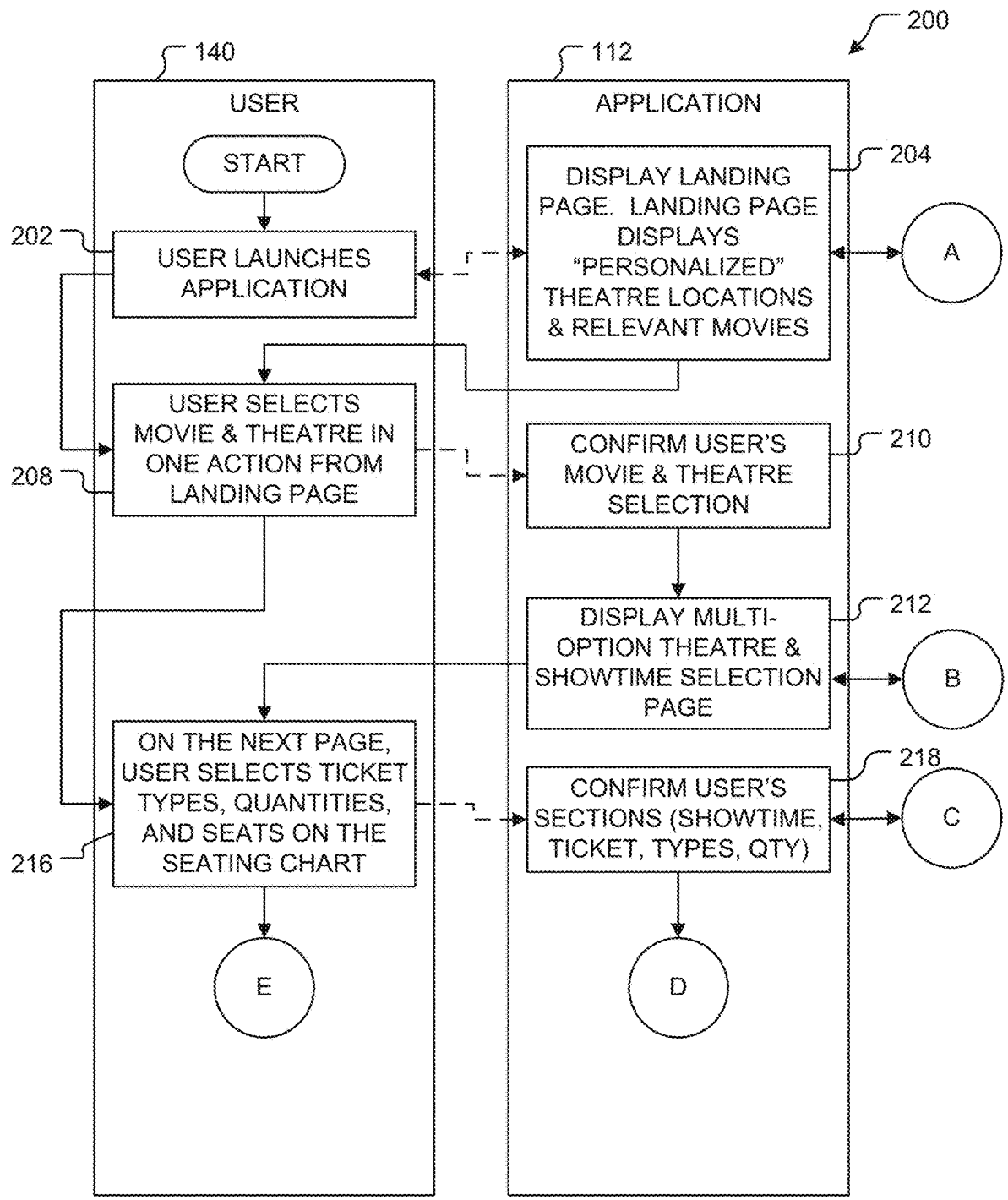
FIG. 2A is a first portion of a flow diagram of a first method performed by the example system of FIG. 1.
Figure 2B:
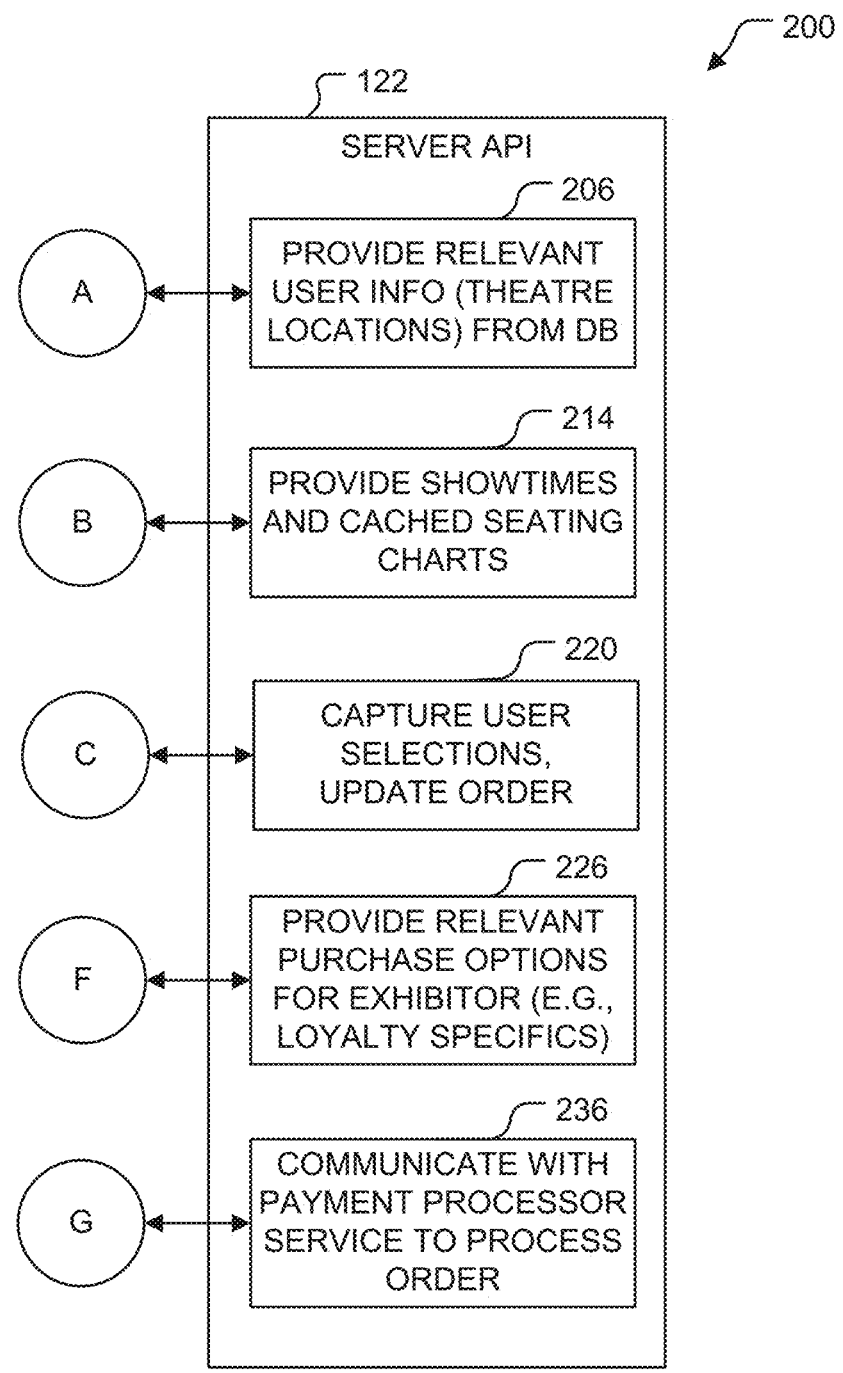
FIG. 2B is a second portion of the flow diagram of FIG. 2A.
Figure 2C:
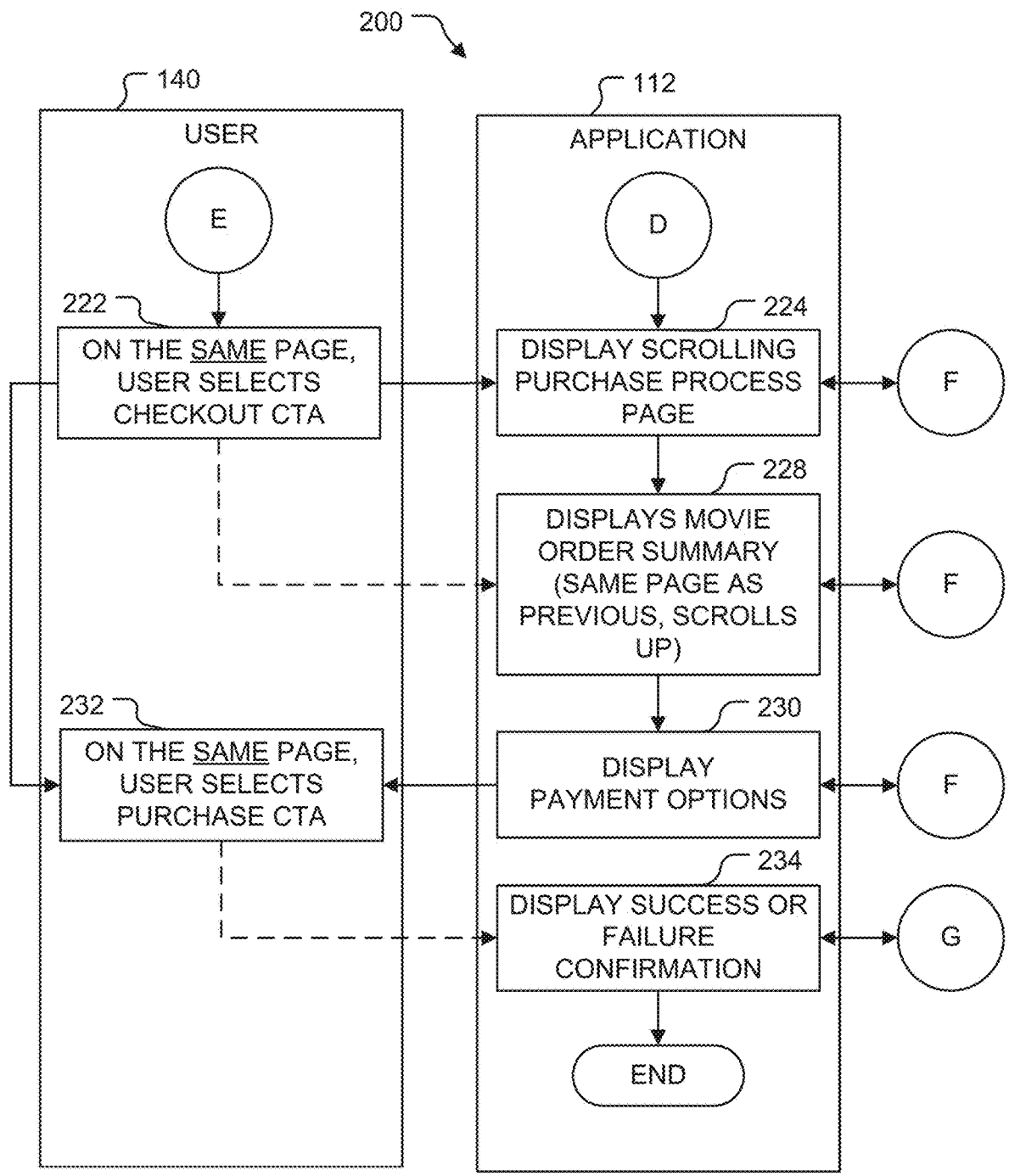
FIG. 2C is a third portion of the flow diagram of FIG. 2A.
Figure 3A:
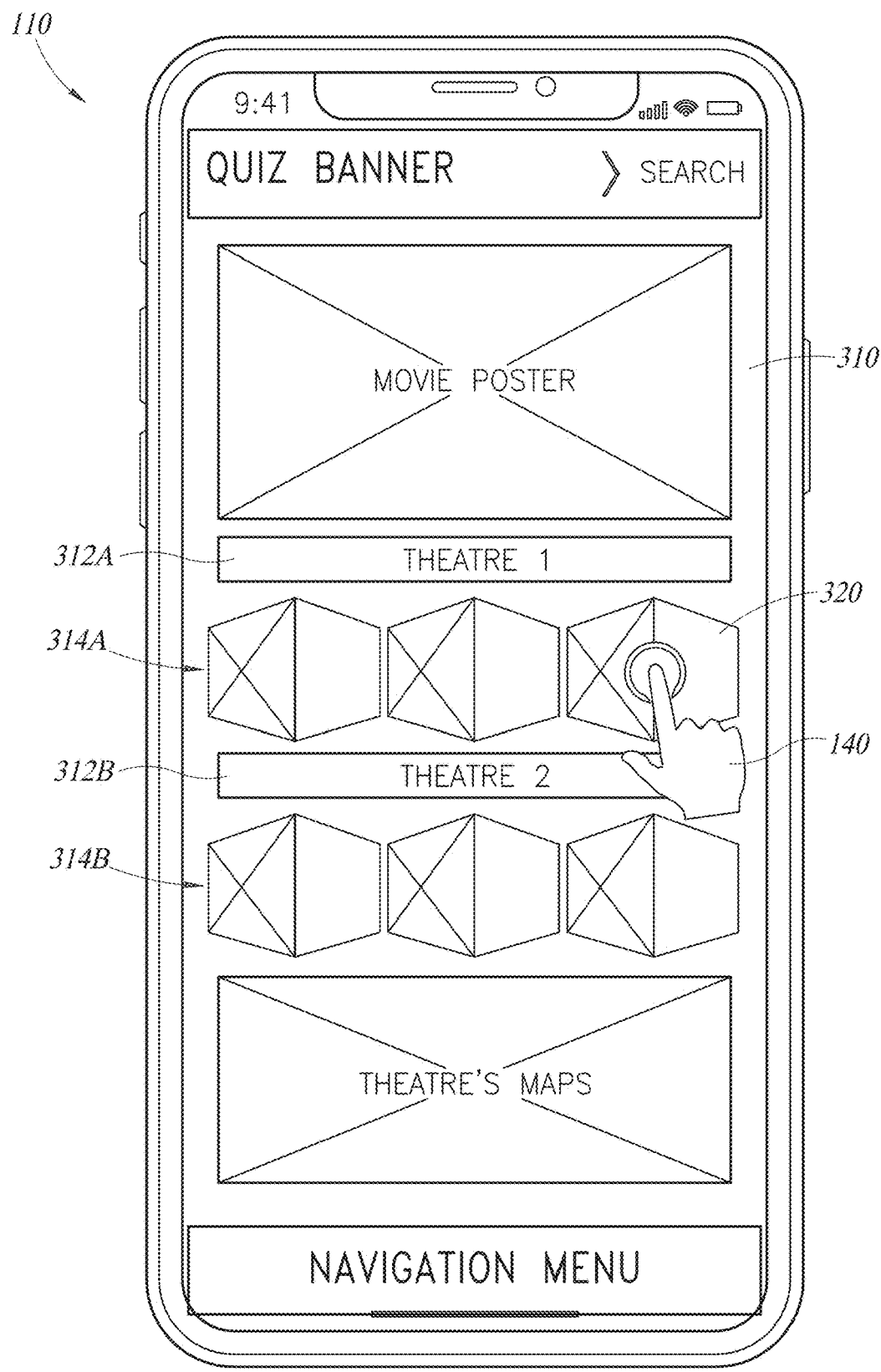
FIG. 3A is an illustration of an example landing page.

FIGS. 2A-2C illustrate a flow diagram of a first method 200 performed in part by the user 140, in part by the application 112, and in part by the API 122 (see FIGS. 1, 2B, 2E, and 7A-7C). Referring to FIG. 2A, in first block 202, the user 140 launches the application 112 on the client computing device 110 (see FIGS. 1, 3A-4I, and 8). Then, in block 204, the application 112 displays a landing page 310 (see FIG. 3A) that allows the user 140 to select a theatre location and a movie showing at the selected theatre location in one action (e.g., tap, click, and the like). Referring to FIG. 3A, the landing page 310 displays identifications 312A and 312B of the "personalized" theatre locations 160A and 160B (see FIG. 1), respectively, along with movies 314A and 314B playing at the theatre locations 160A and 160B, respectively. Referring to FIG. 1, the application 112 provides user identification information (e.g., login information) to the API 122 that the API 122 uses to identify the user 140.

As the application 112 is launching, the application 112 contacts the API 122 and requests relevant first information. In block 206 (see FIG. 2B), the API 122 obtains the relevant first information (e.g., from the data store 170) and sends the relevant first information to the application 112, which uses the relevant first information to generate and display the landing page 310 (see FIG. 3A) in block 204 (see FIG. 2A). The relevant first information may include one or more theatre locations, movies playing at each of the theatre location(s), and showtime information for each movie. The relevant first information is selected by the API 122 based on the presentation needs of the application 112. For example, referring to FIG. 3A, the relevant first information may identify the theatre locations 160A and 160B (see FIG. 1) identified on the landing page 310 by the identifications 312A and 312B, the movies 314A and 314B, and showtimes of the movies 314A and 314B identified by the showtime input(s) 332 (see FIG. 3B).

As mentioned above, referring to FIG. 1, the theatre locations 160A and 160B may be "personalized" to the user

140. The API 122 may select such personalized theatre locations using a number of different criteria. By way of a non-limiting example, the system 100 may allow the user 140 to tag (e.g., in the data store 170) one or more of the theatre locations each as being a favorite. In such embodiments, the relevant first information may include the theatre location(s) tagged by the user 140, any movies playing at each of the favorite theatre locations, and a showtime for each of the movies.

Alternatively, or if the user 140 has not tagged any of the theatre locations, the data store 170 may store a list of theatre locations that were selected previously by the user 140 (e.g., in transaction records associated with previous ticket orders placed by the user 140). In such embodiments, the relevant first information may include one or more of the theatre locations selected most recently by the user 140, any movies playing at the theatre location(s), and a showtime for each of the movies. By way of another non-limiting example, the application 112 may identify one or more of the theatre locations from a search history (not shown) and/or a browser history (not shown) stored on the client computing device 110. In such embodiments, the application 112 may provide this information to the API 122 in block 204 (see FIG. 2A). Then, in block 206 (see FIG. 2B), the API 122 may look up (e.g., in the data store 170) the movies being played by each of the identified theatre location(s) and include the movies along with their showtimes in the relevant first information.

Alternatively, or if the user 140 has not tagged any of the theatre locations and has not previously ordered any tickets using the API 122, in block 204 (see FIG. 2A), the application 112 may pass a geographic location to the API 122. The geographic location may be a current geographic location of the client computing device 110 or a selected geographic location provided by the user 140 to the application 112 in block 204 (see FIG. 2A). The geographic location may include latitude and longitude. Then, in block 206 (see FIG. 2B), the API 122 may use the geographic location to identify one or more theatre locations that are closest to the geographic location and/or within a predetermined distance or radius from the geographic location. Alternatively, the geographic location may include a postal code. In such embodiments, the API 122 may identify those of the theatre locations within the postal code. The API 122 includes the identified theatre location(s), any movies playing at each of the identified theatre locations, and a showtime for each of the movies in the relevant first information.

Thus, the API 122 may identify the personalized theatre location(s) in multiple ways and the present disclosure is not limited to a particular way of identifying the theatre locations.

After the API 122 identifies the personalized theatre locations in block 206 (see FIG. 2B), the API 122 provides the relevant first information to the application 112 in block 204 (see FIG. 2A). Then, the user 140 decides from which theatre location to purchase one or more movie tickets. In block 208 (see FIG. 2A), the user 140 selects a movie and a theatre location in a single action from the landing page 310 (see FIG. 3A). As shown in FIG. 3A, the movies 314A may be displayed near (e.g., under) the identification 312A of the theatre location 160A (see FIG. 1) whereat each of the movies 314A is playing. Similarly, the movies 314B may be displayed near (e.g., under) the identification 312B of the theatre location 160B (see FIG. 1) whereat each of the movies 314B is playing. Further, each of the movies 314A and 314B may be represented by a different user input (e.g., a selectable icon or image). By selecting one of the user inputs, the user 140 selects a particular movie that is playing at an associated theatre location. In the example illustrated in FIG. 3A, the user 140 selects a user input 320, which corresponds to one of the movies 314A playing at the theatre location 160A (see FIG. 1). The selected theatre location (e.g., the theatre location 160A) is referred to hereafter as an "Exhibitor."

Referring to FIG. 2A, in block 210, the application 112 receives the selection of the user input 320 (see FIG. 3A) and confirms the movie and theatre location selected by the user 140. For example, the application 112 may display indications of these selections and ask the user 140 to confirm them.

Figure 3B:
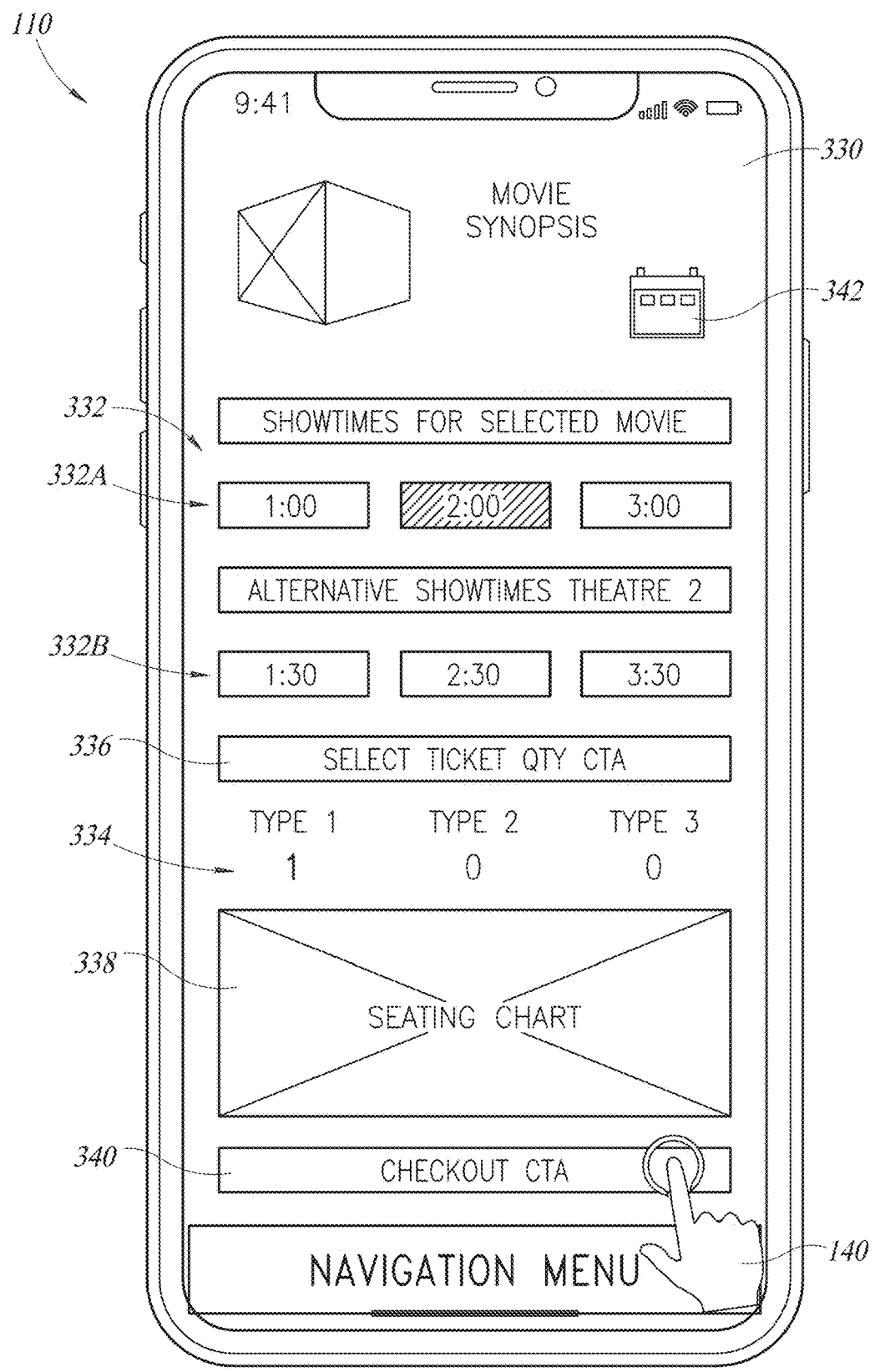
FIG. 3B is a first illustration of a first embodiment of an example primary view page.

Then, in block 212, the application 112 displays a multi-option theatre and showtime selection page 330 (see FIGS. 3B and 3C) that is a first embodiment of a primary view page 410 illustrated in FIGS. 4A-4E, 4H, 8, and 11. Referring to FIG. 3B, the theatre and showtime selection page 330 displays one or more showtime inputs 332, one or more ticket type inputs 334, a ticket quantity input 336, and a seating chart 338. Each of the showtime input(s) 332 corresponds to a different showtime on a particular date (e.g., the current date, the next date, and the like). The user 140 may use the seating chart 338 to select one or more seat locations within the Exhibitor whereat the movie is playing at the showtime selected. In the embodiment illustrated, the theatre and showtime selection page 330 displays showtime input(s) 332A for the movie selected in block 208 (see FIG. 2A) at the Exhibitor also selected in block 208 along with showtime input(s) 332B for an alternate theatre location (e.g., the theatre location 160B illustrated in FIG. 1). By selecting one of the showtime input(s) 332B, the user 140 automatically changes the Exhibitor to the alternate theatre location. Similarly, by selecting one of the showtime input(s) 332A, the user 140 automatically changes the Exhibitor back to the theatre location selected in block 208 (see FIG. 2A). While the embodiment of the theatre and showtime selection page 330 illustrated in FIG. 3B depicts only the two theatre locations, the theatre and showtime selection page 330 may alternatively be configured to display any number of theatre locations.

On the theatre and showtime selection page 330, the showtime input(s) 332A and 332B are grouped with the theatre locations 160A and 160B (see FIG. 1), respectively, allowing them to be readily compared by the user 140, which is unique in this industry. All other user interfaces in the industry require the user 140 to go back to a theatre selection screen if the showtimes or seating availability do not match what the user 140 is looking for.

The theatre and showtime selection page 330 may include a calendar input 342 that, when selected, allows the user 140 to change the date of the showtimes if the displayed (or current) showtimes do not match what the user 140 is looking for.

Figure 3C:
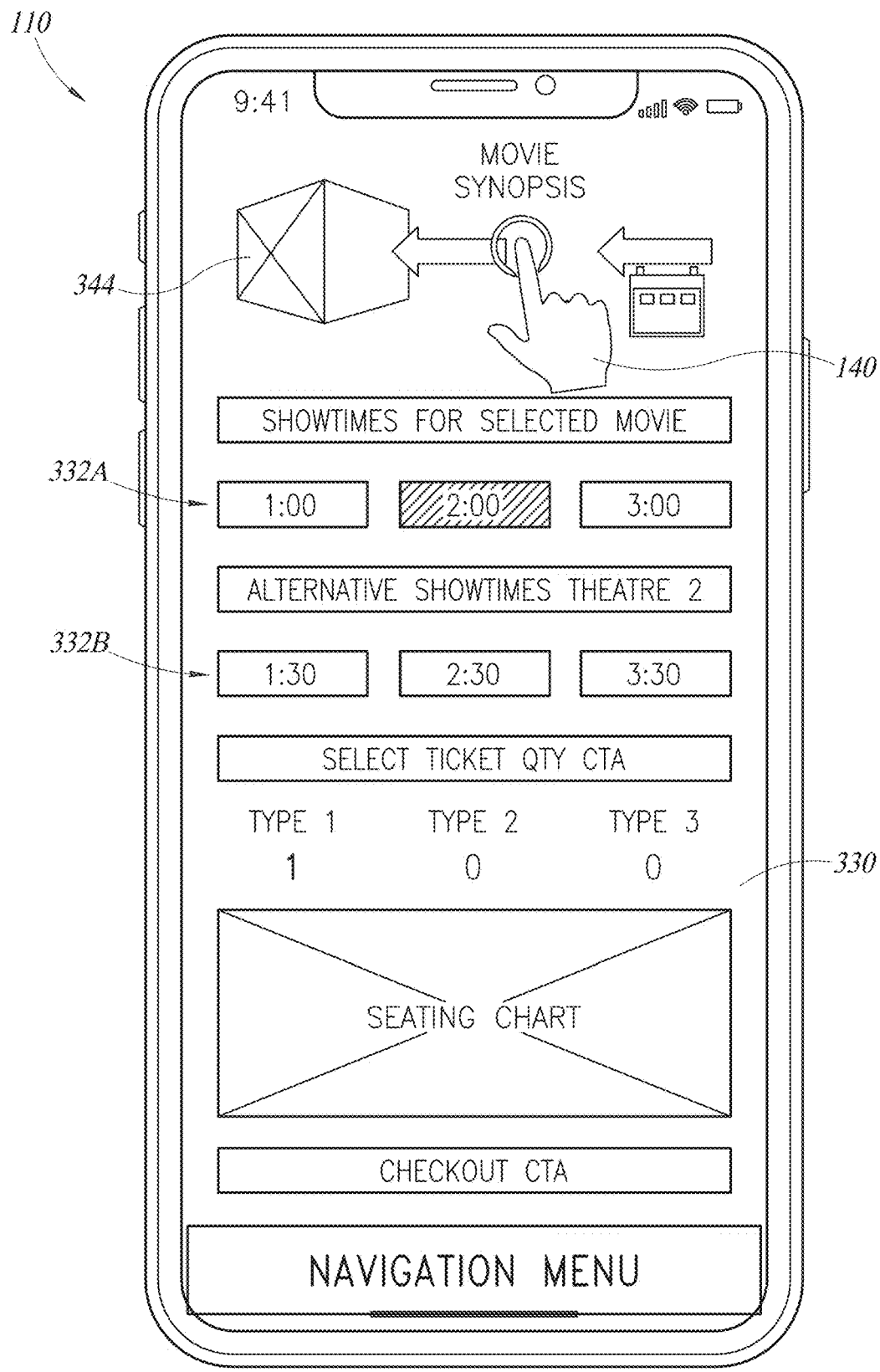
FIG. 3C is a second illustration of the example primary view page of FIG. 3B.

Referring to FIG. 3C, the theatre and showtime selection page 330 may include a movie selection input 344 that may be used to change the current movie selection. In the embodiment illustrated, the movie selection input 344 is activated by the user 140 swiping the movie selection input 344 to change the movie selection. When the movie selection is changed in this manner, the theatre and showtime selection page 330 is automatically refreshed by the application 112 to show the showtimes input(s) 332A and 332B associated with the new movie selection, which is unique in this industry.

Returning to FIG. 2A, as the application 112 is generating the theatre and showtime selection page 330 (see FIGS. 3B and 3C) in block 212, the application 112 contacts the API 122 (see FIGS. 1, 2B, 2E, and 7A-7C) and requests relevant second information. In block 214 (see FIG. 2B), the API 122 obtains the relevant second information (e.g., from the data store 170 illustrated in FIG. 1) and sends the relevant second information to the application 112, which uses the relevant second information to generate and display the theatre and showtime selection page 330 (see FIGS. 3B and 3C) in block 212.

The relevant second information may identify showtimes for the movie selected in block 208 or using the movie selection input 344 (see FIG. 3C). Thus, referring to FIG. 2B, the API 122 may perform the block 214 each time the user 140 (see FIGS. 1, 2A, 2C, 2D, 2F, 2G, and 3A-3C) changes the movie selection and/or the date using the calendar input 342 (see FIG. 3B). Optionally, after the user 140 (see FIGS. 1, 2A, 2C, 2D, 2F, 2G, and 3A-3C) selects one of the showtimes (e.g., using one of the showtimes input(s) 332 illustrated in FIG. 3B), the application 112 (see FIGS. 1, 2A, 2C, 2D, 2F, and 2G) may request a reserved seating seat map from the API 122 (e.g., in block 214) for the selected showtime. Thus, the API 122 may perform the block 214 each time the user 140 (see FIGS. 1, 2A, 2C, 2D, 2F, 2G, and 3A-3C) changes the showtime selection.

Alternatively, referring to FIG. 1, the relevant second information may include reserved seating seat maps associated with at least a portion of the showtimes for the selected movie at one or more of the theatre locations 160A and 160B. These reserved seating seat maps allow the application 112 to quickly display seat availability to the user 140. Those reserved seating seat maps related to showtimes other than the selected showtime at the Exhibitor may be stored or cached until one of these alternate showtimes is selected. By way of a non-limiting example, the relevant second information may include a reserved seating seat map for each showtime of the selected movie at the Exhibitor. The application 112 may request a reserved seating seat map from the API 122 (e.g., in block 214 illustrated in FIG. 2B) whenever the user 140 selects a showtime for which a reserved seating seat map has not been downloaded to the application 112 by the API 122 (e.g., in the relevant second information). At least some of the reserved seating seat maps may download as part of a background process while the theatre and showtime selection page 330 (see FIGS. 3B and 3C) is being displayed.

By way of yet another non-limiting example, referring to FIG. 3C, the relevant second information may identify showtimes for a plurality of movies, including the movie selected in block 208 (see FIG. 2A) or using the movie selection input 344, and reserved seating seat maps associated with each of the plurality of movies. By way of a non-limiting example, the plurality of movies may include the movies playing at the Exhibitor. Information related to movies other than the selected movie may be stored or cached until one of these movies and a showtime associated with the movie are selected. When this occurs, referring to FIG. 3B, the seating chart 338 may be updated using the reserved seating seat map associated with the newly selected movie, the selected showtime, and the selected theatre location. In other words, referring to FIG. 2A, the application 112 may pre-load or pre-fetch at least some information. At least some of the pre-loaded or pre-fetched information may be downloaded as part of a background process while the theatre and showtime selection page 330 (see FIGS. 3B and 3C) is being displayed.

Referring to FIG. 3B, the reserved seating seat map associated with the selected movie, the selected showtime, and the selected theatre location is used to generate and display the seating chart 338, which illustrates seats that are available to be reserved for the selected movie at the selected showtime playing at the Exhibitor.

Next in block 216 (see FIG. 2A), the user 140 selects a particular showtime using the showtime input(s) 332, the ticket type using the ticket type input(s) 334, a ticket quantity using the ticket quantity input 336, and a seat for each ticket using the seating chart 338. As mentioned above, the user 140 may also select a date using the calendar input 342 or change the movie selection using the movie selection input 344 (see FIG. 3C). As shown in FIG. 3B, the seating chart 338 updates or loads when the user 140 changes the showtime, theatre location, movie, and/or date selected without initiating a ticket order with the POS system (e.g., the POS system 162A illustrated in FIG. 1) operated by the Exhibitor. Optionally, the seating chart 338 may be updated or loaded when the user 140 changes the ticket type and/or quantity selected without initiating the ticket order with the POS system (e.g., the POS system 162A illustrated in FIG. 1) operated by the Exhibitor. In other words, when the user 140 changes one or more user selections, the user 140 is not required to reenter information that the user 140 already entered to view the updated seating chart 338.

Referring to FIG. 2A, in block 218 the application 112 receives the selections (e.g., showtime, ticket types, quantity, and seats) entered by the user 140 in block 216 and confirms them with the user 140. For example, the application 112 may display indications of these selections and ask the user 140 to confirm them. In block 218, the application 112 also transmits these selections to the API 122 (see FIGS. 1, 2B, 2E, and 7A-7C). The application 112 may also transmit identifications of the movie, date, and/or the Exhibitor to the API 122.

Referring to FIG. 2B, in block 220, the API 122 receives the selections and creates a ticket order based on the selections. The API 122 also communicates with the POS system (e.g., the POS system 162A illustrated in FIG. 1) of the Exhibitor and confirms seat availability.

Referring to FIG. 2C, in block 222 (see FIG. 2C), on the same theatre and showtime selection page 330 (see FIGS. 3B and 3C), the user 140 selects a checkout input 340 (e.g., labeled "Checkout CTA" in FIG. 3B).

Figure 3D:
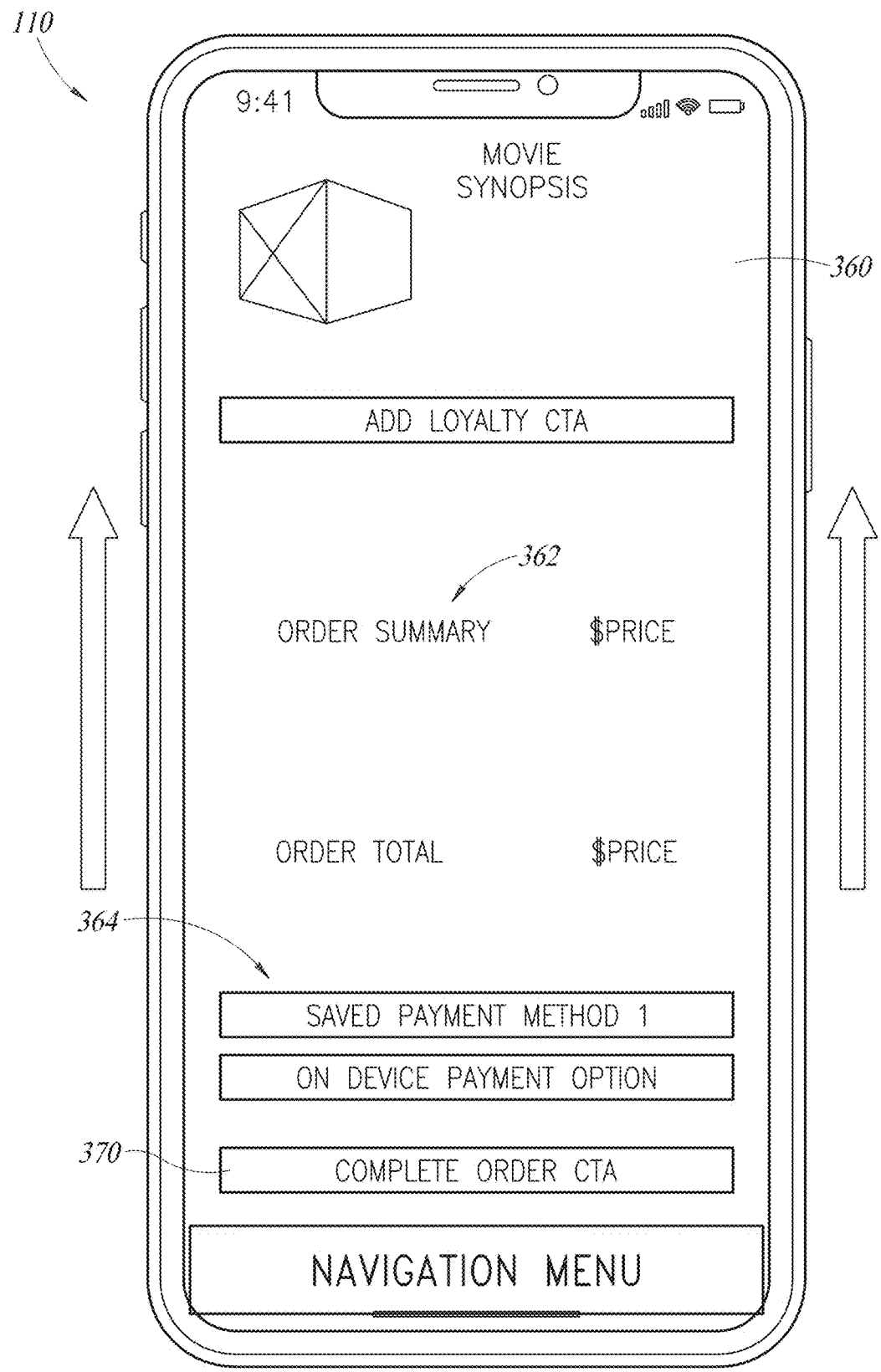
FIG. 3D is an illustration of an example purchase process page.

Next, in block 224, the application 112 scrolls the theatre and showtime selection page 330 (see FIGS. 3B and 3C) upwardly to display its lower portion, referred to as a purchase process page 360 (see FIG. 3D). Thus, after the user 140 selects (e.g., clicks on) the checkout input 340 (see FIG. 3B), the purchase process page 360 (see FIG. 3D), which provides a checkout view, scrolls up into the view of the user 140 and enables a condensed checkout process. This condensed checkout process is unique in the industry and allows the user 140 to complete a ticket order using an expeditious process flow.

As the application 112 is scrolling, the application 112 requests (or receives without having sent a request) relevant purchase options from the API 122 (see FIGS. 1, 2B, 2E, and 7A-7C). In block 226 (see FIG. 2B), the API 122 gathers and provides the relevant purchase options for the Exhibitor (e.g., loyalty specifics) to the application 112 in block 224.

Then, in block 228, the application 112 generates and displays a movie order summary 362 (see FIG. 3D) on the purchase process page 360 (see FIG. 3D) based at least in part on the relevant purchase options received from the API 122 (see FIGS. 1, 2B, 2E, and 7A-7C). The application 112 may request (or receive without having sent a request) relevant purchase options from the API 122. In block 226 (see FIG. 2B), the API 122 gathers and provides the relevant purchase options for the Exhibitor (e.g., loyalty specifics) to the application 112, which the application 112 receives in block 228.

In block 230, the application 112 displays one or more payment options 364 (see FIG. 3D) to the user 140 based at least in part on the relevant purchase options received from the API 122 (see FIGS. 1, 2B, 2E, and 7A-7C). Then, the user 140 selects one of the payment option(s) 364 (see FIG. 3D). The application 112 may request (or receive without having sent a request) relevant purchase options from the API 122 (see FIGS. 1, 2B, 2E, and 7A-7C). In block 226 (see FIG. 2B), the API 122 gathers and provides the relevant purchase options for the Exhibitor (e.g., loyalty specifics) to the application 112, which the application 112 receives in block 230.

In block 232, on the same purchase process page 360 (see FIG. 3D), the user 140 selects a purchase input 370 (e.g., labeled "Complete Order CTA" in FIG. 3D).

In block 234, the application 112 displays a success confirmation (not shown) or a failure confirmation (not shown). Before the application 112 displays the confirmation (not shown), the application 112 transmits payment information (e.g., associated with the selected one of the payment options 364 illustrated in FIG. 3D) to the API 122 (see FIGS. 1, 2B, 2E, and 7A-7C). Then, in block 236 (see FIG. 2B), the API 122 communicates with the payment processor service 150 (see FIG. 1), which processes the ticket order. As mentioned above, referring to FIG. 1, the payment processor service 150 is configured to communicate (1) funds or some other financial arrangement (e.g., made in advance), or (2) a refusal of funds to the server computing device 120. The API 122 is successful at processing the ticket order when the payment processor service 150 communicates the funds or some other financial arrangement to the API 122. On the other hand, the API 122 is not successful when the payment processor service 150 communicates a refusal of funds to the API 122. When the API 122 is not successful at processing the ticket order, in block 236 (see FIG. 2B), the API 122 communicates the failure to the application 112, which, in block 234 (see FIG. 2C), displays the failure confirmation to the user 140.

On the other hand, when the API 122 is successful at processing the ticket order, the API 122 has secured funds (or some other financial arrangement) for the ticket order. The API 122 communicates this success to the POS system (e.g., the POS system 162A illustrated in FIG. 1) associated with the Exhibitor. The POS system confirms that the ticket order is successful and stores a receipt for the ticket order in records maintained by the Exhibitor. Next, in block 236 (see FIG. 2B), the API 122 communicates the success to the application 112, which the application 112 receives in block 234 (see FIG. 2C). In other words, the API 122 attempts to display the success confirmation to the user 140. However, if the API 122 and/or the application 112 is/are unable to display the success confirmation to the user 140, the ticket order may nonetheless exist. The success confirmation displayed by the application 112 may function as a digital receipt or the application 112 may display a separate digital receipt for the transaction.

The API 122 may provide available order redemption options for the Exhibitor to the application 112. The application 112 may display the order redemption options to the user 140, who may choose one of the redemption options. Then, the API 122 may finalize the ticket order with the POS system associated with the Exhibitor. Next, the user 140 may redeem the movie ticket(s) at the Exhibitor for the selected movie, showtime, and seat(s). For example, the user 140 may redeem the movie ticket(s) by showing user identification, the digital receipt for the ticket(s), and the like to the Exhibitor. After block 234 (see FIG. 2C), the method 200 terminates.

As explained above, using prior art ticket purchasing systems, locating a user's desired seats may require the user to repeatedly select a different showtime and/or theatre location as well as repeatedly enter ticket type and quantity. Referring to FIG. 1, the system 100 avoids rerouting the user 140 through previously displayed pages and repeatedly requesting the same information because, in block 212 (see FIG. 2A), the application 112 displays the seating chart 338 (see FIG. 3B), before the user 140 enters the ticket type and quantity using the ticket type input(s) 334 (see FIG. 3B) and the ticket quantity input 336 (see FIG. 3B), respectively. Thus, the user 140 can explore seat availability before entering the ticket type and quantity. Additionally, referring to FIG. 3B, the theatre and showtime selection page 330 allows the user 140 to select a different showtime (at the same or a different theatre location) using the showtime input(s) 332, which will cause the seating chart 338 to be updated to show seat availability for the showtime selected. Thus, the theatre and showtime selection page 330 allows the user 140 to select seats, ticket type, and ticket quantity at the same time thereby avoiding the need to repeatedly enter the same information and/or be repeatedly routed to the same pages. Additionally, the user 140 may change the movie selected using the movie selection input 344 without having to revisit any previously viewed pages or reenter any information.

The theatre and showtime selection page 330 may include a filter input (not shown) that when activated by the user 140 causes the application 112 (see FIGS. 1, 2A, 2C, 2D, 2F, and 2G) to display only those showtimes for which seats are available in a preferred seating zone and/or a preferred time of day. Thus, by activating the filter input (not shown), the user 140 may avoid selecting undesirable showtimes and/or those showtimes for which only undesirable seats are available. In other words, the filter input (not shown) may help reduce the amount of time and/or effort required to locate and purchase desired tickets.

FIGS. 3A, 3B, and 3D illustrate exemplary embodiments of the landing page 310, the theatre and showtime selection page 330, and the purchase process page 360, respectively. In alternate embodiments, information displayed on each of the pages 310, 330, and 360 may be positioned at locations on the page other than those illustrated in the drawings. Further, in alternate embodiments, at least a portion of this information may be displayed on a different one or more of the pages 310, 330, and 360 other than the page on which that portion appears in the drawings.

Figure 2D:
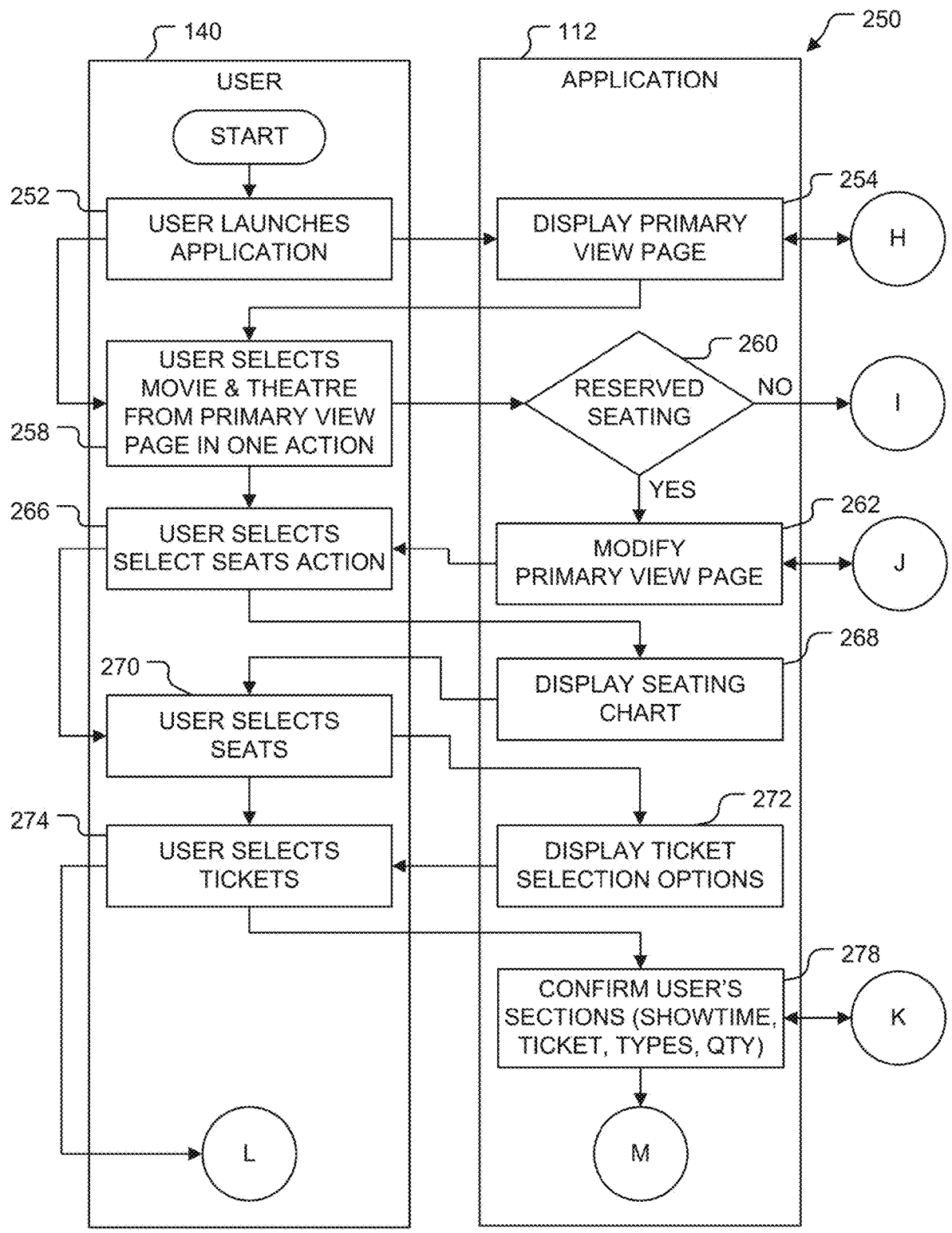
FIG. 2D is a first portion of a flow diagram of a second method performed by the example system of FIG. 1.
Figure 2E:
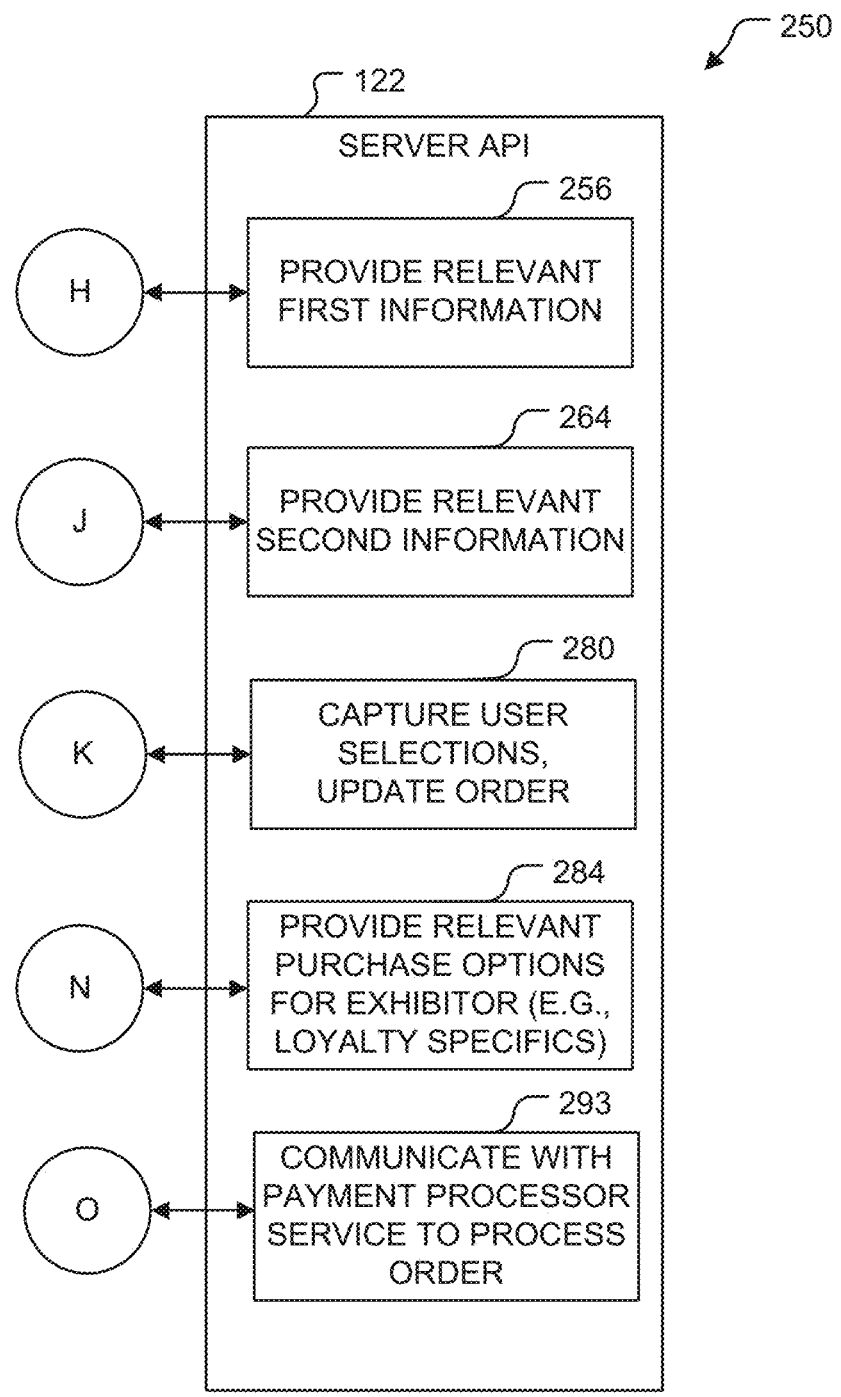
FIG. 2E is a second portion of the flow diagram of FIG. 2D.
Figure 4A:
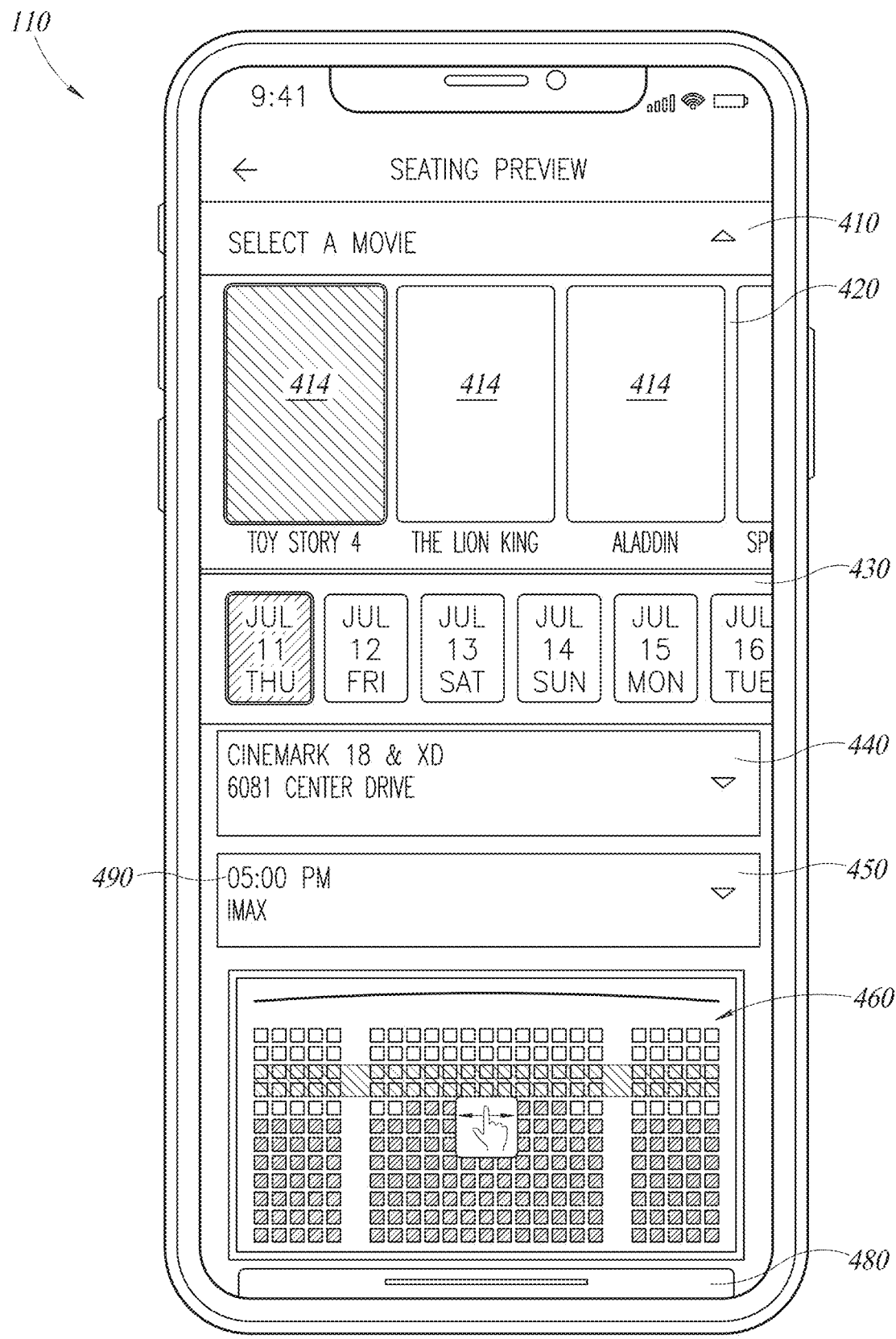
FIG. 4A is an illustration of a second embodiment of an example primary view page configured for a reserved seating scenario.

FIGS. 2D-2G illustrate a flow diagram of a second method 250 performed in part by the user 140, in part by the application 112, and in part by the API 122. Referring to FIG. 2D, in block 252, the user 140 launches the application 112 on the client computing device 110 (see FIGS. 1, 3A-4I, and 8). The application 112 provides user identification information (e.g., login information) to the API 122 that the API 122 uses to identify the user 140. Next, the user 140 optionally navigates to the primary view page 410 (see FIGS. 4A-4E, 4H, 8, and 11). In block 254, the application 112 displays the primary view page 410 (see FIGS. 4A-4E, 4H, 8, and 11). Referring to FIG. 4A, the primary view page 410 allows the user 140 (see FIGS. 1, 2A, 2C, 2D, 2F, 2G, and 3A-3C) to select a theatre location and a movie showing at the selected theatre location in one action (e.g., tap, click, and the like).

Referring to FIG. 1, as the application 112 is launching, the application 112 contacts the API 122 and requests the relevant first information. In block 256 (see FIG. 2E), the API 122 obtains the relevant first information (e.g., from the data store 170) and sends the relevant first information to the application 112, which uses the relevant first information to generate and display the primary view page 410 (see FIGS. 4A-4E, 4H, 8, and 11) in block 254 (see FIG. 2D).

Referring to FIG. 4A, the primary view page 410 includes a horizontally scrolling movie list 420, a horizontally scrolling date list 430, a theatre location user input 440, and a showtime user input 450. In the method 250 (see FIG. 2D-2G), the user 140 uses the theatre location user input 440 to select a particular theatre location (e.g., the Exhibitor). The user 140 (see FIGS. 1, 2A, 2C, 2D, 2F, 2G, and 3A-3C) uses the movie list 420 to select one of a plurality of movies 414 listed left to right (e.g., from most to least popular). Thus, the user 140 uses the movie list 420 to select a particular movie. The user 140 uses the showtime user input 450 to select a particular showtime. The user 140 uses the date list 430 to select a date from a plurality of dates (e.g., organized in an ascending order) for which the user 140 would like to purchase tickets. Thus, the user 140 uses the date list 430 to select a particular date. Both the movie and date selections are made from horizontally scrolling user inputs having the same horizontal usability pattern.

The relevant first information may identify the theatre locations (e.g., the personalized theatre locations described above) displayed by the theatre location user input 440, the movies displayed by the movie list 420, the dates displayed by the date list 430, and showtimes of the movies displayed by the movie list 420. In block 256 (see FIG. 2E), the API 122 provides the relevant first information to the application 112, which receives the relevant first information in block 254 (see FIG. 2D).

In block 258 (see FIG. 2D), the user 140 selects a movie and a theatre location in a single action by selecting the particular movie from the movie list 420. Referring to FIG. 4A, by selecting the particular movie from the movie list 420, the user 140 also selects the particular theatre location (as the Exhibitor), which is displayed by the theatre location user input 440.

Referring to FIG. 2D, in decision block 260, the application 112 receives the selection of the particular movie and Exhibitor from the user 140 and may optionally confirm the movie and theatre location selected by the user 140. For example, the application 112 may display indications of these selections and ask the user 140 to confirm them. In decision block 260, the application 112 determines whether seating for the particular movie showing at the Exhibitor may be reserved (a reserved seating scenario) or is general (a general seating scenario). The decision in decision block 260 is "YES," when the application 112 determines that the seating for the particular movie showing at the Exhibitor may be reserved. Otherwise, the decision in decision block 260 is "NO."

Figure 4B:
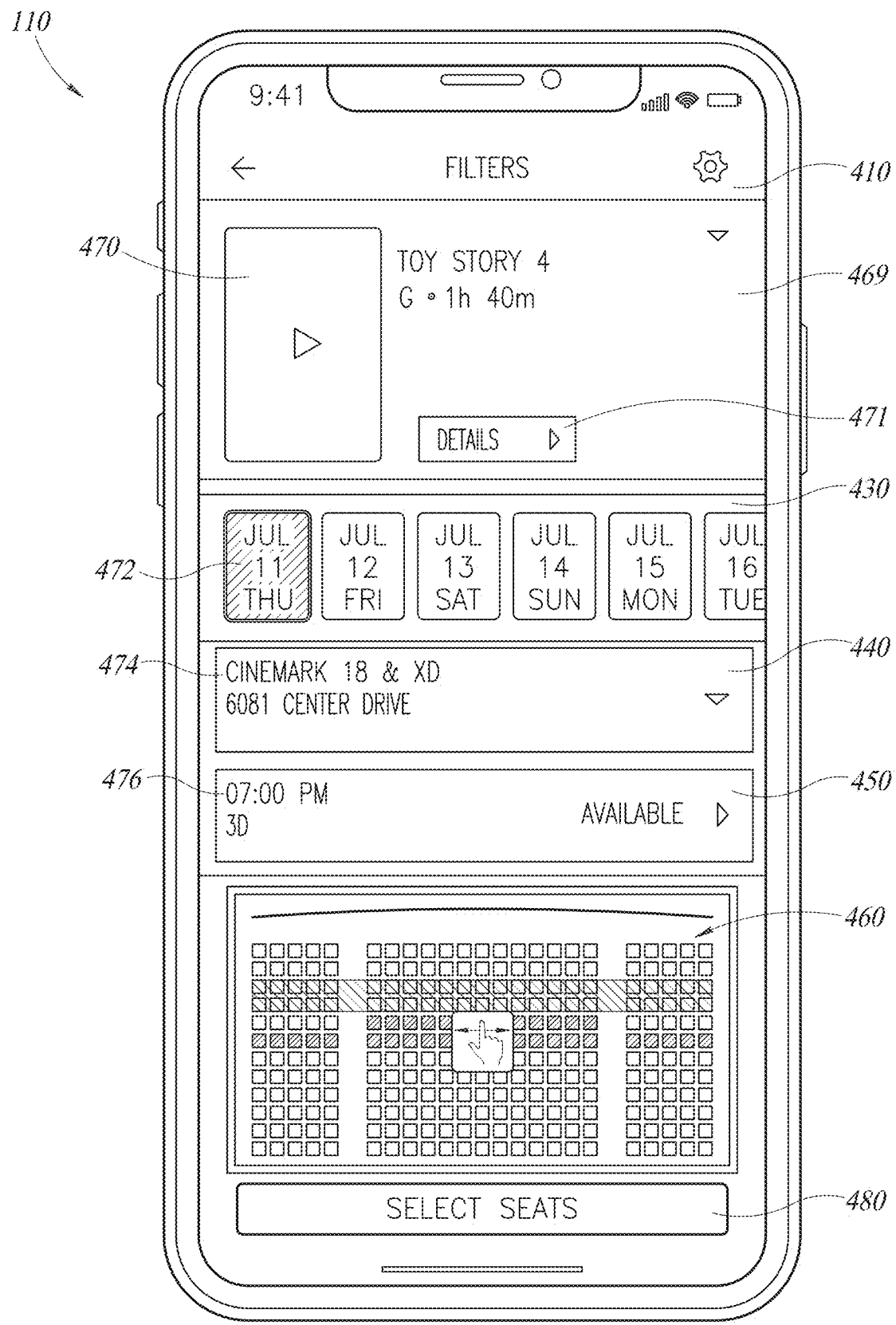
FIG. 4B is an illustration of the example primary view page of FIG. 4A configured for the reserved seating scenario after a user has selected a movie.

When decision in decision block 260 is "YES," in block 262, the application 112 may modify the primary view page 410 as shown in FIG. 4B. Referring to FIG. 4B, when the primary view page 410 is configured for the reserved seating scenario, the primary view page 410 displays a seat map preview 460 and a seat selection user input 480. The relevant first information received by the application 112 in block 254 (see FIG. 2D) may include information necessary to display the seat map preview 460.

Referring to FIG. 4B, which illustrates the primary view page 410 configured for the reserved seating scenario after the user 140 (see FIGS. 1, 2A, 2C, 2D, 2F, 2G, and 3A-3C) has selected one of the movies 414 (see FIGS. 4A and 11), the primary view page 410 may display a section 469. The section 469 displays an indication 470 (e.g., a movie poster) identifying the selected movie (e.g., "Toy Story 4"). The section 469 may include movie details, such as synopsis (truncated), run time (or movie duration), and rating. The section 469 may include a play icon. Optionally, the section 469 may display a selectable user input 471 that when selected displays a full screen view page (not shown) of information related to the selected movie (e.g., "Toy Story 4"). Alternatively, the section 469 may be selectable and the selectable user input 471 may be omitted. In such embodiments, if the user 140 selects (e.g., taps on) the section 469, the user 140 is presented with an expanded movie detail view (not shown) with additional information for the selected movie (e.g., Toy Story 4). The additional information includes a full synopsis, cast information, crew information, etc. The expanded movie detail view (not shown) may include the play icon (not shown). The user 140 may select (e.g., tap on) the play icon (not shown) on either the section 469 or the expanded movie detail view (not shown) to view the movie trailer for the selected movie.

The expanded movie detail view (not shown) may include the section 469. Below the section 469, the expanded movie detail view (not shown) includes a lower section (not shown) with a horizontal row of movie posters that the user 140 may swipe to view and select additional movies. Essentially, this feature may be characterized as being a convergence of the movie list 420 illustrated in FIG. 4A and the indication 470 illustrated in FIG. 4B. Included in this lower section (not shown) is an "All Movies" call to action or input (not shown). If a user selects the "All Movies" input (not shown), the user 140 is presented with a new view (not shown) that is a full screen presentation of a vertical list (not shown) of the movies 414. The user 140 may sort (e.g., alphabetically, by release date, etc.) and/or filter (e.g., by genre, rating, etc.) the movies 414 in the vertical list (not shown). When the user 140 selects a movie from the new view (not shown), the user 140 is redirected back to the primary view page 410 as shown in FIG. 4B, which automatically updates with information related to the selected movie.

Referring to FIG. 4B, whenever one of the movies 414 (see FIGS. 4A and 11) is selected on the primary view page 410, the application 112 (see FIGS. 1, 2A, 2C, 2D, 2F, and 2G) may automatically select default values in the date list 430, the theatre location user input 440, and the showtime user input 450. By way of non-limiting examples, today 472 may be selected as the default value in the date list 430, a previously selected theater 474 (e.g., "Cinemark 18 & XD") may be selected as the default value in the theatre location user input 440, and a next upcoming showtime 476 may be selected as the default value in the showtime user input 450. If the user 140 (see FIGS. 1, 2A, 2C, 2D, 2F, 2G, and 3A-3C) is an anonymous user, the default value selected in the theatre location user input 440 may be a location message (e.g., "select a theatre") that notifies the user 140 that the user 140 needs to use the theatre location user input 440 to select a theatre location, and the default value selected in the showtime user input 450 may be a showtime message (e.g., "select a showtime") that notifies the user 140 that the user 140 needs to use the showtime user input 450 to select a showtime. As shown in FIG. 4B, the selected date may be highlighted in the date list 430, the theatre location user input 440 may display the selected theatre location, and the showtime user input 450 may display the selected showtime.

Figure 4C:
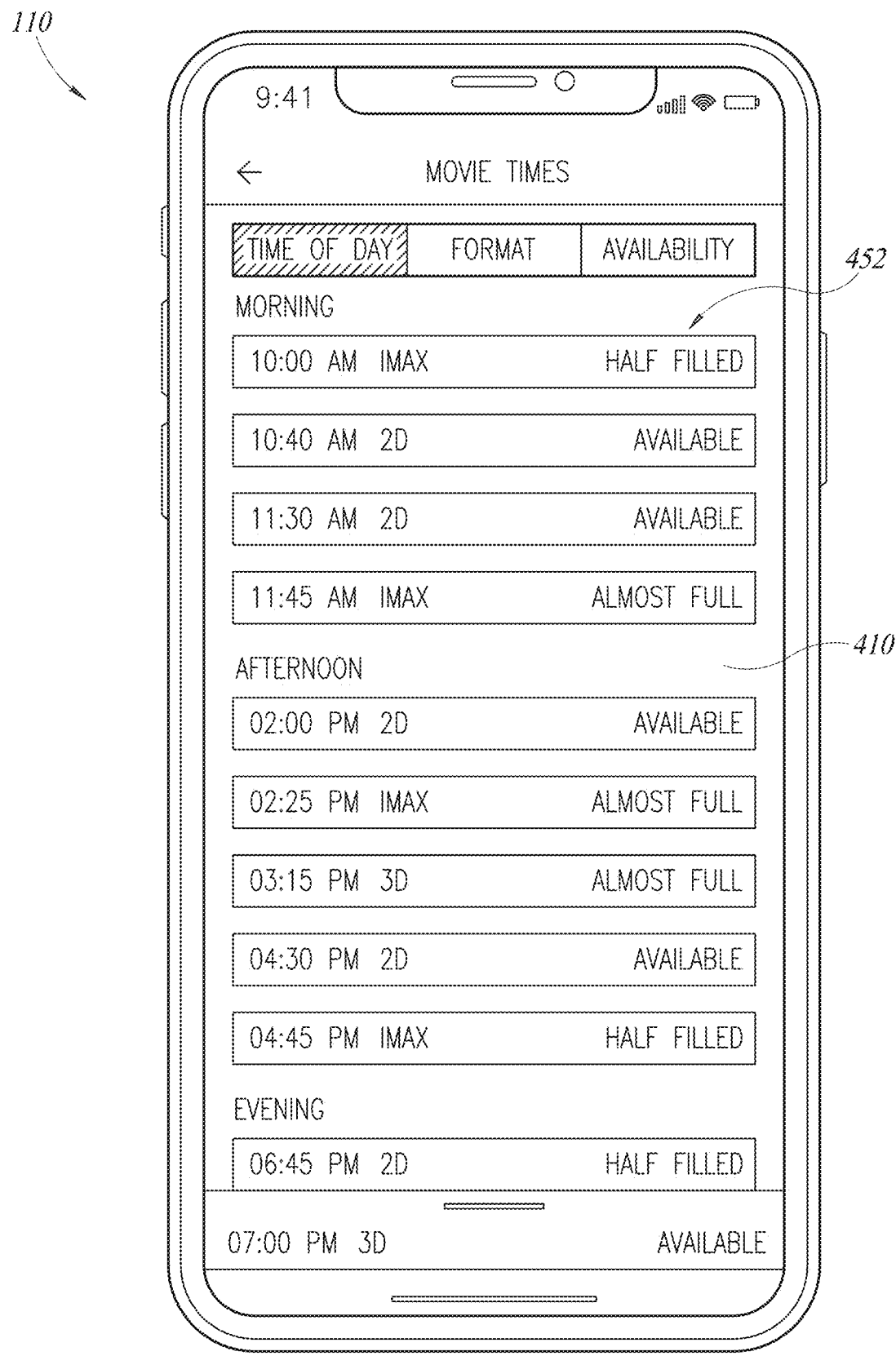
FIG. 4C is an illustration of the example primary view page of FIG. 4A displaying a first portion of an expanded showtime selection list.
Figure 4D:
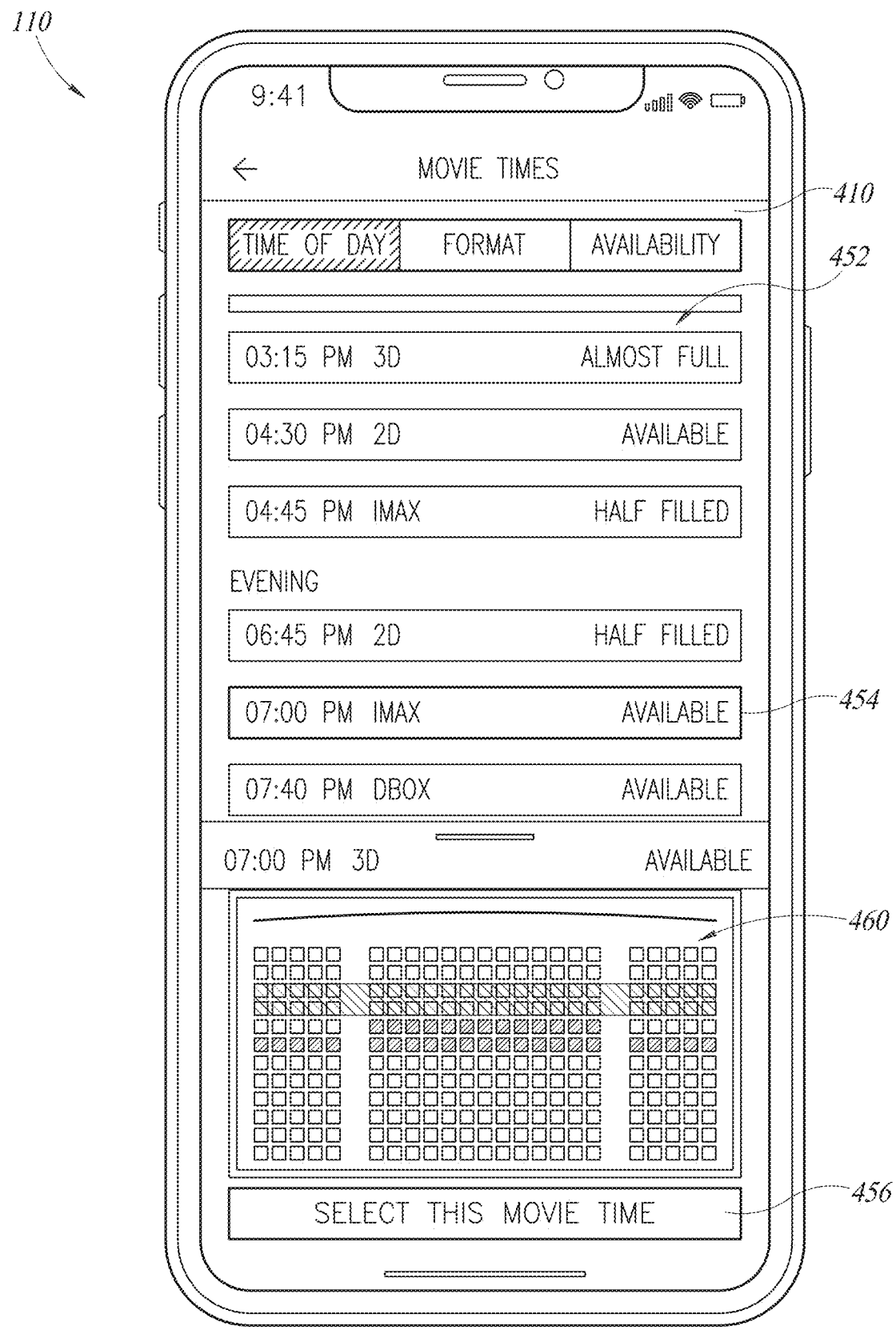
FIG. 4D is an illustration of the example primary view page of FIG. 4A displaying a second portion of the expanded showtime selection list.
Figure 4E:
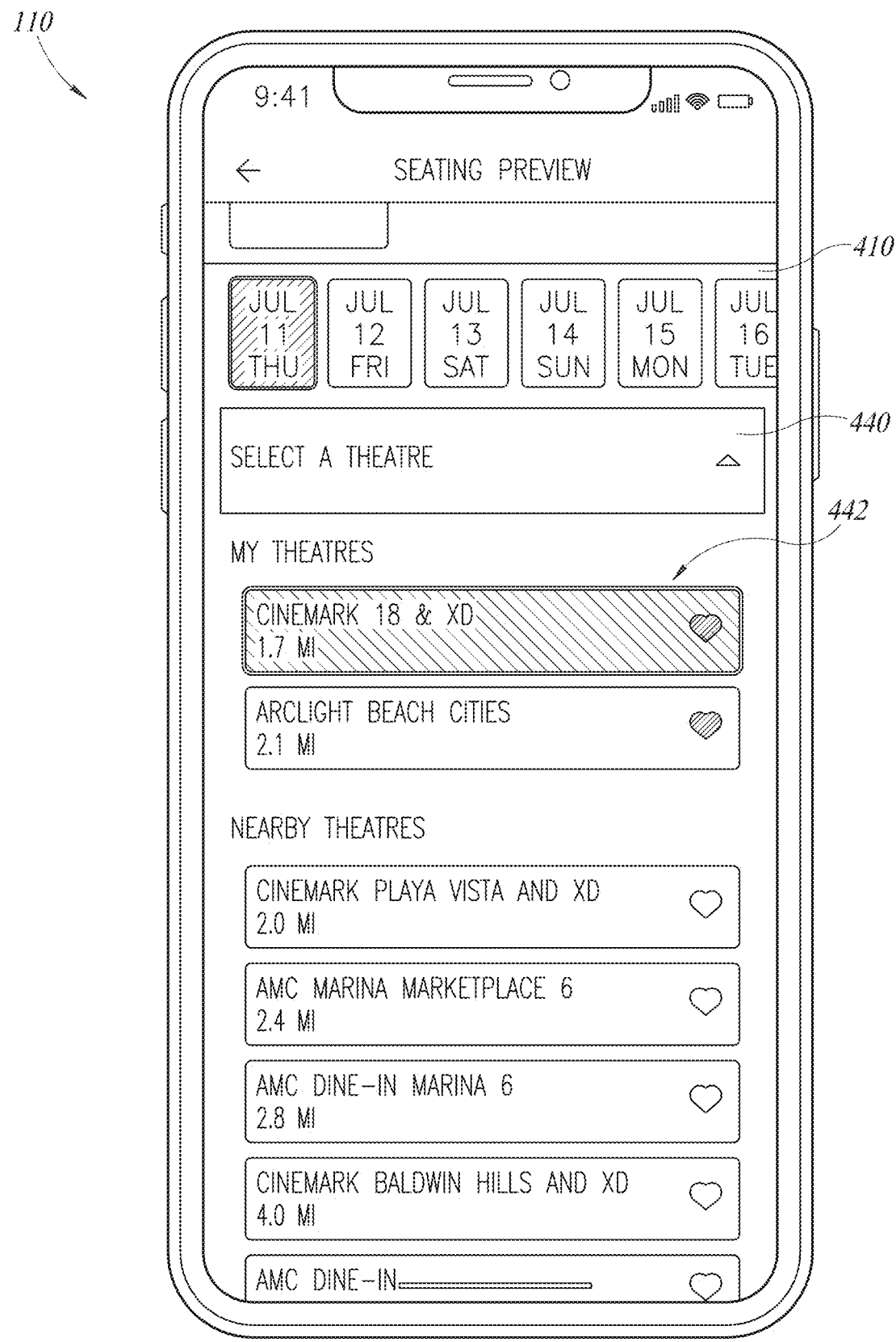
FIG. 4E is an illustration of the example primary view page of FIG. 4A displaying an expanded theatre selection list.

The user 140 (see FIGS. 1, 2A, 2C, 2D, 2F, 2G, and 3A-3C) can change the selected theatre location by selecting the theatre location user input 440, which as shown in FIG. 4E, causes the client computing device 110 to display an expanded theatre selection list 442 on the primary view page 410. The user 140 may select a particular theatre location from the theatre selection list 442, which, after having been selected, becomes the selected theatre location. Similarly, the user 140 can change the selected showtime by selecting the showtime user input 450, which as shown in FIGS. 4C and 4D, causes the client computing device 110 to display an expanded showtime selection list 452 on the primary view page 410.

Referring to FIG. 4C, the expanded showtime selection list 452 may allow the user 140 to select multiple showtimes via checkboxes or similar inputs. When the user 140 selects two or more showtimes, the primary view page 410 may display a call to action (e.g., a button) that when activated or selected compares these showtimes. When the user 140 activates or selects the call to action, the expanded showtime selection list 452 may be filtered to include only those selected showtimes allowing the user 140 to quickly toggle between these showtimes and view the seat map previews or swipe through the seat map previews to compare seating options.

Referring to FIG. 4D, the seat map preview 460 may be collapsed to make room for the showtime selection list 452. In such embodiments, if the user 140 (see FIGS. 1, 2A, 2C, 2D, 2F, 2G, and 3A-3C) taps a particular showtime 454 in the showtime selection list 452 for which seats may be reserved, the seat map preview 460 (e.g., displayed as a card) may be displayed (e.g., slide up from the bottom into view). Alternatively, the seat map preview 460 may be fixed in place and not collapse. The user 140 may select a selectable user input 456 that, when selected, makes the particular showtime 454 the selected showtime.

The primary view page 410 may be configured to function based on user gestures. For example, the primary view page 410 may display information for the next showtime after the selected showtime when the user 140 swipes right on a touchscreen (e.g., the display device 530 illustrated in FIG. 5, the display device 47 illustrated in FIG. 6, and the like) of the client computing device 110. Similarly, the primary view page 410 may display information for the showtime planned before the selected showtime when the user 140 swipes left on the touchscreen of the client computing device 110.

The primary view page 410 allows the user 140 to select different values for the user inputs which allows different theatre locations, movies, dates, and showtimes to be readily compared to one another by the user 140, which is unique in this industry. Referring to FIG. 1, all other user interfaces in the industry require the user 140 to go back to a theatre selection screen if a showtime or seating availability does not match what the user 140 is looking for. This wastes the user's time and causes additional processing by the server computing device 120 and additional traffic over the network 130. Thus, the system 100 avoids these problems.

Returning to FIG. 2D, as the application 112 is modifying the primary view page 410 (see FIGS. 4A-4E, 4H, 8, and 11) in block 262, the application 112 contacts the API 122 (see FIGS. 1, 2B, 2E, and 7A-7C) and requests the relevant second information. In block 264 (see FIG. 2E), the API 122 obtains the relevant second information (e.g., from the data store 170 illustrated in FIG. 1) and sends the relevant second information to the application 112, which uses the relevant second information to modify the primary view page 410 (see FIGS. 4A-4E, 4H, 8, and 11).

The relevant second information may identify showtimes for the movie selected in block 258. Thus, referring to FIG. 2E, the API 122 may perform the block 264 each time the user 140 (see FIGS. 1, 2A, 2C, 2D, 2F, 2G, and 3A-3C) changes the Exhibitor using the theatre location user input 440 and/or the date using the date list 430.

The relevant second information received by the application 112 in block 254 (see FIG. 2D) may include information necessary to display the seat map preview 460. For example, after the user 140 (see FIGS. 1, 2A, 2C, 2D, 2F, 2G, and 3A-3C) selects one of the showtimes (e.g., using the showtime user input 450), the application 112 may request a reserved seating seat map from the API 122 (e.g., in block 264) for the selected showtime. Thus, the API 122 may perform the block 264 each time the user 140 (see FIGS. 1, 2A, 2C, 2D, 2F, 2G, and 3A-3C) changes the showtime selection.

Alternatively, the relevant second information may include reserved seating seat maps associated with at least a portion of the showtimes for the selected movie at one or more of the theatre locations displayed by the theatre location user input 440. These reserved seating seat maps allow the application 112 to quickly display seat availability to the user 140. Those reserved seating seat maps related to showtimes other than the selected showtime at the Exhibitor may be stored or cached until one of these alternate showtimes is selected. By way of a non-limiting example, the relevant second information may include a reserved seating seat map for each showtime of the selected movie at the Exhibitor. The application 112 may request a reserved seating seat map from the API 122 (e.g., in block 264 illustrated in FIG. 2E) whenever the user 140 selects a showtime for which a reserved seating seat map has not been downloaded to the application 112 by the API 122 (e.g., in the relevant second information). At least some of the reserved seating seat maps may download as part of a background process while the modified primary view page 410 (see FIGS. 4A-4E, 4H, 8, and 11) is being displayed.

By way of yet another non-limiting example, the relevant second information may identify showtimes for a plurality of movies, including the movie selected in block 258 (see FIG. 2D) or using the movie list 420, and reserved seating seat maps associated with each of the plurality of movies. By way of a non-limiting example, the plurality of movies may include the movies playing at the Exhibitor. Information related to movies other than the selected movie may be stored or cached until one of these movies and a showtime associated with the movie are selected. When this occurs, the seat map preview 460 may be updated using the reserved seating seat map associated with the newly selected movie, the selected showtime, the selected date, and the selected theatre location. In other words, the application 112 may pre-load or pre-fetch at least some information. At least some of the pre-loaded or pre-fetched information may be downloaded as part of a background process while the modified primary view page 410 (see FIGS. 4A-4E, 4H, 8, and 11) is being displayed.

Referring to FIG. 4B, the reserved seating seat map associated with the selected movie, the selected showtime, the selected date, and the selected theatre location is used to generate and display the seat map preview 460, which illustrates seats that are available to be reserved for the selected movie at the selected showtime playing at the Exhibitor.

The seat map preview 460 may be updated or loaded when the user 140 changes the selected showtime (e.g., using the showtime user input 450, a gesture, and the like) without initiating the ticket order with the POS system (e.g., the POS system 162A illustrated in FIG. 1) operated by the Exhibitor. In other words, when the user 140 changes one or more user selections, the user 140 is not required to reenter information that the user 140 already entered to view the updated seat map preview 460.

Figure 4F:
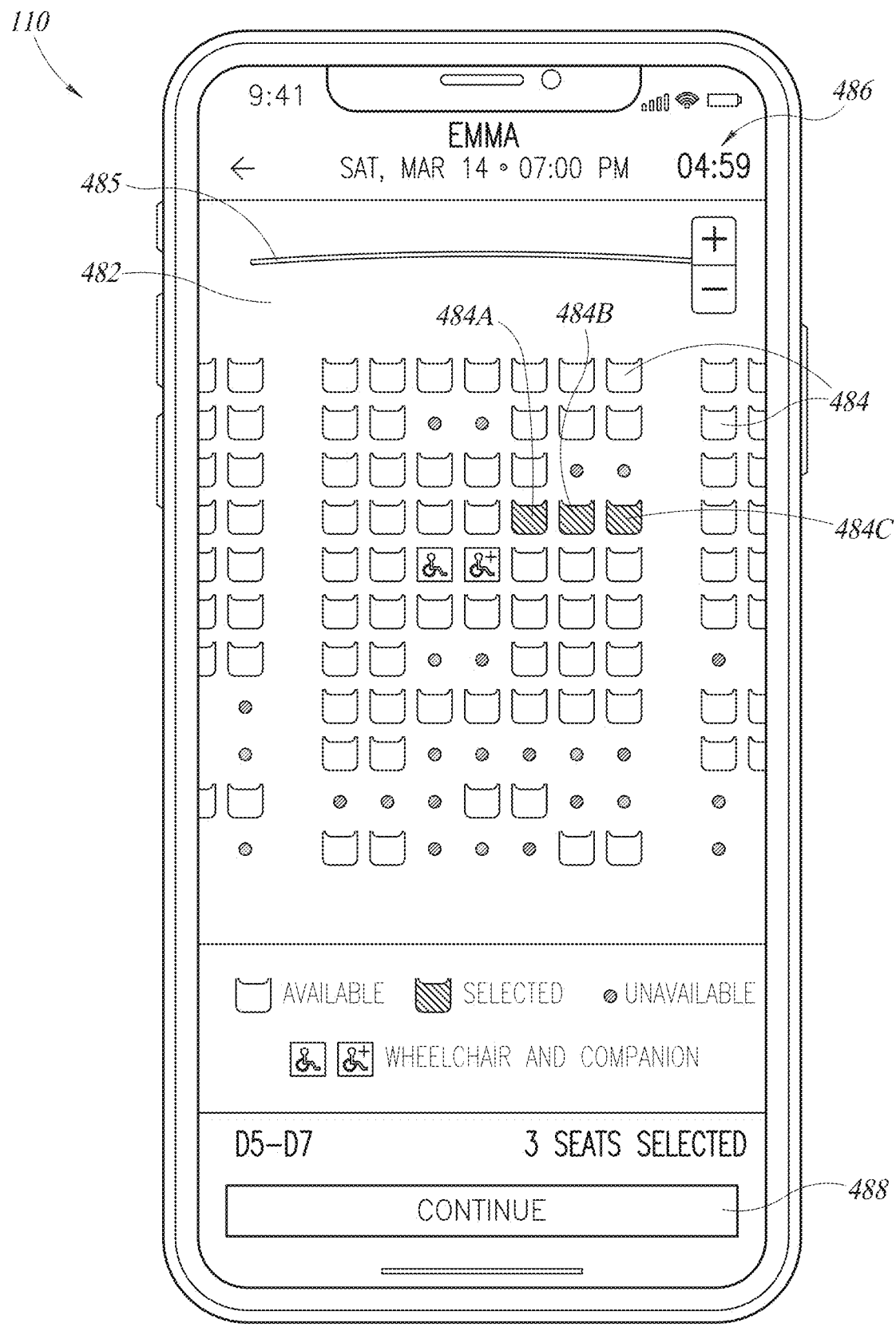
FIG. 4F is an illustration of an example seat selection page.

In block 266 (see FIG. 2D), the user 140 selects the seat selection user input 480 displayed on the modified primary view page 410 illustrated in FIG. 4B. Next, in block 268 (see FIG. 2D), the application 112 displays a seat selection page 482 (see FIG. 4F), which may be displayed on a portion of the primary view page 410. Referring to FIG. 4F, the seat selection page 482 depicts an auditorium showing the selected movie, at the Exhibitor, at the selected showtime, and on the selected date. In other words, the seat selection page 482 depicts visual representations 484 of the seats actually present at the auditorium. The seat selection page 482 may depict a visual representations 485 of the screen. The seat selection page 482 displays a timer 486 illustrating an amount of time during which the user 140 can select seats. The seat selection page 482 includes an input 488 (labeled "Continue" in FIG. 4F).

In block 270 (see FIG. 2D), the user 140 selects seats using the seat selection page 482. The user 140 can select as many seats (depicted by seat visual representations 484) as allowed by the theatre's POS (e.g., the POS 162A illustrated in FIG. 1). For example, in FIG. 4F, the user 140 has selected three seats represented by seat visual representations 484A-484C. The limit on the number of seats that may be selected by the user 140 is provided by the API 122 (e.g., in the relevant second information). After the user 140 has completed selecting seats, the user 140 selects (e.g., clicks on, taps, and the like) the input 488.

Figure 4G:
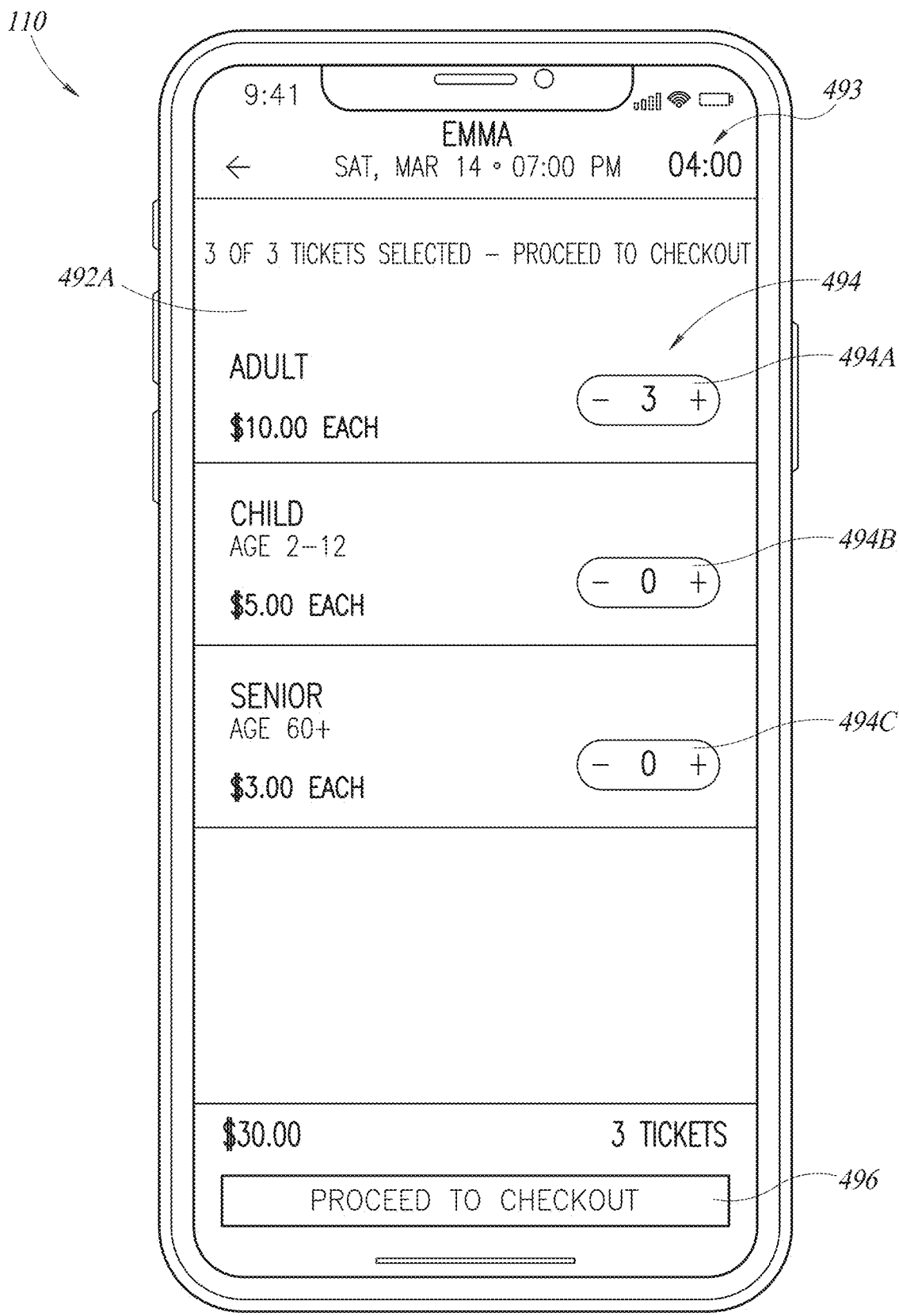
FIG. 4G is an illustration of an example ticket selection page configured for the reserved seating scenario.

Next, referring to FIG. 2D, in block 272, the application 112 displays a ticket selection page 492A (see FIG. 4G), which may be displayed on a portion of the primary view page 410. Referring to FIG. 4G, the ticket selection page 492A includes user inputs 494 that the user 140 may use to select one or more tickets for purchase. In the example illustrated, the user inputs 494 include a first user input 494A indicating a number of adult tickets, a second user input 494B indicating a number of child tickets, and a third user input 494C indicating a number of senior tickets that the user 140 would like to purchase. Thus, in this example, there are three different ticket types, adult, child, and senior. In other words, the user inputs 494 allow the user 140 to select the appropriate ticket types (e.g., adult, child, or senior) and their associated quantities. The ticket selection page 492A displays a timer 493 displaying an amount of time during which the API 122 will hold the seats selected in block 270 for the user 140. The ticket selection page 492A includes a user input 496 (labeled "Proceed to Checkout" in FIG. 4G). The user 140 may select the user input 496 when the user 140 wishes to purchase the tickets identified on the ticket selection page 492A for the seats selected in block 270 (see FIG. 2D).

In block 274 (see FIG. 2D), the user 140 uses the user inputs 494 to specify a number of each ticket type the user 140 would like to purchase and selects the user input 496.

Referring to FIG. 2D, in block 278, the application 112 receives the selections (e.g., ticket types and quantity) entered by the user 140 in block 274 in addition to information provided previously to the application 112 (e.g., Exhibitor, movie, date, showtime, and seats) in blocks 260, 268, and 272 and confirms this information with the user 140. For example, the application 112 may display indications of these selections and ask the user 140 to confirm them. In block 278, the application 112 also transmits these selections to the API 122 (see FIGS. 1, 2B, 2E, and 7A-7C). The application 112 may also transmit identifications of the movie, date, and/or the Exhibitor to the API 122.

In block 280 (see FIG. 2E), the API 122 receives the selections and creates a ticket order based on the selections. The API 122 also communicates with the POS system (e.g., the POS system 162A illustrated in FIG. 1) of the Exhibitor and confirms seat availability.

Figure 2F:
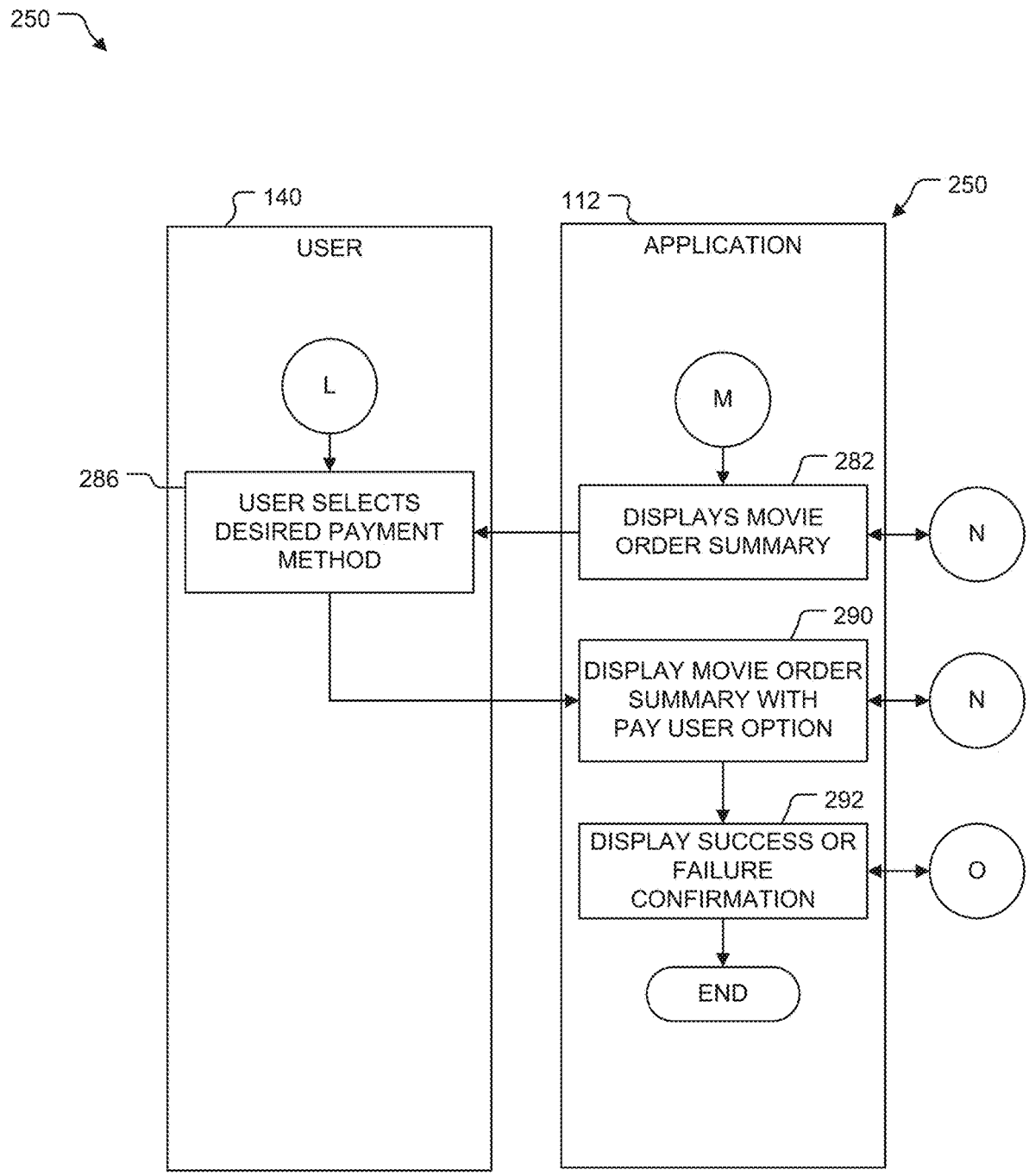
FIG. 2F is a third portion of the flow diagram of FIG. 2D.

Then, referring to FIG. 2F, in block 282, the application 112 generates and displays the movie order summary 362 (see FIG. 3D) on the purchase process page 360 (see FIG. 3D) based at least in part on the relevant purchase options received from the API 122 (see FIGS. 1, 2B, 2E, and 7A-7C). As the application 112 is generating the purchase process page 360 (see FIG. 3D), the application 112 requests (or receives without having sent a request) relevant purchase options from the API 122. In block 284 (see FIG. 2E), the API 122 gathers and provides the relevant purchase options for the Exhibitor (e.g., loyalty specifics) to the application 112 in block 282.

In the present embodiment, referring to FIG. 3D, the payment option(s) 364 may include one or more user inputs (not shown) for entering a new payment method, one or more selectable previously saved payment methods, and a login option if the user 140 is not presently logged in. Optionally, the payment option(s) 364 may include a selectable user input (not shown) that causes the application 112 to generate and display a payment options page (not shown) configured to allow the user 140 to add a new payment method or login to retrieve a saved payment method if the user 140 has not already logged in. Optionally, the purchase process page 360 may have an edit payment method user input (not shown) that the user 140 may select to edit one or more of the previously saved payment method(s). When the user 140 selects the edit payment method user input (not shown), the application 112 may generate and display the payment options page (not shown).

Referring to FIG. 2F, once the user 140 has added or retrieved the desired payment method, in block 290, the application 112 displays the movie order summary 362 (see FIG. 3D) on the purchase process page 360 (see FIG. 3D), which includes a pay call to action or pay user input (e.g., the purchase input 370). Optionally, before block 286, the purchase process page 360 (see FIG. 3D) may include the pay user input (e.g., the purchase input 370) in an inactive state and, after the user 140 selects the desired payment method in block 286, the application 112 displays the pay user input (not shown) in an active state. In block 286, the user 140 selects the purchase input 370 (see FIG. 3D).

In block 292, the application 112 displays a success confirmation (not shown) or a failure confirmation (not shown). Before the application 112 displays the confirmation (not shown), the application 112 transmits payment information (e.g., associated with the selected one of the payment options 364 illustrated in FIG. 3D) to the API 122 (see FIGS. 1, 2B, 2E, and 7A-7C). Then, in block 293 (see FIG. 2E), the API 122 communicates with the payment processor service 150 (see FIG. 1), which processes the ticket order. As mentioned above, referring to FIG. 1, the payment processor service 150 is configured to communicate (1) funds or some other financial arrangement (e.g., made in advance), or (2) a refusal of funds to the server computing device 120. The API 122 is successful at processing the ticket order when the payment processor service 150 communicates the funds or some other financial arrangement to the API 122. On the other hand, the API 122 is not successful when the payment processor service 150 communicates a refusal of funds to the API 122. When the API 122 is not successful at processing the ticket order, in block 293 (see FIG. 2E), the API 122 communicates the failure to the application 112, which, in block 292 (see FIG. 2F), displays the failure confirmation to the user 140.

On the other hand, when the API 122 is successful at processing the ticket order, the API 122 has secured funds (or some other financial arrangement) for the ticket order. The API 122 communicates this success to the POS system (e.g., the POS system 162A illustrated in FIG. 1) associated with the Exhibitor. The POS system confirms that the ticket order is successful and stores a receipt for the ticket order in records maintained by the Exhibitor. Next, in block 293 (see FIG. 2E), the API 122 communicates the success to the application 112, which the application 112 receives in block 292 (see FIG. 2F). In other words, the API 122 attempts to display the success confirmation to the user 140. However, if the API 122 and/or the application 112 is/are unable to display the success confirmation to the user 140, the ticket order may nonetheless exist. The success confirmation displayed by the application 112 may function as a digital receipt or the application 112 may display a separate digital receipt for the transaction.

The API 122 may provide available order redemption options for the Exhibitor to the application 112. The application 112 may display the order redemption options to the user 140, who may choose one of the redemption options. Then, the API 122 may finalize the ticket order with the POS system associated with the Exhibitor. Next, the user 140 may redeem the movie ticket(s) at the Exhibitor for the selected movie, showtime, and seat(s). For example, the user 140 may redeem the movie ticket(s) by showing user identification, the digital receipt for the ticket(s), and the like to the Exhibitor. After block 292 (see FIG. 2F), the method 200 terminates.

Figure 4H:
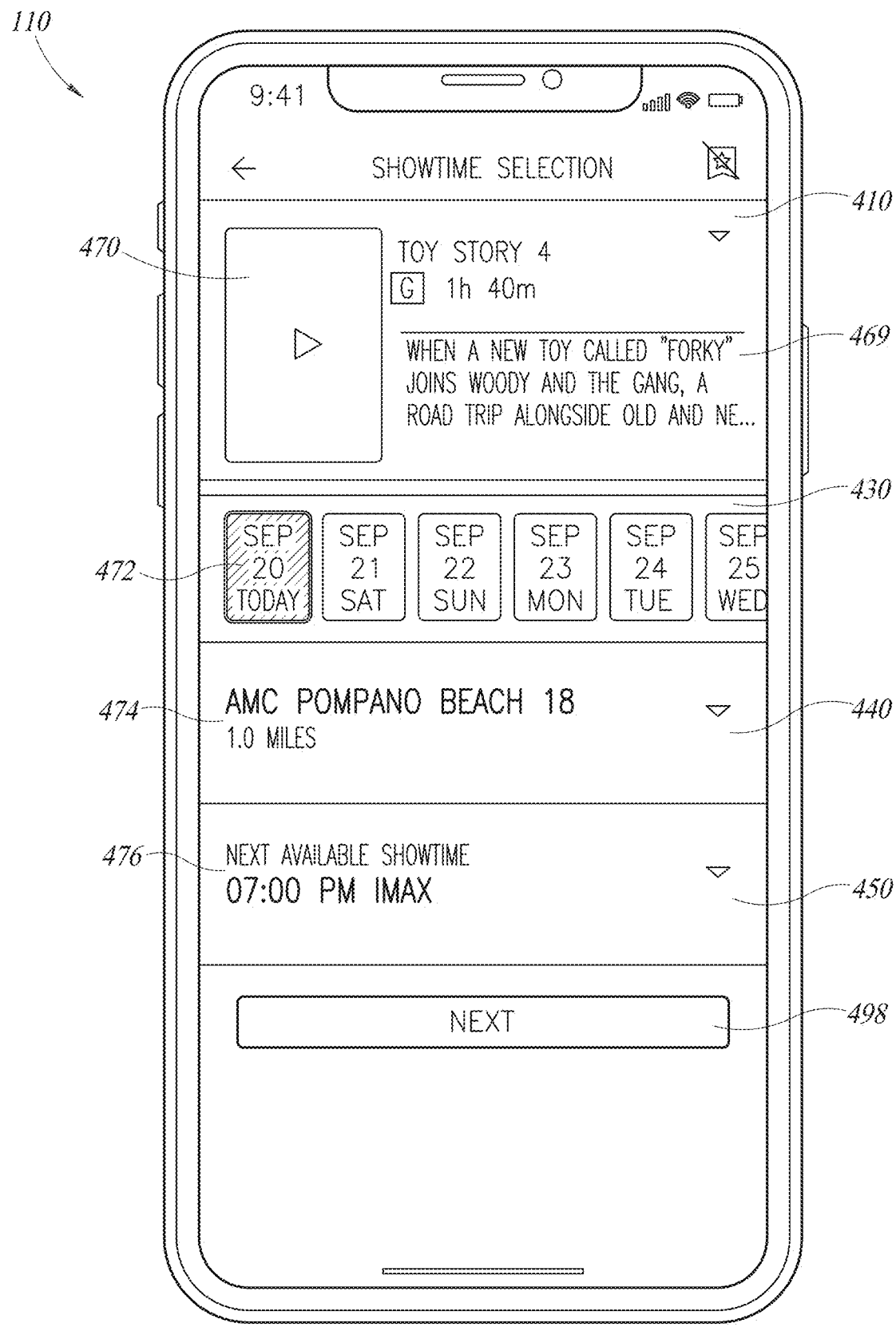
FIG. 4H is an illustration of the example primary view page of FIG. 4A configured for a general seating scenario after a user has selected a movie.

Because seats cannot be reserved in the general seating scenario, the seat map preview 460 (see FIGS. 4A, 4B, and 4D) may be used only for reserved seating scenarios. Thus, referring to FIG. 2D, when decision in decision block 260 is "NO," the seat map preview 460 may be collapsed or omitted. When decision in decision block 260 is "NO," in block 294 of FIG. 2G, the application 112 may modify the primary view page 410 as shown in FIG. 4H. Referring to FIG. 4H, the primary view page 410 includes the section 469 (with the indication 470), the horizontally scrolling date list 430, the theatre location user input 440, the showtime user input 450, and a selectable next user input 498 (e.g., a button).

Returning to FIG. 2G, as the application 112 is modifying the primary view page 410 (see FIGS. 4A-4E, 4H, 8, and 11) in block 294, the application 112 contacts the API 122 (see FIGS. 1, 2B, 2E, and 7A-7C) and requests the relevant second information. In block 264 (see FIG. 2E), the API 122 obtains the relevant second information (e.g., from the data store 170 illustrated in FIG. 1) and sends the relevant second information to the application 112, which uses the relevant second information to modify the primary view page 410 shown in FIG. 4H.

In block 295, the user 140 selects the next user input 498 (see FIG. 4H).

Next, in block 296, the application 112 displays a ticket selection page 492B (see FIG. 4I), which may be displayed on a portion of the primary view page 410. The ticket selection page 492B is substantially identical to the ticket selection page 492A but the ticket selection page 492B omits the timer 493. Thus, the ticket selection page 492B includes the user inputs 494 (e.g., the first, second, and third user inputs 494A-494C) and the user input 496 (labeled "Proceed to Checkout" in FIG. 4B). The user 140 may select the user input 496 when the user 140 wishes to purchase the tickets identified on the ticket selection page 492B.

In block 297, the user 140 uses the user inputs 494 to specify a number of each ticket type the user 140 would like to purchase and selects the user input 496.

In block 298 (see FIG. 2D), the application 112 receives the selections (e.g., ticket types and quantity) entered by the user 140 in block 297 (see FIG. 2G) in addition to information provided previously to the application 112 (e.g., Exhibitor, movie, date, and showtime) in blocks 260 and 296 (see FIGS. 2D and 2G) and confirms this information with the user 140. For example, the application 112 may display indications of these selections and ask the user 140 to confirm them. In block 298 (see FIG. 2G), the application 112 also transmits these selections to the API 122 (see FIGS. 1, 2B, 2E, and 7A-7C). The application 112 may also transmit identifications of the movie, date, and/or the Exhibitor to the API 122.

In block 280 (see FIG. 2E), the API 122 receives the selections and creates a ticket order based on the selections. The API 122 also communicates with the POS system (e.g., the POS system 162A illustrated in FIG. 1) of the Exhibitor and confirms seat availability.

Figure 2G:
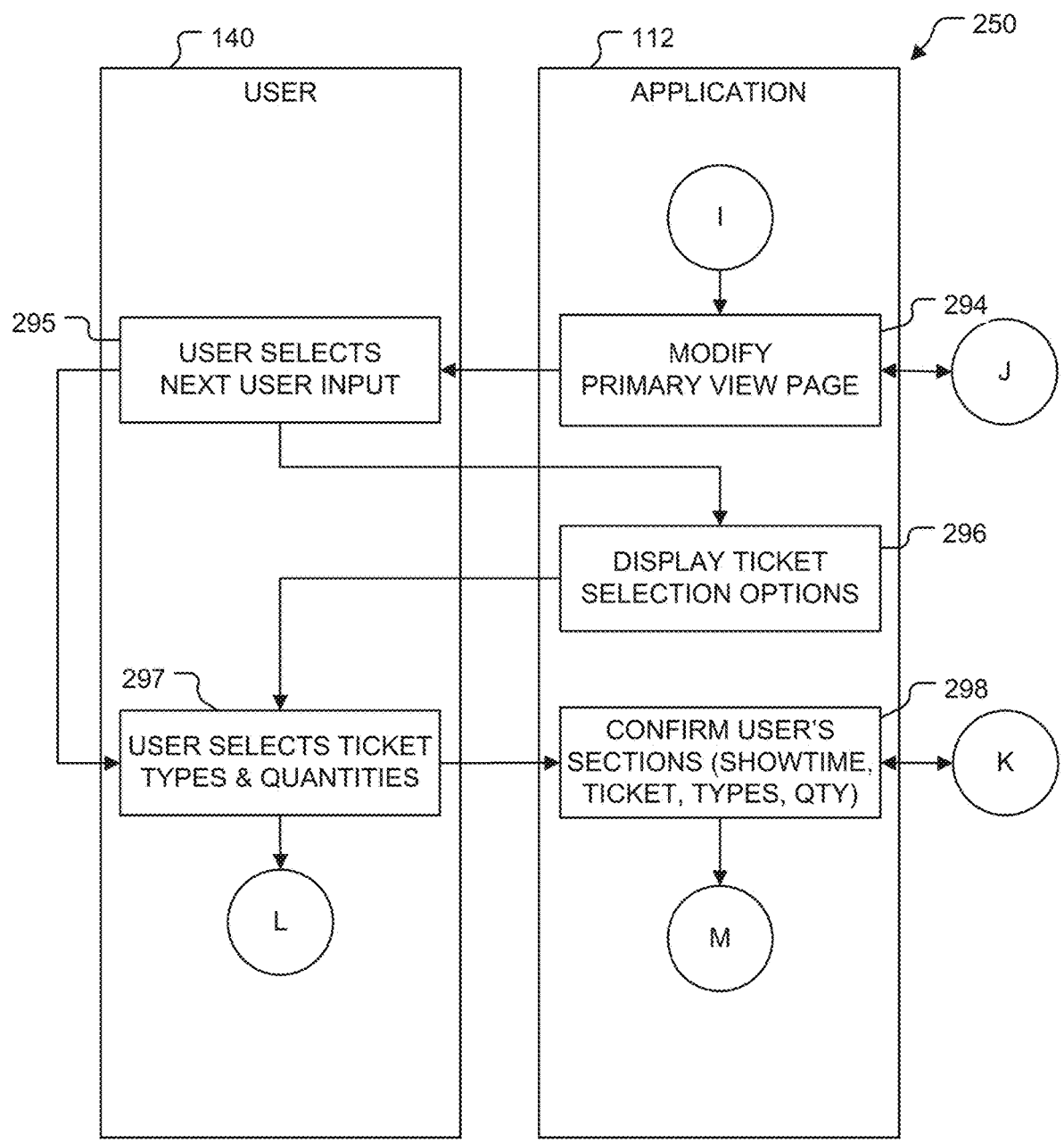
FIG. 2G is a fourth portion of the flow diagram of FIG. 2D.

Then, the application 112 advances to block 282 (see FIG. 2F) after block 298 (see FIG. 2G) and the user 140 advances to block 286 (see FIG. 2F) after block 297 (see FIG. 2G).

For reserved seating scenarios, the seat map preview 460 displays a seat map generated by the application 112 (see FIGS. 1, 2A, 2C, 2D, 2F, and 2G) and/or the ticket processing application 128 (see FIG. 1). Returning to FIG. 4B, the seat map preview 460 is displayed (e.g., at the bottom of the primary view page 410) when the movie, date, theatre location, and showtime have been selected either by the user 140 (see FIGS. 1, 2A, 2C, 2D, 2F, 2G, and 3A-3C) or automatically by the application 112 (see FIGS. 1, 2A, 2C, 2D, 2F, and 2G). The seat map preview 460 can be swiped left or right to preview seat maps generated for different showtimes for the selected combination of the movie and theatre location. For example, swiping right may cause the seat map preview 460 to display a seat map for a next showtime and swiping left may cause the seat map preview 460 to display a seat map for a previous showtime. The user 140 can tap on the seat selection user input 480 or the seat map preview 460 to view a full screen seat map (e.g., the visual representations 484 displayed on the seat selection page 482 illustrated in FIG. 4F) and select seats from that seat map. In this manner, the user 140 may reserve particular seats.

Figure 7A:
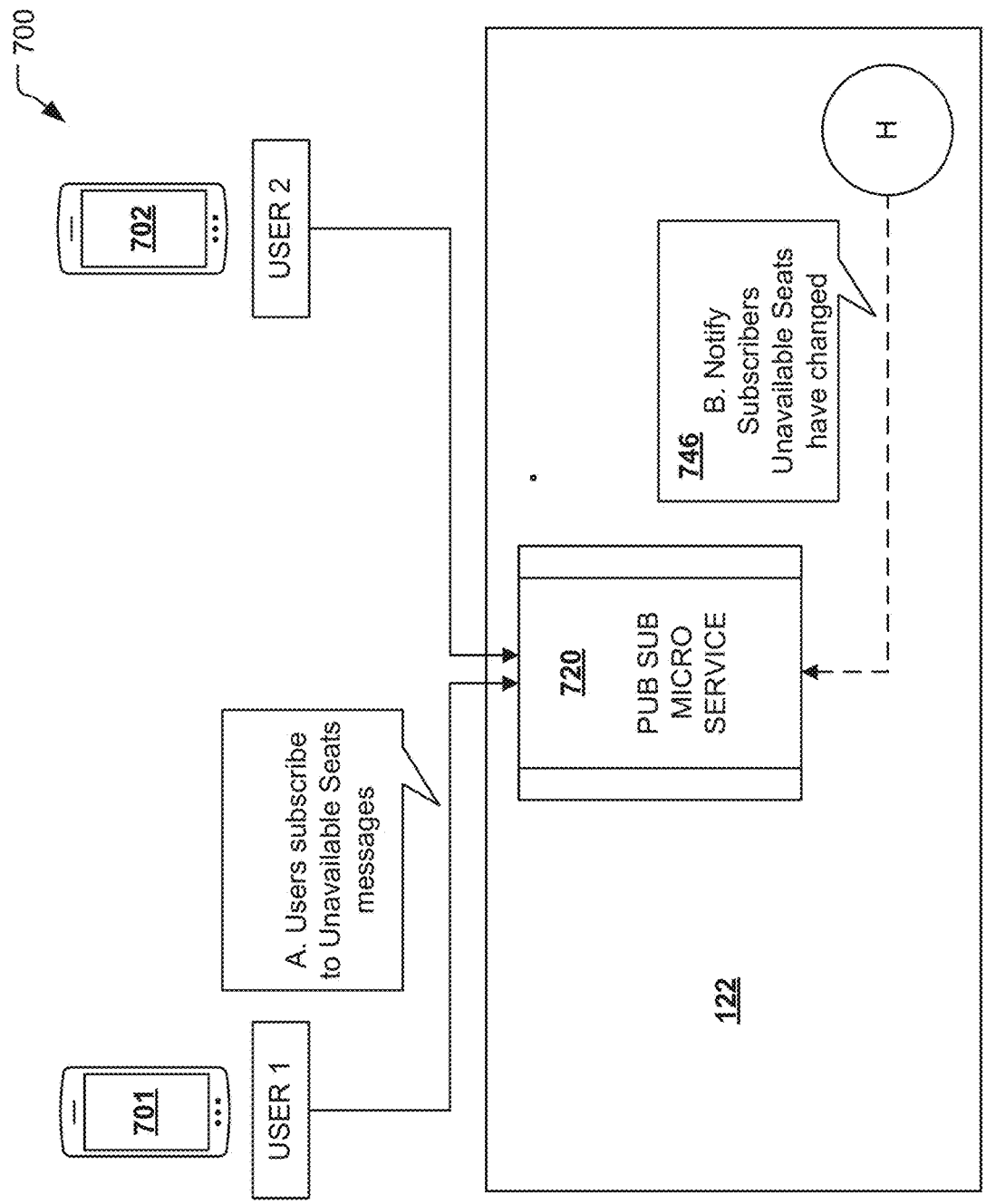
FIG. 7A is a first portion of a flow diagram of a method performed by the system of FIG. 1 that implements pre-loading or pre-fetching seat map information.
Figure 7B:
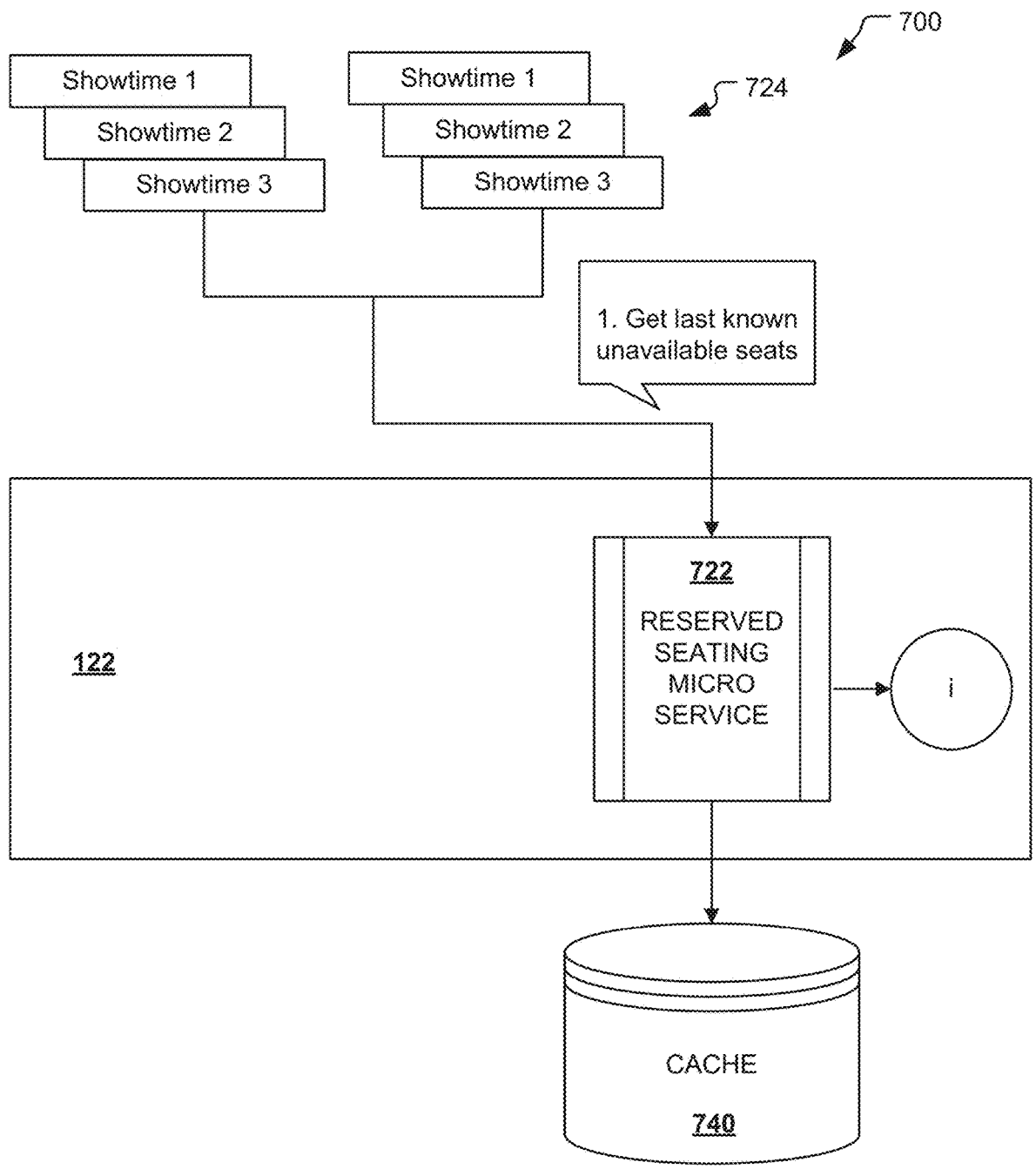
FIG. 7B is a second portion of the flow diagram of FIG. 7A.
Figure 7C:
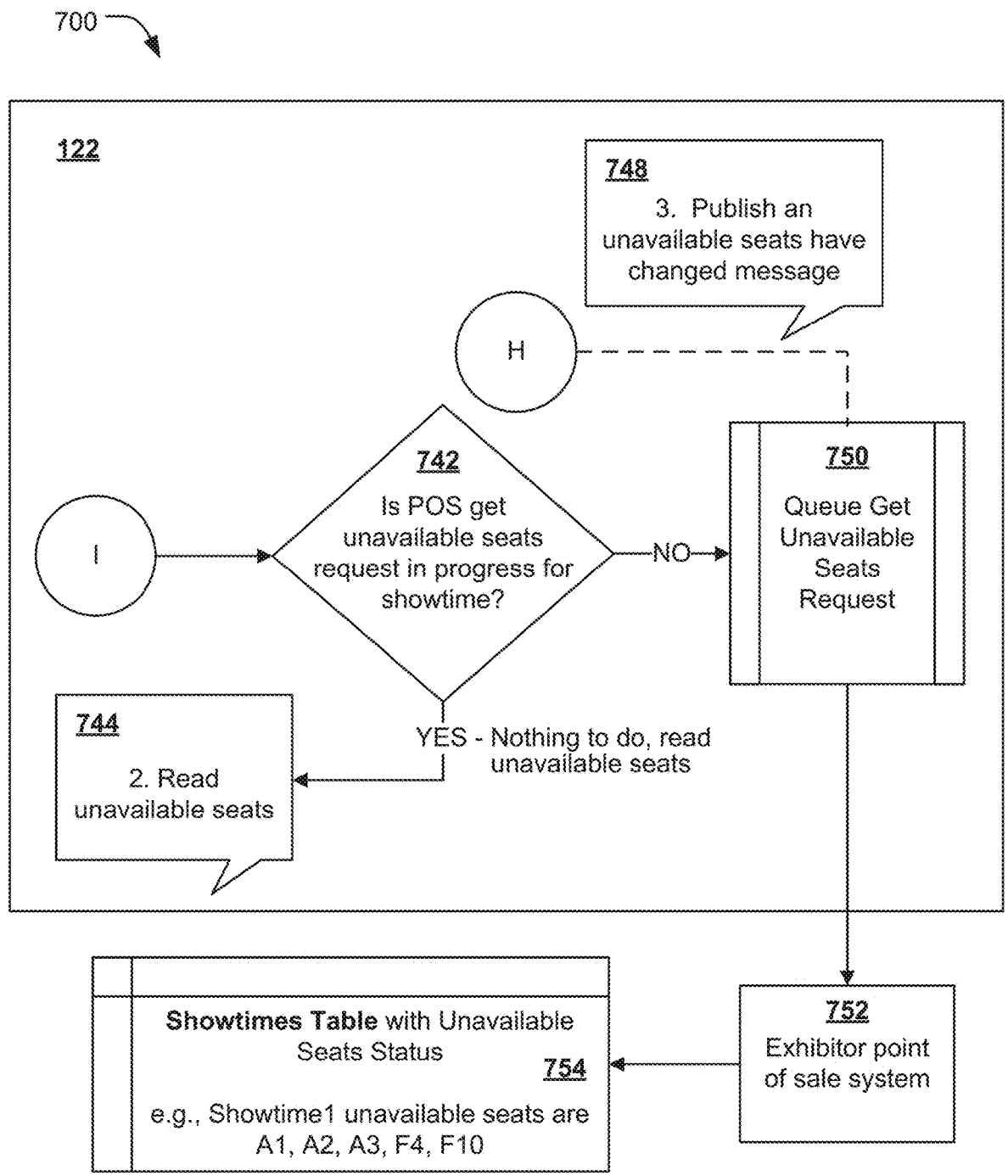
FIG. 7C is a third portion of the flow diagram of FIG. 7A.

FIGS. 7A-7C is a flow diagram of a method 700 performed by the system 100 (see FIG. 1). The method 700 implements pre-loading or pre-fetching seat map information. The ticket processing application 128 pre-fetches seat map information for a plurality of showtimes 724 (see FIG. 7B) for a particular movie showing at a particular theatre location and transmits the pre-fetched seat map information to the application 112. Thus, the application 112 has the pre-fetched seat map information before the user 140 indicates an interest in viewing a seat map for a particular showtime. In other words, when the user 140 wishes to purchase or reserve tickets, the application 112 already has the information necessary to generate the seat map preview 460 and/or the screen seat map (e.g., the visual representations 484 displayed on the seat selection page 482 illustrated in FIG. 4F).

FIG. 7A illustrates users "User 1" and "User 2" operating client computing devices 701 and 702, respectively. The client computing devices 701 and 702 are each like the client computing device 110 (see FIGS. 1, 3A-4I, and 8) and implement the application 112. Before first block 720, the users "User 1" and "User 2" have each selected the particular movie showing at the particular theatre location (e.g., using the primary view page 410 illustrated in FIGS. 4A-4E, 4H, 8, and 11). In first block 720, the ticket processing application 128 (see FIG. 1) and/or the API 122 subscribe the users "User 1" and "User 2" and/or the client computing devices 701 and 702 to a publication service operated by the ticket processing application 128 (see FIG. 1) and/or the API 122. For ease of illustration, the client computing devices 701 and 702 will be described as being subscribed to the publication service. The publication service notifies the users "User 1" and "User 2" via the client computing devices 701 and 702 whenever seats become unavailable for the particular movie showing at the particular theatre location. In other words, the publication service updates the pre-fetched seat map information stored by the application 112 for the plurality of showtimes 724 (see FIG. 7B).

After the user "User 1" selects the particular movie and the particular theatre location combination using the application 112, the application 112 pre-fetches seat map information needed to generate the seat map preview 460 and/or the screen seat map (e.g., the visual representations 484 displayed on the seat selection page 482 illustrated in FIG. 4F) for the plurality of showtimes 724. The application 112 pre-fetches the seat map information from the ticket processing application 128 (see FIG. 1) and/or the API 122.

The pre-fetched seat map information includes seat availability for an upcoming window of time (e.g., 6 hours). The upcoming window of time may have a first duration when the desired date for which the user 140 is searching is the current date. The upcoming window of time may have a second duration (e.g., a full day) that is longer than the first duration when the desired date is in the future. The application 112 may also pre-fetch seat map information (e.g., availability) for the selected movie at one or more of the following theatre locations:

1. a non-selected theatre location where the user 140 has most recently purchased (e.g., within the last 6 months) if this non-selected theatre location is within the same area as (e.g., within a 5 mile radius of) the currently selected theatre,
2. a favorite theatre location (if known) if the favorite theatre location is within the same area as the selected theatre, and
3. the most popular theatre location (excluding the selected theatre) within the same area as the selected theatre.

Referring to FIG. 7B, in block 722, the ticket processing application 128 (see FIG. 1) and/or the API 122 obtains the pre-fetched seat map information for the showtimes 724 from a cache 740 and transmits the pre-fetched seat map information to the application 112. After the user "User 1" selects one of the showtimes 724, the full screen seat map (e.g., the visual representations 484 displayed on the seat selection page 482 illustrated in FIG. 4F) may be generated for the selected showtime and used to select seats. When any of the users "User 1" and "User 2" uses the full screen seat map (e.g., the visual representations 484 displayed on the seat selection page 482 illustrated in FIG. 4F) to select seats, that selection is communicated by the application 112 to the API 122, which communicates the selection to the ticket processing application 128. The ticket processing application 128 stores this section (or seat map availability) in the cache 740 for a predetermined amount of time.

Then, referring to FIG. 7C, in decision block 742, the ticket processing application 128 (see FIG. 1) and/or the API 122 determines whether a request for unavailable seats is already in progress with a relevant POS system (e.g., the POS system 162A illustrated in FIG. 1) associated with the selected theatre location (e.g., the theatre location 160A illustrated in FIG. 1). This request may attempt to purchase or reserve the seats selected by the user "User 1." If the request is already in progress, in block 744, the ticket processing application 128 and/or the API 122 reads the seat map information from the cache 740 and provides the seat map information to the application 112. On the other hand, if the request is not in progress, in block 750, the ticket processing application 128 and/or the API 122 creates a new request for the unavailable seats. In block 752, the ticket processing application 128 and/or the API 122 sends the request to the relevant POS system.

In block 748, the ticket processing application 128 and/or the API 122 also notify the publication service that the user "User 1" has selected the one or more seats for the selected showtime. In block 746, the publication service shares the seat map availability (in the seat map information or a separate message) with any other users (e.g., User 2) that are looking for seats for the particular movie showing at the particular theatre location for a predetermined amount of time, which may be variable based on the popularity of the movie.

In block 754, the relevant POS system responds to the request with seat unavailability information that is stored in the cache 740 of the ticket processing application 128 for a predetermined amount of time (or a duration of time before the request expires). The predetermined amount of time is configurable by administrators of the ticket processing application 128 and/or the ticket processing application 128 may automatically change the predetermined amount of time based on volume. For example, in times of high volume, the duration of time before expiration will be shorter than times of normal or low volume. The method 700 allows the system 100 (see FIG. 1) to almost instantly present a seat map preview to most users without having to make a network call to the relevant POS system for each user request. If a user proceeds to actually select seats, in block 752, a real time network call is made to the relevant POS system to confirm current availability. In block 754, the relevant POS system responds with updated seat map availability that replaces the availability currently in the cache 740 and will be available for subsequent user previews.

Referring to FIG. 1, as the user 140 is browsing seat map previews, the system 100 may continue to pre-fetch seat map availability for any remaining showtimes for the current day beyond the window of time (e.g., 6 hours), showtimes for the next day for the same time of day the user is currently exploring (e.g., night or late night), and the like.

For returning users without saved movies, when the user 140 launches the application 112 or visits a website configured to provide the same functionality as the application 112, the system 100 may pre-fetch seating availability for a number (e.g., three) of the top three movies) for which the user has not previously purchased tickets, for upcoming showtimes at a previously selected theatre location (where the user has purchased tickets) that are within a predetermined amount of time (e.g., +2 to 24 hours) from the current time. The top movies are defined internally by a popularity algorithm. If the user 140 has not made a recent purchase, seating for showtimes may be pre-fetched for the predetermined amount of time (e.g., +2 to 24 hours) from the current time for a number (e.g., two) of the most popular theatre locations in the user's area.

When the user 140 has saved movies and launches the application 112 or visits the website, the system 100 pre-fetches seating availability for a number (e.g., three) of the user's top movies for which the user has not previously purchased tickets, for showtimes that are either within their preferred time of day (if known) or the predetermined amount of time (e.g., +2 to 24 hours) from the current time at the user's preferred theatre location(s).

If the user 140 has no preferred theatre location(s) or the preferred theatre location(s) is/are not in the user's current location, the system 100 pre-fetches seating availability for the a number (e.g., two) of the most popular theatre locations in the user's area.

When an anonymous user launches the application 112 or visits the website, the system 100 pre-fetches seating availability for a number (e.g., three) of the top movies, the predetermined amount of time (e.g., +2 to 24 hours) from the current time for a number (e.g., two) of the most popular theatre location(s) in the user's current location.

Referring to FIG. 1, the ticket processing application 128 may include or have access to a virtual Concierge service 124. The virtual Concierge service 124 stores (e.g., in the data store 170) a plurality of user profiles 172 defined by the plurality of users. In the example illustrated, the virtual Concierge service 124 has stored user profiles 172A and 172B both associated with the user 140. The virtual Concierge service 124 may store identifications of one or more movies that have been tagged by the user 140 and associated with one of the user profiles 172A and 172B by the user 140.

The virtual Concierge service 124 also saves user preferences (or selections with regard to theatre location, date, showtime, seats, ticket type, ticket quantity, loyalty information, and movie preferences such as rating and genre) and uses these preferences to build one of the user profiles (e.g., the user profile172A). When the user 140 selects a movie, the virtual Concierge service 124 matches showtime information for the selected movie with the user profile, and flags those showtimes satisfying the user's preferences. This allows the user 140 to quickly complete a ticket order (e.g., with a purchase button call to action). For ease of illustration, the user 140 will be described as being associated with only the user profile172A. However, the user 140 may be associated with any number of user profiles.

Before the API 122 instructs the application 112 to display the seat map preview 460 (e.g., on the primary view page 410 illustrated in FIGS. 4A-4E, 4H, 8, and 11) or the full screen seat maps (e.g., the visual representations 484 displayed on the seat selection page 482 illustrated in FIG. 4F), the API 122 may automatically and intelligently pre-fetch seat availability data (e.g., one or more seat maps) for one or more of the movies 414 (see FIGS. 4A and 11) showing at a particular theatre location (e.g., one of the theatre locations 160A and 160B) from the cache 740 (see FIG. 7B), if available, or the POS system (e.g., one of the POS systems 162A and 162B) associated with the particular theatre location based on what the ticket processing application 128 knows about the user 140. The one or more movies may be any movies tagged in the user profile 172A associated with the user 140. The particular theatre location may be determined based on the user preference(s) stored in the user profile 172A. Alternatively, the particular theatre location may be the last theatre location from which the user 140 purchased tickets. The API 122 sends the pre-fetched seat availability data to the application 112. The application 112 may use the pre-fetched seat availability data to generate and display one or more seat maps in the seat map preview 460 or on the full screen seat map (e.g., the visual representations 484 displayed on the seat selection page 482 illustrated in FIG. 4F). Alternatively, the seat maps may be generated by the ticket processing application 128 and transmitted to the application 112 for display thereby in the seat map preview 460 or on the full screen seat map (e.g., the visual representations 484 displayed on the seat selection page 482 illustrated in FIG. 4F).

Similarly, the API 122 may automatically pre-fetch showtime information for one or more of the movies 414 (see FIGS. 4A and 11) from the POS system (e.g., one of the POS systems 162A and 162B) for a particular theatre location (e.g., one of the theatre locations 160A and 160B). The one or more movies may be the most popular movie(s) and the particular theatre location may be determined based on the user preference(s) stored in the user profile 172A. Alternatively, the particular theatre location may be the last theatre location from which the user 140 purchased tickets. The ticket processing application 128 uses the pre-fetched showtime information to identify one or more showtimes that satisfy one or more of the user preference(s) stored in the user profile 172A and instructs the application 112 to display a visual indicator 490 (see FIG. 4A) on the primary view page 410 (see FIGS. 4A-4E, 4H, 8, and 11) for the one or more showtimes identified. The application 112 displays the visual indicator 490 in response to this instruction. The application 112 and/or the ticket processing application 128 may use the pre-fetched showtime information to generate the seat maps. The application 112 uses the seat maps to display the seat map preview 460 so that as the user 140 swipes left or right through the showtimes, the seat map preview 460 loads near instantly. Thus, the API 122 does not request a new seat map from the POS system (e.g., one of the POS systems 162A and 162B) of the selected theatre location every time a different seat map is displayed by the application 112. The application 112 may also display the seat maps on the full screen seat map (e.g., the visual representations 484 displayed on the seat selection page 482 illustrated in FIG. 4F).

Optionally, referring to FIG. 4B, the primary view page 410 may be configured to show a current one of the user profiles 172A and 172B associated with the user 140. The primary view page 410 may allow the user 140 to change the current user profile and when this occurs, showtimes that match the user preference(s) stored in the current user profile are labeled as being matches and/or are displayed prominently (e.g., first). Optionally, the seat map preview 460 may be labeled to indicate whether seats available match the user preference(s) stored in the current user profile.

Optionally, when the user 140 has logged into the system 100 and selected one of the user profiles 172A and 172B, showtimes that match the user preference(s) stored in the selected user profile are labeled as being matches and/or are displayed prominently (e.g., first). Optionally, the seat map preview 460 may be labeled to indicate whether seats available match the user preference(s) stored in the selected user profile.

As mentioned above, the API 122 may be configured to automatically pre-fetch showtime information for one or more of the movies 414 (see FIGS. 4A and 11) from the POS system (e.g., one of the POS systems 162A and 162B) based on the user preference(s) stored in the user profile 172A.

Further, the API 122 may be configured to automatically pre-fetch showtime information for partial matches to the user preference(s) stored in the user profile 172A. For example, the application 112 may be configured to display matches and partial matches as cards, with one card representing a partial match (e.g., the correct movie, seats, and time of day, but at a theatre location that is not a favorite theatre location).

Figure 11:
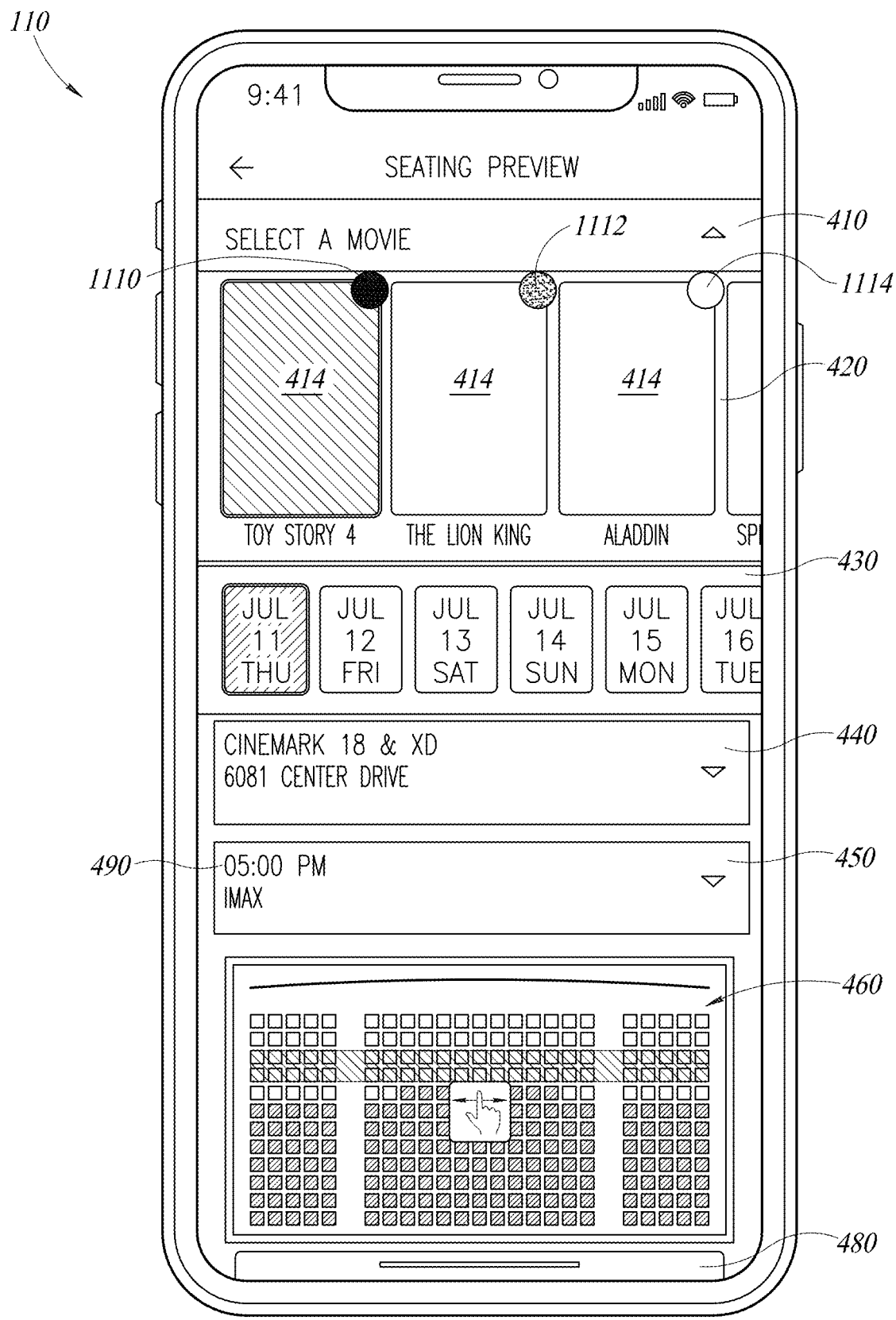
FIG. 11 is an illustration of the example primary view page of FIG. 4A configured to display a traffic signal style visual indicator next to each movie indicating whether the movie satisfies, partially satisfies, or does not satisfy one or more user preference(s).

By way of another non-limiting example, referring to FIG. 11, the application 112 may be configured to display a list of movies (e.g., in the horizontally scrolling movie list 420 displayed on the primary view page 410) and a traffic signal style visual indicator next to each movie in the list. For example, the application 112 could display a red, yellow, or green indicator for each theater location, movie, date, and showtime combination that the application 112 displays. For those combinations that satisfy or match the user preference(s) stored in the user profile 172A, the application 112 may display a first visual indicator 1110 (e.g., green in color). For example, if the user preference(s) specify a movie and a favorite theatre location and the movie is available at the favorite theatre location, the movie may be associated with (e.g., displayed along with) the first visual indicator 1110 (e.g., green in color) in the list. On the other hand, some of the user preference(s) may be identified as being required and for those combinations that satisfy or match the required user preference(s) but not at least one of the other user preference(s), the application 112 may display a second visual indicator 1112 (e.g., yellow in color). For example, the user preference(s) may specify a movie and a favorite theatre location as being required and a preferred time of day as not being required. In this example, if an available showtime for the specified movie at the favorite theatre location is within an hour of a preferred time of day, the movie may be associated with (e.g., displayed along with) the second visual indicator 1112 (e.g., yellow in color) in the list. Finally, the application 112 may optionally display a third visual indicator 1114 (e.g., red in color) for those combinations that do not satisfy or match any of the user preference(s) or fail to satisfy at least one of the required user preference(s). For example, if the user preference(s) specify a desired format (e.g., IMAX) and the desired format (e.g., IMAX) is not available the movie may be associated with (e.g., displayed along with) the third visual indicator 1114 (e.g., red in color) in the list.

Figure 10A:
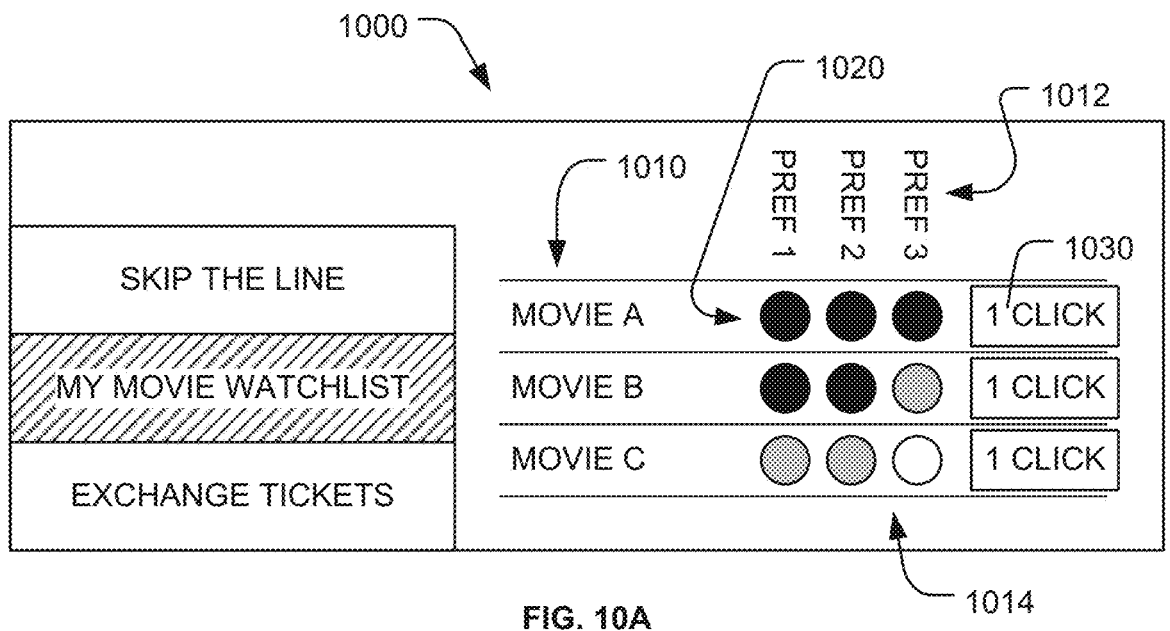
FIG. 10A is an illustration of an example page configured to display a list of movies and indicate whether each movie satisfies, partially satisfies, or does not satisfy each user preference in a list of user preferences.

By way of yet another non-limiting example, referring to FIG. 10A, the application 112 may be configured to display a page 1000 that includes a list 1010 of movies and a list 1012 of user preferences. On the page 1000, the lists 1010 and 1012 may be presented in a matrix form as illustrated in FIG. 10A. In FIG. 10A, the movies in the list 1010 define rows of a matrix 1014 and the user preferences in the list 1012 define columns of the matrix 1014. The items in the matrix 1014 are a set of visual indicators 1020. A different one of the visual indicators 1020 is displayed in each cell in the matrix 1014. The page 1000 includes a selectable user input 1030 for each of the movies in the list 1010. In FIG. 10A, for each of the movies in the list 1010, the selectable user input 1030 is displayed within the same row of the matrix 1014 as the movie.

The visual indicators 1020 may indicate whether each user preferences is fully satisfied, partially satisfied, or not satisfied. For example, each of the visual indicators 1020 may be colored (e.g., a red, yellow, or green). In the example illustrated in FIG. 10A, the visual indicators 1020 in the same row as "MOVIE A" are all colored solid black, which in this example, indicates the user preferences in the list 1012 are all satisfied. The first two visual indicators 1020 in the same row as "MOVIE B" are colored solid black, meaning the user preferences "PREF 1" and "PREF 2" in the list 1012 are satisfied, and the last visual indicator in the same row as "MOVIE B" is colored gray, which means the user preference "PREF 3" in the list 1012 is only partially satisfied. The first two visual indicators 1020 in the same row as "MOVIE C" are colored gray, meaning the user preferences "PREF 1" and "PREF 2" in the list 1012 are only partially satisfied, and the last visual indicator in the same row as "MOVIE C" is colored white, which means the user preference "PREF 3" in the list 1012 is not satisfied.

Figure 10B:
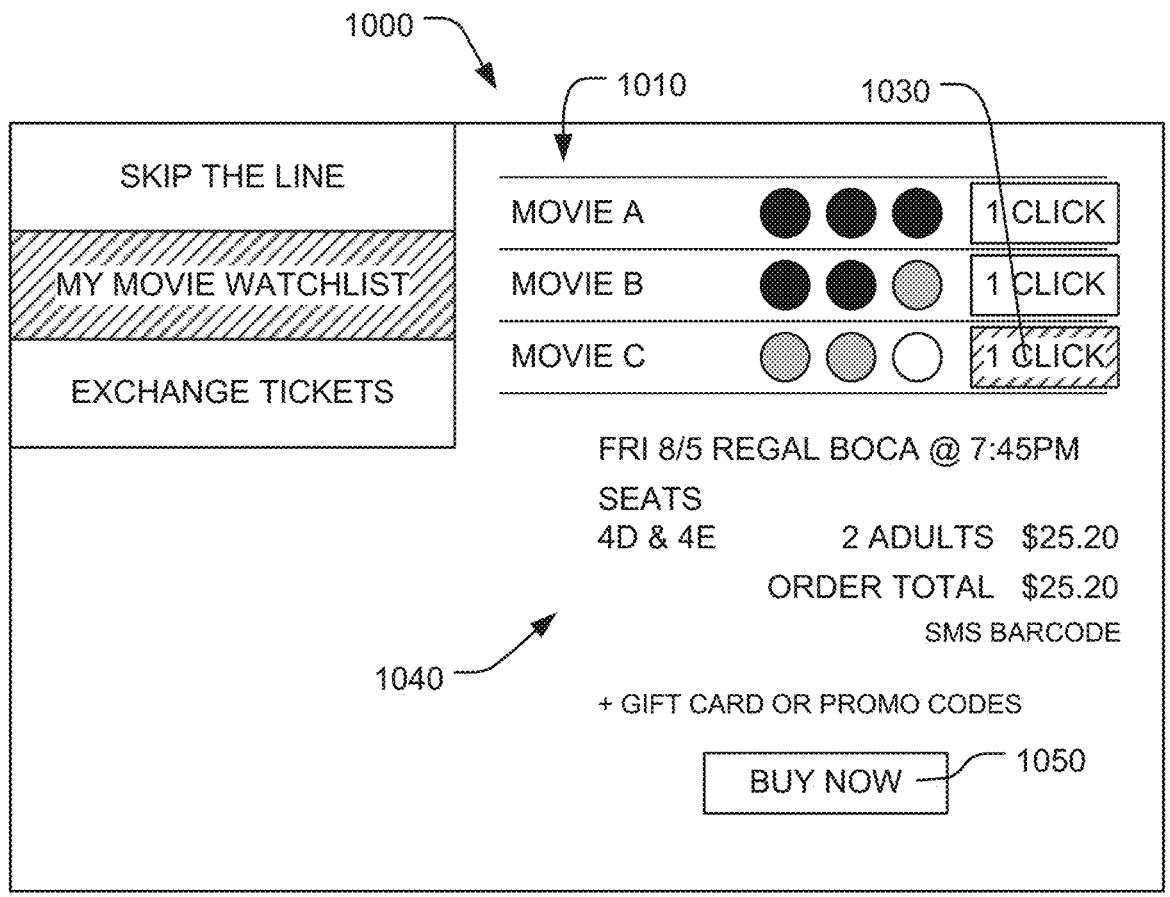
FIG. 10B is an illustration of an order summary generated when the user selects one of the movies displayed in FIG. 10A.

The user 140 may select one of the movies in the list 1010 by selecting (e.g., tapping, clicking, and the like) the selectable user input 1030 for the movie. FIG. 10B illustrates the page 1000 after the user 140 has selected the selectable user input 1030 for the movie "MOVIE C." After user 140 selects one of the movies in the list 1010, the application 112 displays an order summary 1040 generated based at least in part on the user preferences in the list 1012. The order summary 1040 may also be generated based at least in part on other user preference(s) stored in the user profile 172A. For example, in FIG. 10B, the user preference(s), including the user preferences in the list 1012 and optionally others stored in the user profile 172A, specify the Exhibitor (e.g., Regal Boca), showtime (e.g., 7:45 PM), the date (e.g., Friday 8/5), and which ticket types (e.g., adult) and the number of each ticket type that the user 140 is interested in purchasing. In the reserved seating scenario, the user preference(s) stored in the user profile 172A may also specify a region within the auditorium for which the user 140 would like to purchase tickets. The user 140 may select the tickets specified in the order summary 1040 by selecting a selectable user input 1050 (e.g., labeled "BUY NOW" in FIG. 10B). Then, the application 112 may complete the purchase.

If the user 140 is an anonymous user, the API 122 may automatically pre-fetch showtime information for one or more of the movies 414 (see FIGS. 4A and 11) from the cache 740 (see FIG. 7B), if available, or the POS system (e.g., one of the POS systems 162A and 162B) for one or more theatre locations (e.g., one of the theatre locations 160A and 160B). This information may be stored and used to display the visual indicator 490 (see FIG. 4A) and/or the seat maps in the seat map preview 460 (see FIGS. 4A, 4B, and 4D) and/or on the full screen seat map (e.g., the visual representations 484 displayed on the seat selection page 482 illustrated in FIG. 4F).

The pre-fetched seat availability data and/or the pre-fetched showtime information may be included in the relevant first information and/or the relevant second information discussed above.

Figure 8:
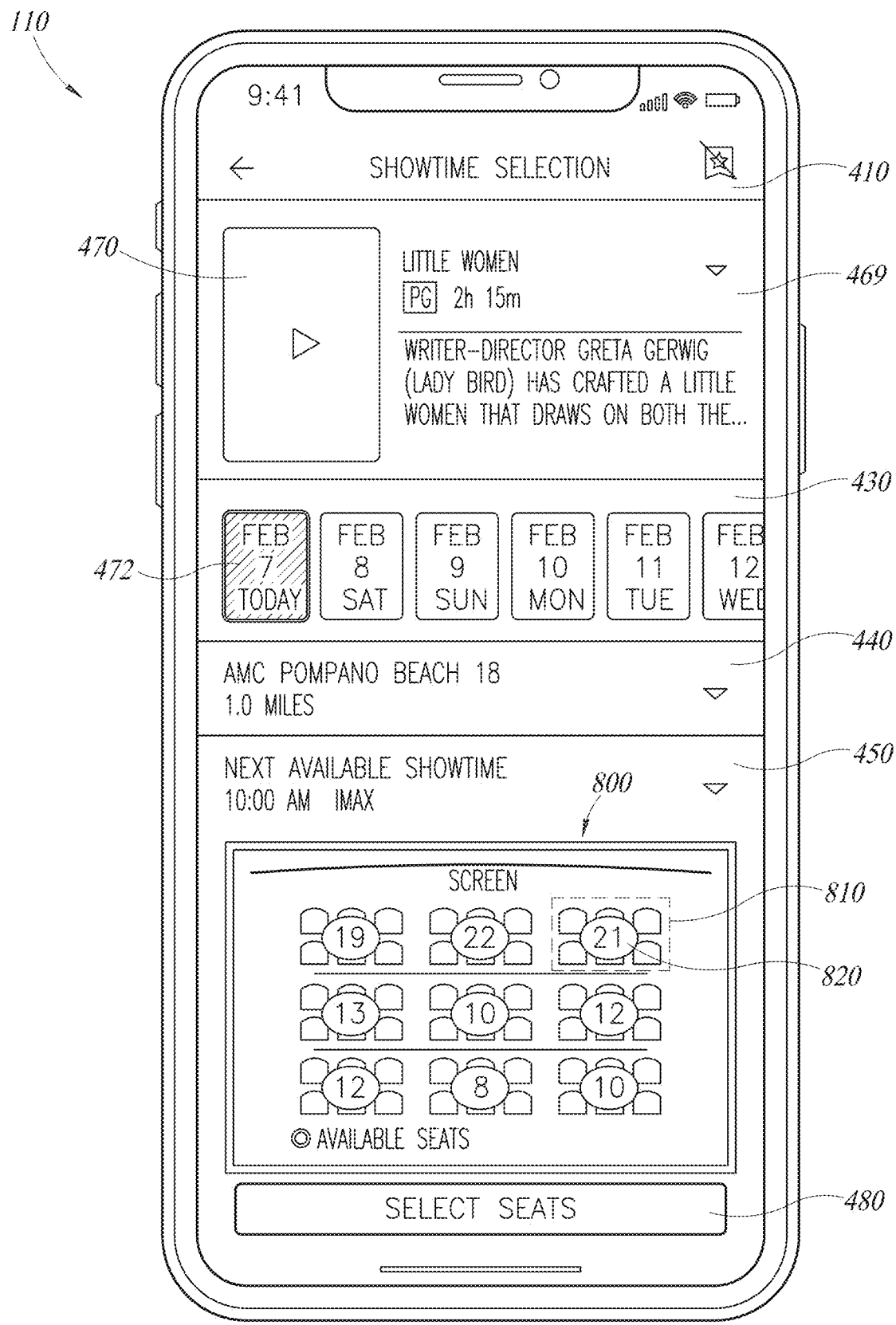
FIG. 8 is an illustration of an embodiment of the primary view page that includes a seat map preview that displays a standardized representation of an auditorium inside a theatre location.

Optionally, referring to FIG. 4B, instead of or in place of the seat map preview 460, the primary view page 410 may include a seat map preview 800 (see FIG. 8) that displays a standardized representation of an auditorium inside a theatre location. Referring to FIG. 8, the standardized representation is used to represent areas or regions 810 within the auditorium (e.g., left front, middle front, right front, left center, middle center, right center, left back, middle back, right back, etc.) independently of the actual shape and size of a particular auditorium. For example, FIG. 8 illustrates nine regions 810. Each of the regions 810 may display a number 820 of available seats in that region that are available for purchase. The seat map preview 800 allows the user 140 (see FIGS. 1, 2A, 2C, 2D, 2F, 2G, and 3A-3C) to quickly determine if the preferred seat(s) of the user 140 are available for a particular movie playing at a particular theatre location at a particular showtime.

As shown in FIG. 8, the primary view page 410 includes the section 469, which displays the indication 470 (e.g., a movie poster) identifying the selected movie (e.g., "Little Women"). The primary view page 410 also includes the date list 430, the horizontally scrolling date list 430, the theatre location user input 440, and the showtime user input 450.

The primary view page 410 also includes the seat selection user input 480, which functions as described above with respect to reserved seating scenario. In other words, when the user 140 selects (e.g., taps) the seat selection user input 480 or selects (taps) the seat map preview 800, the application 112 displays a full screen seat map (e.g., the visual representations 484 displayed on the seat selection page 482 illustrated in FIG. 4F). The user 140 uses the full screen seat map (e.g., the seat selection page illustrated in FIG. 4F) to select seats, and may use the ticket selection page 492A (see FIG. 4G) to select ticket types, and quantities. After the user 140 selects the seats, ticket types and quantities, the user 140 selects the seat selection user input 480, which causes the application 112 to transmit the order information (e.g., the selected movie, the selected date, the selected showtime, the selected theatre location, the selected seats, the selected ticket types, and the selected quantities) to the API 122. The API 122 then instructs the application 112 to display the purchase process page 360 (see FIG. 3D) described above, which includes the movie order summary 362 (see FIG. 3D) and the payment option(s) 364. The user 140 uses the purchase process page 360 to complete the purchase.

Figure 9:
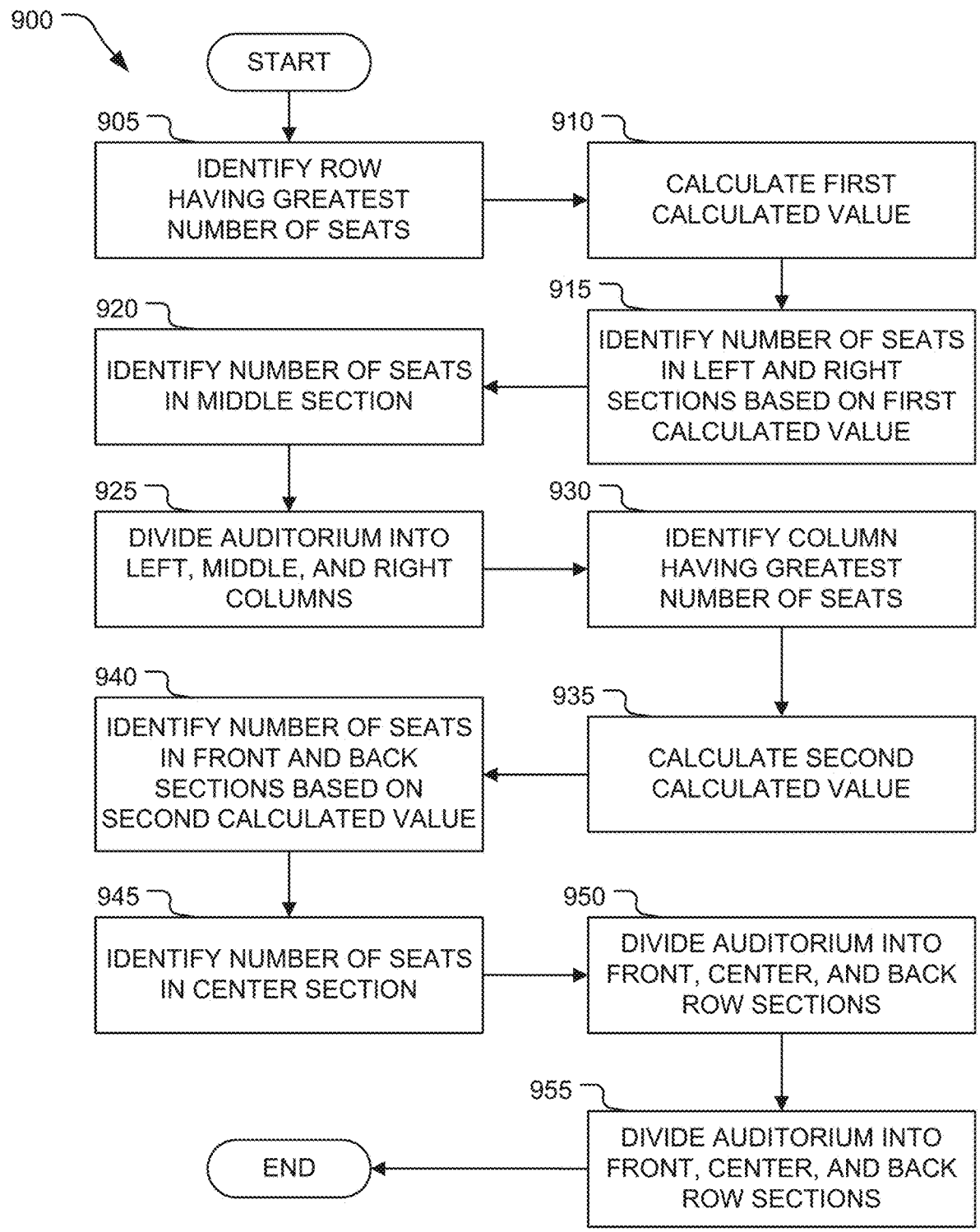
FIG. 9 is a flow diagram of a method of assigning seats within an auditorium to regions (e.g., left front, middle front, right front, left center, middle center, right center, left back, middle back, right back, etc.) of a standardized representation independently of the actual shape and size of the auditorium.

Referring to FIG. 8, the seat map preview 800 may be generated using a method 900 (see FIG. 9) performed by the server computing device 120 (see FIG. 1). The server computing device 120 uses the method 900 (see FIG. 9) to assign seats within an auditorium to the regions 810 (e.g., left front, middle front, right front, left center, middle center, right center, left back, middle back, right back, etc.) independently of the actual shape and size of a particular auditorium. Before the method 900 (see FIG. 9) is performed an auditorium is selected. Thus, referring to FIG. 9, the method 900 may be performed for a plurality of auditoriums.

In first block 905, the server computing device 120 identifies a row of seats (x-axis or horizontal axis) having a greatest number of total seats, referred as a "first seat count." Then, in block 910, the server computing device 120 divides the first seat count by a first scalar value (e.g., three) to obtain a first calculated value. Next, in block 915, the server computing device 120 uses the whole number portion of the first calculated value as a number of seats in a left section and a number of seats in a right section. For example, if the widest row in the auditorium has 55 seats, in block 905, the server computing device 120 identifies the row with 55 seats and in block 910, divides the first seat count (55) by the first scalar (e.g., three) to obtain the first calculated value (e.g., 18.3333). Continuing the example, in block 915, the server computing device 120 identities the whole number portion (18) of the first calculated value (e.g., 18.3333) as the number of seats in the left section and the number of seats in the right section. Thus, starting at a first seat (identified with the number 1) and counting forwards, the left section includes seat 1 to seat 18. Similarly, starting at a last seat (identified with the number 55) and counting backwards, the right section includes seat 55 to seat 38.

In block 920, the server computing device 120 identifies a number of seats in a middle section by subtracting the numbers of seats in the left and right sections from the first seat count. Therefore, continuing the example above, the middle section is identified by subtracting the numbers of seats in the left and right sections (18 each) from the first seat count (55), or 55−18−18=19. Thus, starting at a first seat after the left section (identified with the number 19) and counting forwards, the middle section includes seats 19 to 37.

In block 925, the server computing device 120 divides the auditorium into a number of columns determined by the first scalar (e.g., three). For ease of illustration, the first scalar will be described as being three. Therefore, the method 900 will be described as dividing the auditorium into three columns. The auditorium has a left boundary or perimeter line and a right perimeter line. The seats are located between the left and right perimeter lines. A left column is positioned between the left perimeter line and a first inner column line, a middle column is positioned between the first inner column line and a second inner column line, and a right column is positioned between the second inner column line and the right perimeter line. Continuing the example above, the left column (e.g., Column 1) extends from the left perimeter line to seat 18 in the widest row. Therefore, the first inner column line is positioned between seats 18 and 19. The middle column (e.g., Column 2) extends 19 seats from the first inner column line and ends at the second inner column line (inclusive of seat 37). Therefore, the second inner column line is positioned between seats 37 and 38. The right column (e.g., Column 3) extends from the second inner column line (between seats 37 and 38) and extends to the right perimeter line (outside seat 55).

In block 930, the server computing device 120 identifies a column of seats (y-axis or vertical axis) having a largest number of total seats, referred as a "second seat count." Then, in block 935, the server computing device 120 divides the second seat count by a second scalar value (e.g., three) to obtain a second calculated value. Next, in block 940, the server computing device 120 rounds the second calculated value up to a next nearest whole number and uses the next nearest whole number as a number of seats in a front section and a number of seats in a back section. For example, if the longest column in the auditorium has 31 seats, in block 930, the server computing device 120 identifies the column with 31 seats and in block 935, divides the second seat count (31) by the second scalar (e.g., three) to obtain the second calculated value (e.g., 10.3333). Continuing the example, in block 940, the server computing device 120 identities the next nearest whole number (e.g., 11) as the number of seats in the front section and the number of seats in the back section. Thus, starting at a first seat (identified with the number 1) and counting forwards, the front section includes seat 1 to seat 11 in the longest column. Similarly, starting at a last seat (identified with the number 31) and counting backwards, the back section includes seat 31 to seat 21.

In block 945, the server computing device 120 identifies a number of seats in a center section subtracting the numbers of seats in the front and back sections from the second seat count. Therefore, continuing the example above, the center section is identified by subtracting the numbers of seats in the front and back sections (11 each) from the second seat count (31), or 31−11−11=9. Thus, starting at a first seat after the front section (identified with the number 12) and counting forwards, the center section includes seats 12 to 20.

In block 950, the server computing device 120 divides the auditorium into a number rows determined by the second scalar (e.g., three). For ease of illustration, the second scalar will be described as being three. Therefore, the method 900 will be described as dividing the auditorium into three rows.

The auditorium has a front boundary or perimeter line nearest the movie screen and a back perimeter line farthest from the movie screen. The seats are located between the front and back perimeter lines. A front row section is positioned between the front perimeter line and a first inner row line, a center row section is positioned between the first inner row line and a second inner row line, and a back row section is positioned between the second inner row line and the back perimeter line. Continuing the example above, the front row section extends from the front perimeter line to seat 11 in the longest column. Therefore, the first inner row line is positioned between seats 11 and 12. The center row section extends 9 seats from the first inner row line and ends at the second inner row line (inclusive of seat 20). Therefore, the second inner row line is positioned between seats 20 and 21. The back row section extends from the second inner row line (between seats 20 and 21) and extends to the back perimeter line (which is positioned outside seat 31).

In block 955, the server computing device 120 uses the lines drawn in blocks 925 and 950 to assign each seat in the auditorium to one of the regions 810 (see FIG. 8). For example, the server computing device 120 may assign the seats as described below.

Seats bounded by the front perimeter line, the first inner row line, the left perimeter line, and the first inner column line may be assigned to the left front region.

Seats bounded by the first inner row line, the second inner row line, the left perimeter line, and the first inner column line may be assigned to the left center region.

Seats bounded by the second inner row line, the back perimeter line, the left perimeter line, and the first inner column line may be assigned to the left back region.

Seats bounded by the front perimeter line, the first inner row line, the first inner column line, and the second inner column line may be assigned to the middle front region.

Seats bounded by the first inner row line, the second inner row line, the first inner column line, and the second inner column line may be assigned to the middle center region.

Seats bounded by the second inner row line, the back perimeter line, the first inner column line, and the second inner column line may be assigned to the middle back region.

Seats bounded by the front perimeter line, the first inner row line, the second inner column line, and the right perimeter line may be assigned to the right front region.

Seats bounded by the first inner row line, the second inner row line, the second inner column line, and the right perimeter line may be assigned to the right center region.

Seats bounded by the second inner row line, the back perimeter line, the second inner column line, and the right perimeter line may be assigned to the right back region.

Then, the method 900 terminates.

The middle center region may be characterized as being a "sweet spot" that is wider than it is tall. Data suggests that users prefer seat selections having a rhombus shape that is wider along the horizontal axis than the rhombus shape is tall along the vertical axis. Seats outside the rhombus shape are typically less desirable.

Mobile Communication Device

Figure 5:
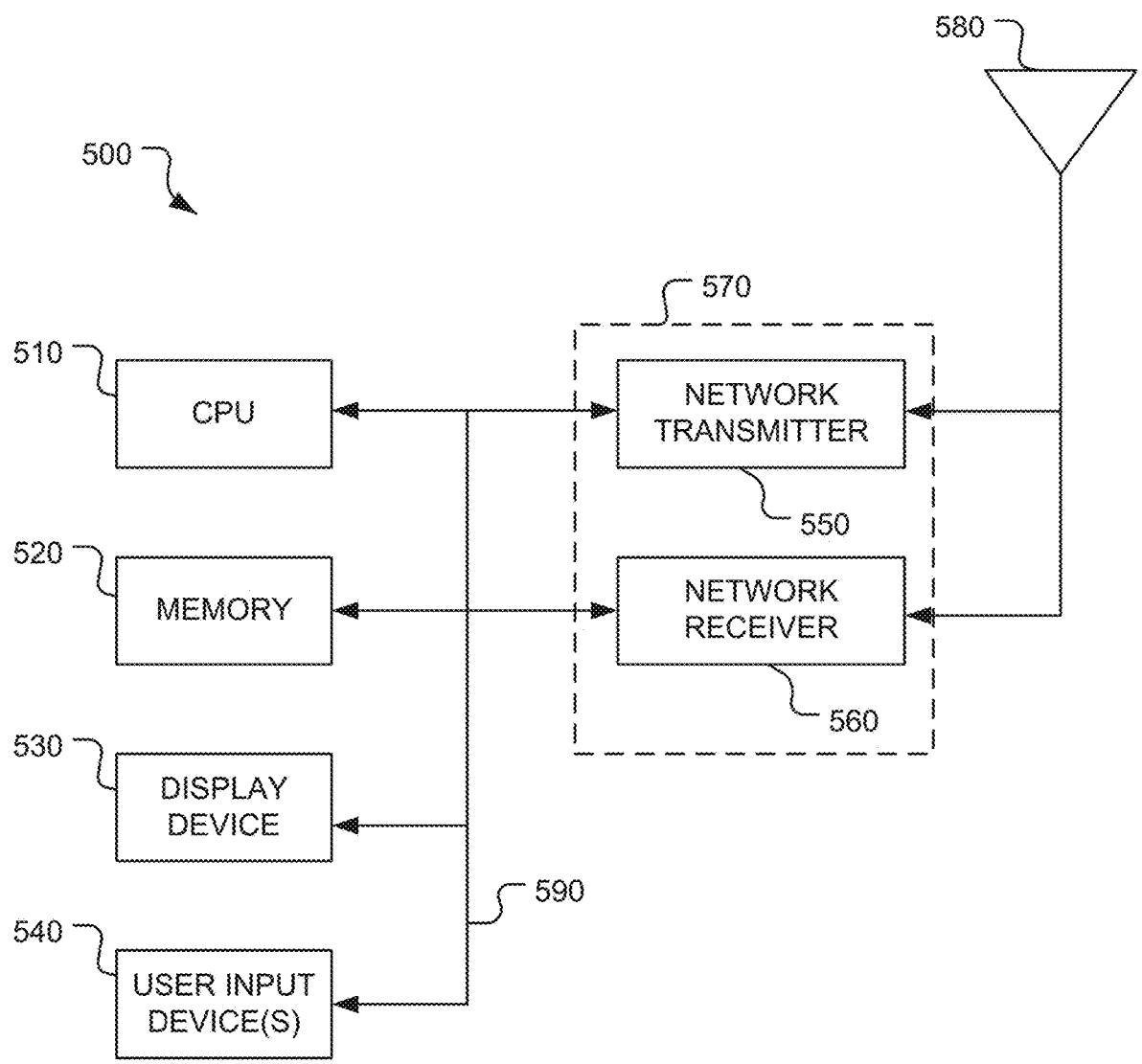
FIG. 5 is a functional block diagram illustrating a mobile communication device that may be used to implement one or more of the client computing devices of FIG. 1.

FIG. 5 is a functional block diagram illustrating the mobile communication device 500 that may be used to implement the client computing device 110 of FIG. 1. By way of non-limiting examples, referring to FIG. 5, the mobile communication device 500 may be implemented as a cellular telephone, a tablet computer, and the like. The mobile communication device 500 includes a central processing unit ("CPU") 510. Those skilled in the art will appreciate that the CPU 510 may be implemented as a conventional microprocessor, application specific integrated circuit ("ASIC"), digital signal processor ("DSP"), programmable gate array ("PGA"), or the like. The mobile communication device 500 is not limited by the specific form of the CPU 510.

The mobile communication device 500 also contains the memory 520. The memory 520 may store instructions and data to control operation of the CPU 510. The memory 520 may include random access memory, read-only memory, programmable memory, flash memory, and the like. The mobile communication device 500 is not limited by any specific form of hardware used to implement the memory 520. The memory 520 may also be integrally formed in whole or in part with the CPU 510.

The mobile communication device 500 also includes conventional components, such as the display device 530 and one or more user input devices 540 (e.g., buttons, a keypad, a keyboard, and the like). These are conventional components that operate in a known manner and need not be described in greater detail. The display device 530 may be implemented as a touch display or touchscreen configured to receive user input (e.g., selections described above with respect to the method 200 illustrated in FIGS. 2A-2C, and the like). By way of non-limiting examples, the display device 530 is operable to display the screens and/or pages (e.g., the landing page 310, the theatre and showtime selection page 330, and the purchase process page 360) depicted in FIGS. 3A-3D and the like.

The mobile communication device 500 also includes a network transmitter 550 such as may be used by the mobile communication device 500 for normal network wireless communication with the network(s) 130 (see FIG. 1), such as with a base station (not shown) of a cellular network. FIG. 5 also illustrates a network receiver 560 that operates in conjunction with the network transmitter 550 to communicate with the network(s) 130 (see FIG. 1), such as with the base station (not shown) of the cellular network. In a typical embodiment, the network transmitter 550 and network receiver 560 are implemented as a network transceiver 570. The network transceiver 570 is connected to an antenna 580. Operation of the network transceiver 570 and the antenna 580 for communication with the network(s) 130 (see FIG. 1) is well-known in the art and need not be described in greater detail herein.

Returning to FIG. 5, other conventional components found in wireless communication devices, such as a USB interface, Bluetooth interface, camera/video device, infrared device, global positioning system ("GPS") device, and the like, may also be included in the mobile communication device 500. For the sake of clarity, these conventional elements are not illustrated in the functional block diagram of FIG. 5. The GPS device may be used to determine the current geographic location (e.g., latitude and longitude) of the mobile communication device 500.

The various components illustrated in FIG. 5 are coupled together by a bus system 590. The bus system 590 may include an address bus, data bus, power bus, control bus, and the like. For the sake of convenience, the various busses in FIG. 5 are illustrated as the bus system 590.

In some embodiments, the memory 520 stores computer executable instructions that when executed by one or more processors (e.g., the CPU 510) cause the one or more processors to implement the application 112 and/or perform all or portions of one or more of the methods (including the method 200 illustrated in FIGS. 2A-2C, the method 250 illustrated in FIGS. 2D-2G, the method 700 illustrated in FIGS. 7A-7C, and the method 900 illustrated in FIG. 9) described above. Such instructions may be stored on one or more non-transitory computer-readable media.

Figure 4I:
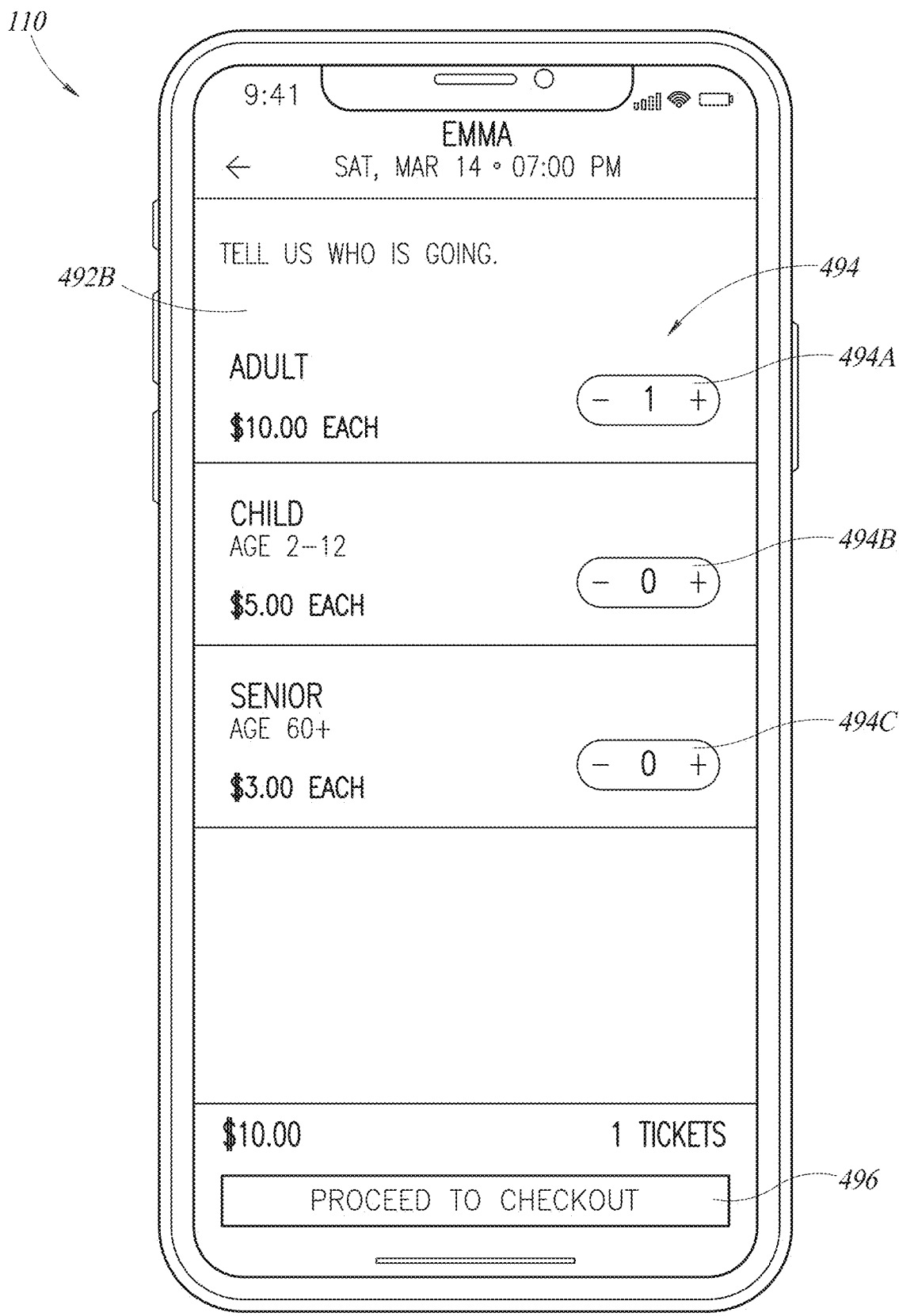
FIG. 4I is an illustration of the example ticket selection page configured for the general seating scenario.

The memory 520 stores computer executable instructions that when executed by the CPU 510 cause the CPU 510 to generate the screens and/or pages (e.g., the landing page 310, the theatre and showtime selection page 330, the purchase process page 360 illustrated in FIGS. 3A, 3B, and 3D, respectively, the primary view page 410 illustrated in FIGS. 4A-4E, 4H, 8, and 11, the seat selection page 482 illustrated in FIG. 4F, the ticket selection page 492A illustrated in FIG. 4G, the ticket selection page 492B illustrated in FIG. 4I, and the page 1000 illustrated in FIGS. 10A and 10B) described above and displayed by the display device 530. Such instructions may be stored on one or more non-transitory computer-readable media. The screens and/or pages (e.g., the landing page 310, the theatre and showtime selection page 330, the purchase process page 360 illustrated in FIGS. 3A, 3B, and 3D, respectively, the primary view page 410 illustrated in FIGS. 4A-4E, 4H, 8, and 11, the seat selection page 482 illustrated in FIG. 4F, the ticket selection page 492A illustrated in FIG. 4G, the ticket selection page 492B illustrated in FIG. 4I, and the page 1000 illustrated in FIGS. 10A and 10B) described above and displayed by the display device 530 may each be characterized as being a graphical user interface.

Computing Device

FIG. 6 is a diagram of hardware and an operating environment in conjunction with which implementations of the one or more computing devices of the system 100 may be practiced. The description of FIG. 6 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 6 includes a general-purpose computing device in the form of the computing device 12. Each of the computing devices of FIG. 1 (including the client computing device 110, the server computing device 120, and the computing device implementing the payment processor service 150) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes the system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A display device 47, such as a monitor, a touch display, a touchscreen, or other type of display device, is also connected to the system bus 23 via an interface, such as a video adapter 48. In addition to the display device 47, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 6 include a local-area network (LAN) 51 and a wide-area network (WAN) 52. Such networking environments are commonplace in offices, enterprise-wide computer networks, intranets and the Internet. The network(s) 130 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors (e.g., the processing unit 21) cause the one or more processors to implement one or more applications (e.g., the application 112, the API 122, the ticket processing application 128, and the virtual Concierge service 124 illustrated in FIG. 1) and/or perform all or portions of one or more of the methods (including the method 200 illustrated in FIGS. 2A-2C, the method 250 illustrated in FIGS. 2D-2G, the method 700 illustrated in FIGS. 7A-7C, and the method 900 illustrated in FIG. 9) described above. Such instructions may be stored on one or more non-transitory computer-readable media.

In some embodiments, the system memory 22 stores computer executable instructions that when executed by one or more processors (e.g., the processing unit 21) cause the one or more processors to generate the screens and/or pages (e.g., the landing page 310, the theatre and showtime selection page 330, the purchase process page 360 illustrated in FIGS. 3A, 3B, and 3D, respectively, the primary view page 410 illustrated in FIGS. 4A-4E, 4H, 8, and 11, the seat selection page 482 illustrated in FIG. 4F, the ticket selection page 492A illustrated in FIG. 4G, the ticket selection page 492B illustrated in FIG. 4I, and the page 1000 illustrated in FIGS. 10A and 10B) described above and displayed by the display device 47. Such instructions may be stored on one or more non-transitory computer-readable media. The screens and/or pages (e.g., the landing page 310, the theatre and showtime selection page 330, the purchase process page 360 illustrated in FIGS. 3A, 3B, and 3D, respectively, the primary view page 410 illustrated in FIGS. 4A-4E, 4H, 8, and 11, the seat selection page 482 illustrated in FIG. 4F, the ticket selection page 492A illustrated in FIG. 4G, the ticket selection page 492B illustrated in FIG. 4I, and the page 1000 illustrated in FIGS. 10A and 10B) described above and displayed by the display device 47 may each be characterized as being a graphical user interface.

Embodiments of the disclosure can be described in view of the following clauses.

1. A system comprising a client computing device and at least one server computing device, the client computing device comprising a display device and implementing a user application operable by a user, the client computing device being operable to use the display device to display a graphical user interface to the user, the graphical user interface comprising a page that comprises a plurality of user inputs and a purchase input, the at least one server computing device implementing a ticket processing application configured to communicate with the user application, the ticket processing application being configured to provide personalized information to the user application, the personalized information identifying at least one theatre location, movies playing at each of the at least one theatre location, dates, and showtimes associated with the movies and dates, the page being configured to display, for a particular one of the at least one theatre location, movies showing at the particular theatre location, dates on which a particular one of the movies is showing, and a particular showtime on a particular one of the dates, the plurality of user inputs being configured to receive at least one user selection changing any of the particular theatre location, the particular movie, the particular date, and the particular showtime without exiting the page, receipt of the at least one user selection causing the page to update automatically to display the at least one user selection, the purchase input being selectable by the user to purchase at least one ticket for the particular movie showing at the particular theatre location at the particular showtime on the particular date.

2. The system of clause 1, wherein immediately after the user application receives the personalized information, the page immediately displays without user input, the particular theatre location, the movies showing at the particular theatre location, the dates the particular movie is showing, and the particular showtime on the particular date.

3. The system of clause 1 or 2, wherein the personalized information identifies seats available for each of the showtimes, the page displays a seat map preview illustrating for which seats tickets are available for purchase at the particular theatre location for the particular movie at the particular showtime on the particular date, and the seat map preview automatically updates whenever the user uses at least one of the plurality of user inputs to change any of the particular theatre location, the particular movie, the particular date, and the particular showtime.

4. The system of clause 3, wherein the seat map preview comprises a standardized representation used to display available seats by regions of an auditorium at the particular theatre location whereat the particular movie is showing at the particular showtime on the particular date, and the standardized representation displays a number of available seats for which tickets are available for purchase in each of the regions.

5. The system of clause 4, wherein the page comprises a selectable seat selection input that when selected by the user, displays a seating chart that allows the user to select particular seats at the auditorium for which to purchase tickets.

6. The system of clause 5, wherein the at least one server computing device sends pre-fetched information to the client computing device before the selectable seat selection input is selected by the user, and the pre-fetched information comprises seat chart information necessary to display the seating chart for each of a plurality of showtimes at which the particular movie is showing at the particular theatre location.

7. The system of clause 6, wherein the at least one server computing device subscribes the client computing device to a publication service implemented by the at least one server computing device before the selectable seat selection input is selected by the user, and the publication service automatically updates the pre-fetched information as tickets for seats become unavailable for purchase for the particular movie showing at the particular theatre location.

8. The system of any one of the clauses 1-7, wherein each of the at least one theatre location was tagged by the user using the user application.

9. The system of any one of the clauses 1-8, wherein the at least one theatre location comprises one or more theatre locations from which the user previously purchased at least one movie ticket.

10. The system of any one of the clauses 1-9, wherein the user application is configured to provide a geographic location to the ticket processing application, and the ticket processing application identifies the at least one theatre location based at least in part on the geographic location.

11. The system of any one of the clauses 1-10, wherein the client computing device is a mobile communication device.

12. The system of any one of the clauses 1-11, wherein the plurality of user inputs comprises a horizontally scrolling movie list displaying the movies showing at the particular theatre location, each of the movies displayed by the horizontally scrolling movie list is selectable within the horizontally scrolling movie list, the plurality of user inputs comprises a horizontally scrolling date list displaying the dates on which the particular movie is showing, and each of the dates displayed by the horizontally scrolling date list is selectable within the horizontally scrolling date list.

13. A computer-implemented method comprising (a) displaying, by a client computing device, a graphical user interface to a user, the graphical user interface comprising a page that comprises a plurality of user inputs and a purchase input; (b) requesting, by the client computing device, personalized information from at least one server computing device, the personalized information identifying at least one theatre location, movies playing at each of the at least one theatre location, dates, and showtimes associated with the movies and dates; (c) receiving, by the client computing device, the personalized information from the at least one server computing device; (d) for a particular one of the at least one theatre location, displaying on the page, by the client computing device, movies showing at the particular theatre location, dates on which a particular one of the movies is showing, and a particular showtime on a particular one of the dates; (e) receiving, by the client computing device, at least one user selection entered by the user into at least one of the plurality of user inputs, the at least one user selection changing any of the particular theatre location, the particular movie, the particular date, and the particular showtime without exiting the page; (f) updating automatically, by the client computing device, the page to display the at least one user selection; (g) receiving, by the client computing device, an indication that the user has selected the purchase input; and (h) completing, by the client computing device, a purchase of at least one ticket for the particular movie showing at the particular theatre location at the particular showtime on the particular date.

14. The computer-implemented method of clause 13, wherein immediately after the client computing device receives the personalized information, the client computing device immediately displays on the page, without user input, the particular theatre location, the movies showing at the particular theatre location, the dates the particular movie is showing, and the particular showtime on the particular date.

15. The computer-implemented method of clause 13 or 14, wherein the personalized information identifies seats available for each of the showtimes, and the computer-implemented method further comprises (i) displaying, by the client computing device, a seat map preview on the page, the seat map preview illustrating for which seats tickets are available for purchase at the particular theatre location for the particular movie at the particular showtime on the particular date; and (ii) updating automatically, by the client computing device, the seat map preview whenever the user uses at least one of the plurality of user inputs to change any of the particular theatre location, the particular movie, the particular date, and the particular showtime.

16. The computer-implemented method of clause 15, wherein the seat map preview comprises a standardized representation used to display available seats by regions of an auditorium at the particular theatre location whereat the particular movie is showing at the particular showtime on the particular date, and the standardized representation displays a number of available seats in each of the regions for which tickets are available for purchase.

17. The computer-implemented method of clause 16, wherein the page comprises a selectable seat selection input, and the computer-implemented method further comprises (i) receiving, by the client computing device, an indication that the user has selected the selectable seat selection input; and (ii) displaying, by the client computing device, a seating chart that allows the user to select particular seats at the auditorium for which to purchase tickets after receiving the indication that the user has selected the selectable seat selection input.

18. The computer-implemented method of clause 17, wherein the at least one server computing device sends pre-fetched information to the client computing device before the selectable seat selection input is selected by the user, and the computer-implemented method further comprises (i) receiving, by the client computing device, the pre-fetched information, which comprises seat chart information necessary to display the seating chart for each of a plurality of showtimes at which the particular movie showing at the particular theatre location; and (ii) using, by the client computing device, the seat chart information to display the seating chart for the particular theatre location, the particular movie, the particular date, and the particular showtime.

19. The computer-implemented method of clause 18, wherein the at least one server computing device is configured to subscribes the client computing device to a publication service implemented by the at least one server computing device before the selectable seat selection input is selected by the user, and the computer-implemented method further comprises (i) receiving, by the client computing device, automatic updates to the pre-fetched information from the publication service as tickets for seats become unavailable for purchase for the particular movie showing at the particular theatre location, and (ii) updating, by the client computing device, the seating chart when the pre-fetched information is updated for the particular theatre location, the particular movie, the particular date, and the particular showtime.

20. The computer-implemented method of any one of the clauses 13-19, wherein the plurality of user inputs comprises a horizontally scrolling movie list displaying the movies showing at the particular theatre location, each of the movies displayed by the horizontally scrolling movie list is selectable within the horizontally scrolling movie list, the plurality of user inputs comprises a horizontally scrolling date list displaying the dates on which the particular movie is showing, and each of the dates displayed by the horizontally scrolling date list is selectable within the horizontally scrolling date list.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:
1. A system comprising:
at least one server computing device implementing a ticket processing application configured to communicate with a user application implemented by a client computing device operable by a user, the client computing device comprising a display device and being operable to use the display device to display a graphical user interface to the user, the graphical user interface comprising a page that comprises a plurality of user inputs and a purchase input, the ticket processing application being configured to provide personalized information to the user application, the personalized information identifying at least one theatre location, movies playing at each of the at least one theatre location, dates, and the showtimes associated with the movies and dates, the personalized information identifying seats available for each of the showtimes, the page being configured to display, for a particular one of the at least one theatre location, movies showing at the particular theatre location, dates on which a particular one of the movies is showing, and a particular showtime on a particular one of the dates, the page displaying a seat map preview illustrating for which seats tickets are available for purchase at the particular theatre location for the particular movie at the particular showtime on the particular date, the seat map preview comprising a standardized representation used to display available seats by regions of an auditorium, the regions being displayed by the standardized representation independently of an actual shape and an actual size of the auditorium, the plurality of user inputs being configured to receive at least one user selection changing any of the particular theatre location, the particular movie, the particular date, and the particular showtime without exiting the page, receipt of the at least one user selection causing the page to update automatically to display the at least one user selection and the seat map preview to automatically update, the page comprising a seat selection input that, when selected by the user, displays a seat map from which one or more seats may be selected, the seat map depicting visual representations of actual movie seats present at the particular theatre location, the purchase input being selectable by the user to purchase at least one ticket for the particular movie showing at the particular theatre location at the particular showtime on the particular date.

2. The system of claim 1, wherein immediately after the user application receives the personalized information, the page immediately displays without user input, the particular theatre location, the movies showing at the particular theatre location, the dates the particular movie is showing, and the particular showtime on the particular date.

3. The system of claim 1, wherein the standardized representation displays a number of available seats for which tickets are available for purchase in each of the regions.

4. The system of claim 1, wherein the seat selection input is the seat map preview.

5. The system of claim 1, wherein the seat selection input is one of the plurality of user inputs.

6. The system of claim 1,
wherein the at least one server computing device sends pre-fetched information to the client computing device before the seat selection input is selected by the user, and
the pre-fetched information comprises seat information necessary to display the seat map for each of a plurality of showtimes at which the particular movie is showing at the particular theatre location.

7. The system of claim 6, wherein the at least one server computing device subscribes the client computing device to a publication service implemented by the at least one server computing device before the seat selection input is selected by the user, and
the publication service automatically updates the prefetched information as tickets for seats become unavailable for purchase for the particular movie showing at the particular theatre location.

8. The system of claim 1, wherein each of the at least one theatre location was tagged by the user using the user application.

9. The system of claim 1, wherein the at least one theatre location comprises one or more theatre locations from which the user previously purchased at least one movie ticket.

10. The system of claim 1, wherein the user application is configured to provide a geographic location to the ticket processing application, and
the ticket processing application identifies the at least one theatre location based at least in part on the geographic location.

11. The system of claim 1, wherein the client computing device is a mobile communication device.

12. The system of claim 1, wherein the plurality of user inputs comprises a horizontally scrolling movie list displaying the movies showing at the particular theatre location,
each of the movies displayed by the horizontally scrolling movie list is selectable within the horizontally scrolling movie list,
the plurality of user inputs comprises a horizontally scrolling date list displaying the dates on which the particular movie is showing, and
each of the dates displayed by the horizontally scrolling date list is selectable within the horizontally scrolling date list.

13. A computer-implemented method comprising:
displaying, by a client computing device, a graphical user interface to a user, the graphical user interface comprising a page that comprises a plurality of user inputs and a purchase input;
requesting, by the client computing device, personalized information from at least one server computing device, the personalized information identifying at least one theatre location, movies playing at each of the at least one theatre location, dates, and showtimes associated with the movies and dates, the personalized information identifying seats available for each of the showtimes;
receiving, by the client computing device, the personalized information from the at least one server computing device;
for a particular one of the at least one theatre location, displaying on the page, by the client computing device, movies showing at the particular theatre location, dates on which a particular one of the movies is showing, and a particular showtime on a particular one of the dates;
displaying on the page, b y the client computing device, a seat map preview illustrating for which seats tickets are available for purchase at the particular theatre location for the particular movie at the particular showtime on the particular date, the seat map preview comprising a standardized representation displaying a number of available seats in each of a plurality of regions of an auditorium, the plurality of regions being displayed by the standardized representation independently of an actual shape and an actual size of the auditorium;
receiving, by the client computing device, at least one user selection entered by the user into at least one of the plurality of user inputs, the at least one user selection changing any of the particular theatre location, the particular movie, the particular date, and the particular showtime without exiting the page;

updating automatically, by the client computing device, the page to display the at least one user selection;

receiving, by the client computing device, an indication that the user has selected a seat selection input;

displaying, by the client computing device, a seat map after receiving the indication that the user has selected the seat selection input, the seat map depicting visual representations of actual movie seats present at the particular theatre location, the actual movie seats being selectable from the seat map by the user;

receiving, by the client computing device, identifications of one or more of the actual movie seats after the user selects the one or more actual movie seats from the seat map;

receiving, by the client computing device, an indication that the user has selected the purchase input; and completing, by the client computing device, a purchase of at least one ticket for the one or more actual movie seats for the particular movie showing at the particular theatre location at the particular showtime on the particular date.

14. The computer-implemented method of claim 13, wherein immediately after the client computing device receives the personalized information, the client computing device immediately displays on the page, without user input, the particular theatre location, the movies showing at the particular theatre location, the dates the particular movie is showing, and the particular showtime on the particular date.

15. The computer-implemented method of claim 13, wherein automatically updating the page to display the at least one user selection automatically updates the seat map preview.

16. The computer-implemented method of claim 13, wherein the seat selection input is the seat map preview.

17. The computer-implemented method of claim 13, wherein the seat selection input is one of the plurality of user inputs.

18. The computer-implemented method of claim 13, wherein the at least one server computing device sends pre-fetched information to the client computing device before the seat selection input is selected by the user, and the computer-implemented method further comprises:

receiving, by the client computing device, the pre-fetched information, which comprises seat map information necessary to display the seat map for each of a plurality of showtimes at which the particular movie showing at the particular theatre location; and using, by the client computing device, the seat map information to display the seat map for the particular theatre location, the particular movie, the particular date, and the particular showtime.

19. The computer-implemented method of claim 18, wherein the at least one server computing device is configured to subscribes the client computing device to a publication service implemented by the at least one server computing device before the seat selection input is selected by the user, and the computer-implemented method further comprises:

receiving, by the client computing device, automatic updates to the pre-fetched information from the publication service as tickets for seats become unavailable for purchase for the particular movie showing at the particular theatre location, and updating, by the client computing device, the seat map when the pre-fetched information is updated for the particular theatre location, the particular movie, the particular date, and the particular showtime.

20. The computer-implemented method of claim 13, wherein the plurality of user inputs comprises a horizontally scrolling movie list displaying the movies showing at the particular theatre location, each of the movies displayed by the horizontally scrolling movie list is selectable within the horizontally scrolling movie list, the plurality of user inputs comprises a horizontally scrolling date list displaying the dates on which the particular movie is showing, and each of the dates displayed by the horizontally scrolling date list is selectable within the horizontally scrolling date list.

* * * * *